(12) United States Patent
Ohashi

(10) Patent No.: US 9,638,901 B2
(45) Date of Patent: May 2, 2017

(54) ZOOM LENS AND IMAGING DEVICE USING THE SAME

(71) Applicant: Kazuyasu Ohashi, Chiba (JP)

(72) Inventor: Kazuyasu Ohashi, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 41 days.

(21) Appl. No.: 14/606,393

(22) Filed: Jan. 27, 2015

(65) Prior Publication Data

US 2015/0212303 A1 Jul. 30, 2015

(30) Foreign Application Priority Data

Jan. 27, 2014 (JP) .................................. 2014-012824
Jan. 27, 2014 (JP) .................................. 2014-012831

(51) Int. Cl.
*G02B 15/00* (2006.01)
*G02B 15/14* (2006.01)
(Continued)

(52) U.S. Cl.
CPC ........... *G02B 15/14* (2013.01); *G02B 13/009* (2013.01); *G02B 15/00* (2013.01); *G02B 15/17* (2013.01);
(Continued)

(58) Field of Classification Search
CPC ........ G02B 15/00; G02B 15/02; G02B 15/08; G02B 15/14; G02B 15/17; G02B 13/009; G02B 27/0062; H04N 5/23296
(Continued)

(56) References Cited

U.S. PATENT DOCUMENTS

| 5,627,682 A | 5/1997 | Nagaoka |
| 2006/0262422 A1 | 11/2006 | Ohashi |

(Continued)

FOREIGN PATENT DOCUMENTS

| EP | 2 843 458 A1 | 3/2015 |
| EP | 2 866 069 A1 | 4/2015 |

(Continued)

OTHER PUBLICATIONS

Extended European Search Report issued Jun. 17, 2015 in Patent Application No. 15152704.1.

*Primary Examiner* — Bumsuk Won
*Assistant Examiner* — William R Alexander
(74) *Attorney, Agent, or Firm* — Oblon, McClelland, Maier & Neustadt, L.L.P.

(57) ABSTRACT

A zoom lens includes, in the order starting from the object side to the side of an image plane, a first lens group having positive refractive power, a second lens group having negative refractive power, a third lens group having negative refractive power, and a fourth lens group having positive refractive power. The fourth lens group includes, in the order starting from the side closest to the image plane to the object side, a first positive lens, a first negative lens, a second negative lens and a second positive lens. The fourth lens group G4 has a configuration that satisfies the following conditional expression (1) when $vd_{P1}$ represents an Abbe number of the first positive lens L46 and $vd_{N1}$ represents an Abbe number of the first negative lens L45:

$$-40 < vd_{P1} - vd_{N1} < 0 \qquad (1).$$

20 Claims, 31 Drawing Sheets

(51) Int. Cl.
*G02B 27/00* (2006.01)
*G02B 15/17* (2006.01)
*G02B 13/00* (2006.01)
*H04N 5/232* (2006.01)

(52) U.S. Cl.
CPC ..... *G02B 27/0062* (2013.01); *H04N 5/23296* (2013.01)

(58) Field of Classification Search
USPC ........................................ 359/680, 686, 688
See application file for complete search history.

(56) References Cited

U.S. PATENT DOCUMENTS

| | | |
|---|---|---|
| 2008/0151385 A1 | 6/2008 | Ohashi |
| 2008/0198477 A1 | 8/2008 | Ohashi |
| 2008/0239504 A1* | 10/2008 | Tsutsumi ............ G02B 15/173 359/676 |
| 2009/0046199 A1* | 2/2009 | Nanjo ................. G02B 15/173 348/347 |
| 2009/0080088 A1 | 3/2009 | Ohashi |
| 2009/0091841 A1 | 4/2009 | Ohashi |
| 2010/0007967 A1 | 1/2010 | Ohashi |
| 2010/0027136 A1 | 2/2010 | Ohashi et al. |
| 2010/0149652 A1* | 6/2010 | Imamura ............. G02B 15/163 359/676 |
| 2010/0182705 A1 | 7/2010 | Hori et al. |
| 2010/0196002 A1 | 8/2010 | Uchida et al. |
| 2010/0271710 A1 | 10/2010 | Ohashi |
| 2011/0310496 A1 | 12/2011 | Kubota et al. |
| 2011/0317285 A1 | 12/2011 | Ohashi et al. |
| 2012/0212838 A1 | 8/2012 | Ohashi |
| 2012/0224269 A1 | 9/2012 | Sakamoto |
| 2013/0194488 A1 | 8/2013 | Kubota et al. |
| 2013/0194681 A1 | 8/2013 | Ohashi et al. |
| 2013/0258497 A1* | 10/2013 | Aoi ....................... G02B 15/17 359/688 |
| 2013/0265649 A1 | 10/2013 | Ohashi |
| 2013/0321936 A1 | 12/2013 | Ohashi |
| 2014/0016214 A1 | 1/2014 | Kubota et al. |
| 2014/0078605 A1 | 3/2014 | Ohashi |
| 2014/0126072 A1 | 5/2014 | Ohashi et al. |
| 2014/0139932 A1 | 5/2014 | Ohashi |
| 2014/0340768 A1 | 11/2014 | Kubota et al. |
| 2015/0022901 A1* | 1/2015 | Komatsu ............. G02B 15/173 359/688 |

FOREIGN PATENT DOCUMENTS

| | | |
|---|---|---|
| JP | 3369689 | 11/2002 |
| JP | 2008-197534 | 8/2008 |
| JP | 2008-241884 | 10/2008 |
| JP | 2010-175956 | 8/2010 |
| JP | 2010-186179 | 8/2010 |
| JP | 2012-185272 | 9/2012 |
| JP | 2013-24936 | 2/2013 |
| WO | WO 2013/153793 A1 | 10/2013 |

\* cited by examiner

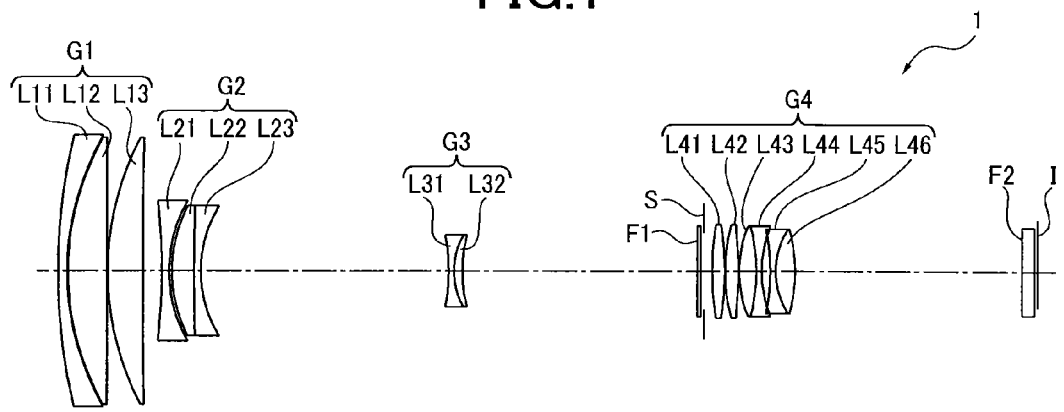
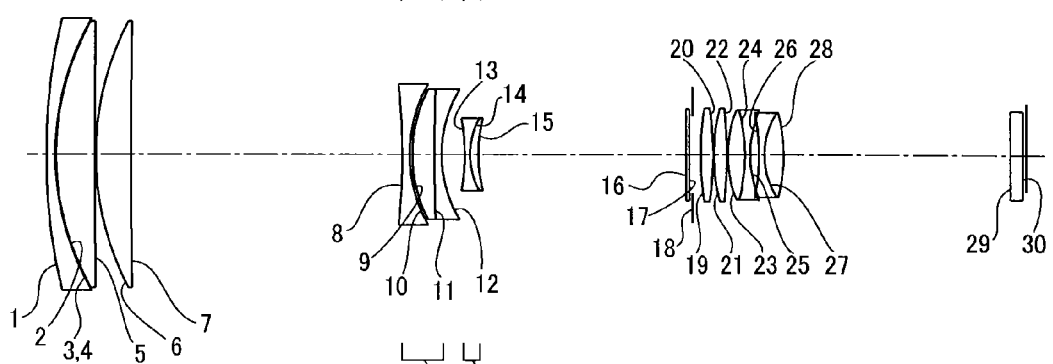
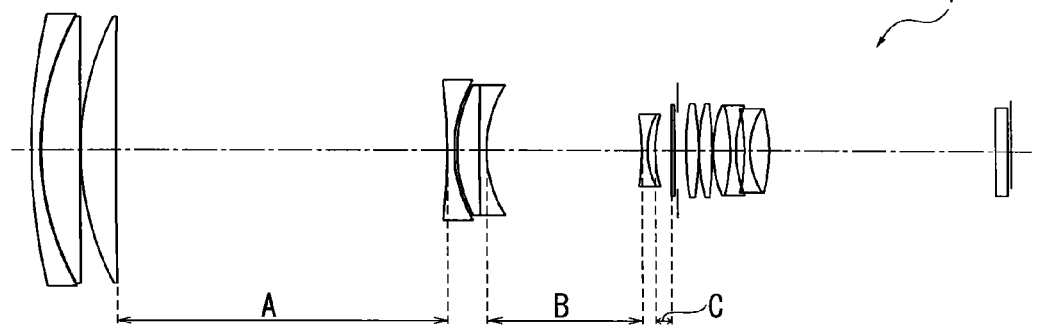
FIG.1

FIG.2
WIDE ANGLE END
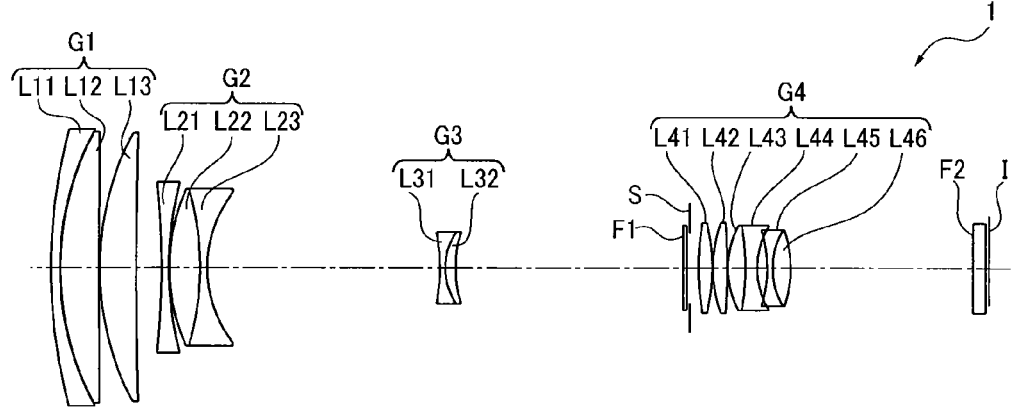
INTERMEDIATE FOCAL LENGTH
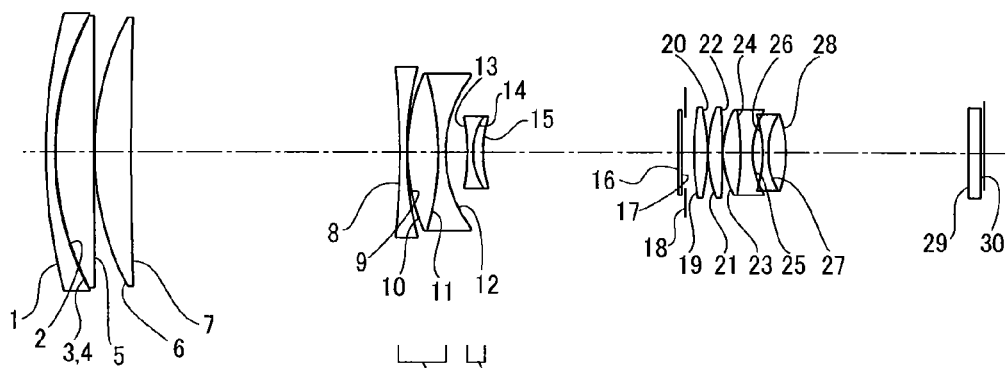
TELEPHOTO END
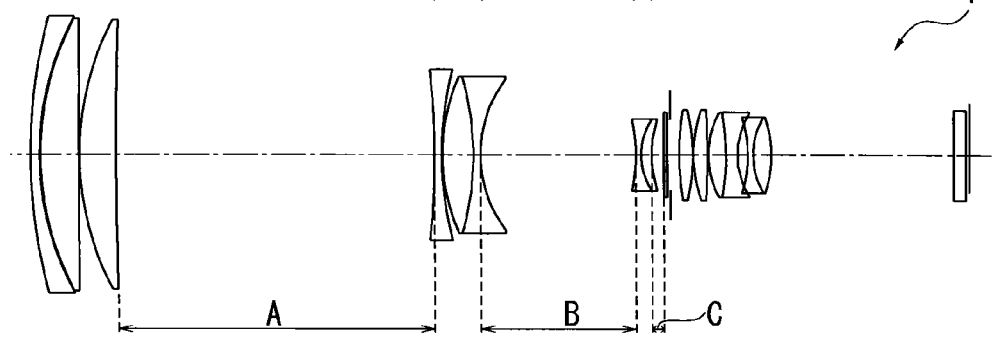

WIDE ANGLE END    FIG.3
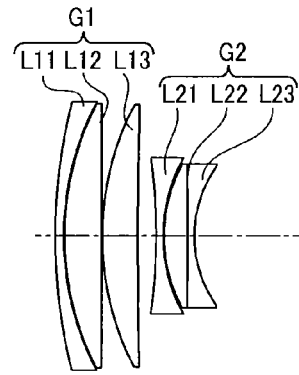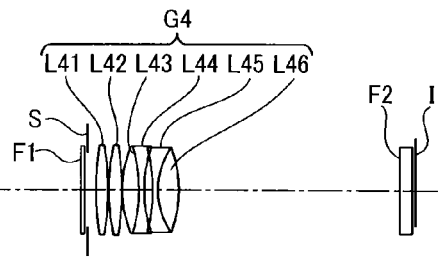
INTERMEDIATE FOCAL LENGTH
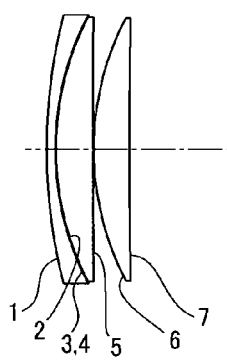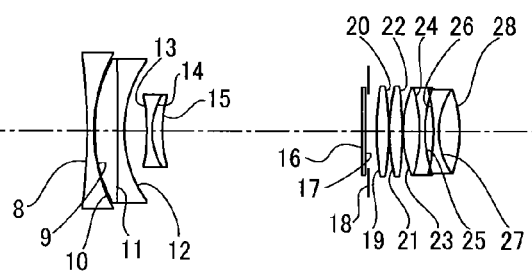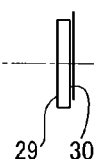
TELEPHOTO END
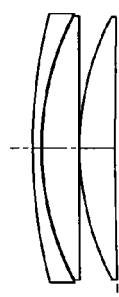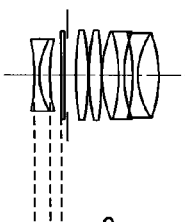

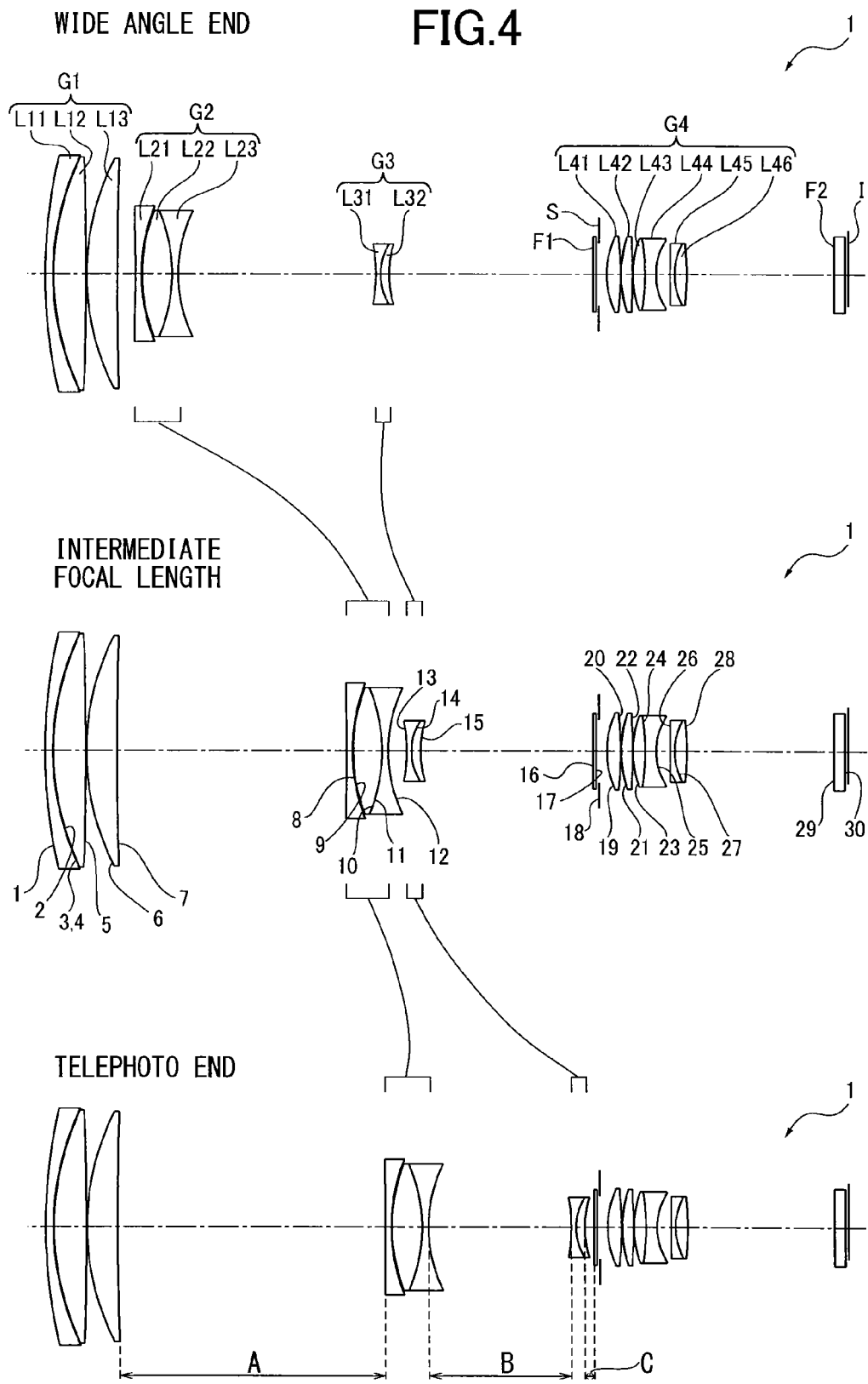

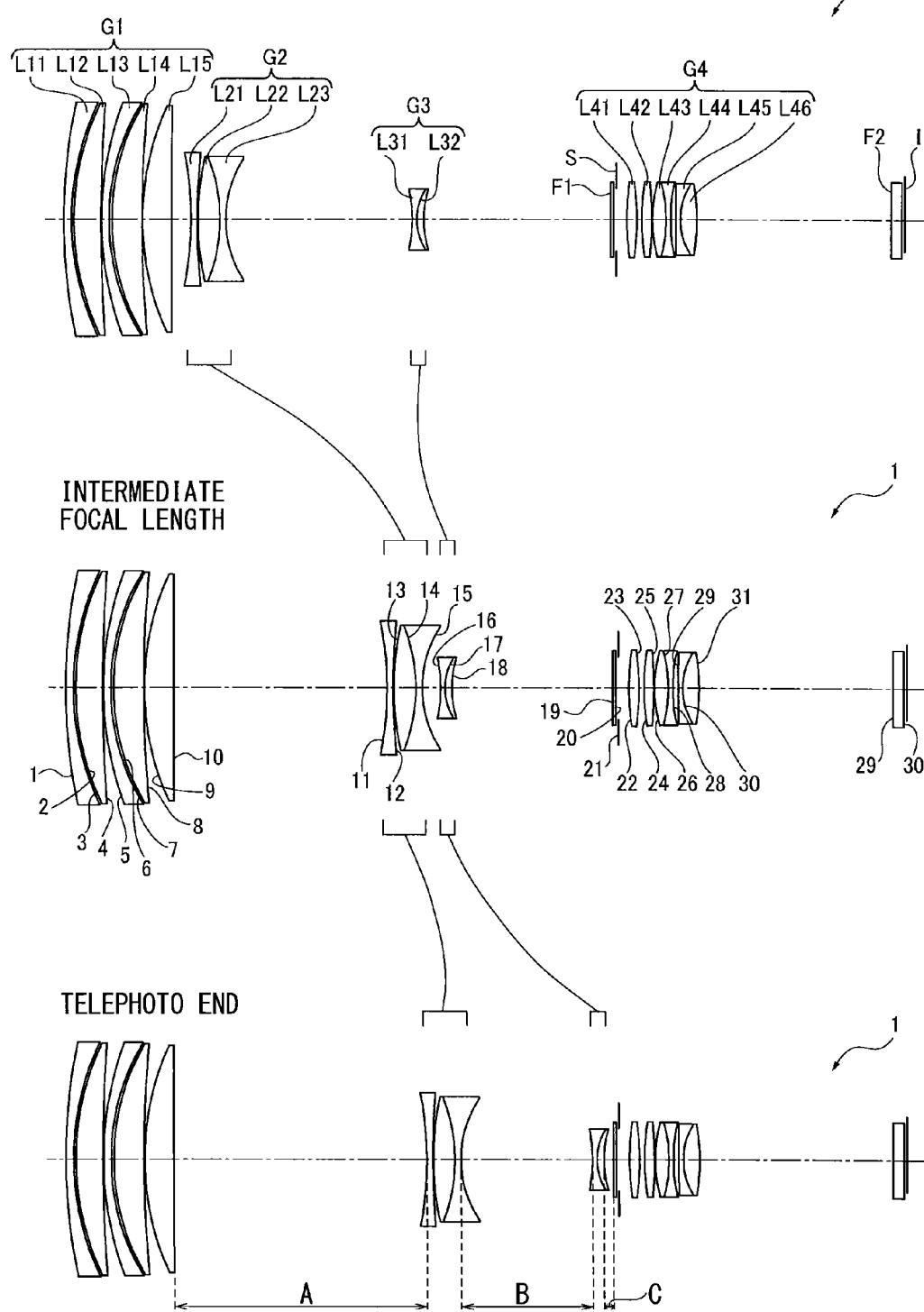

FIG.6
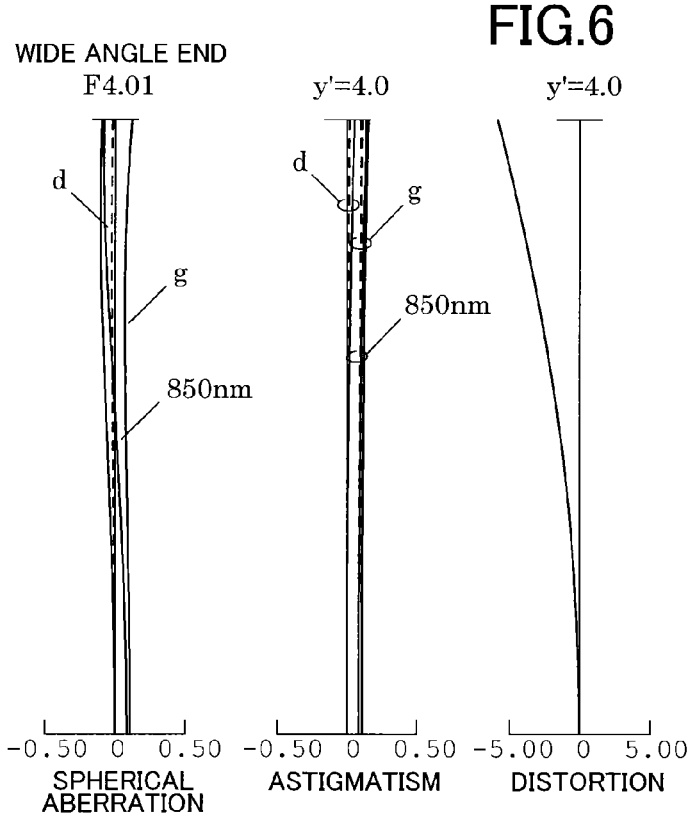
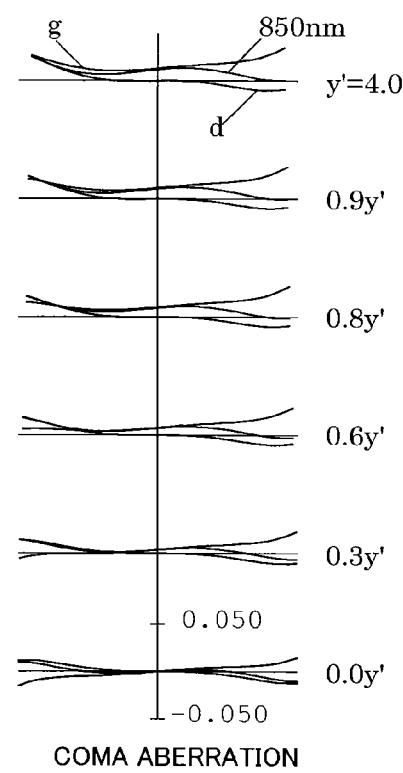
FIG.7
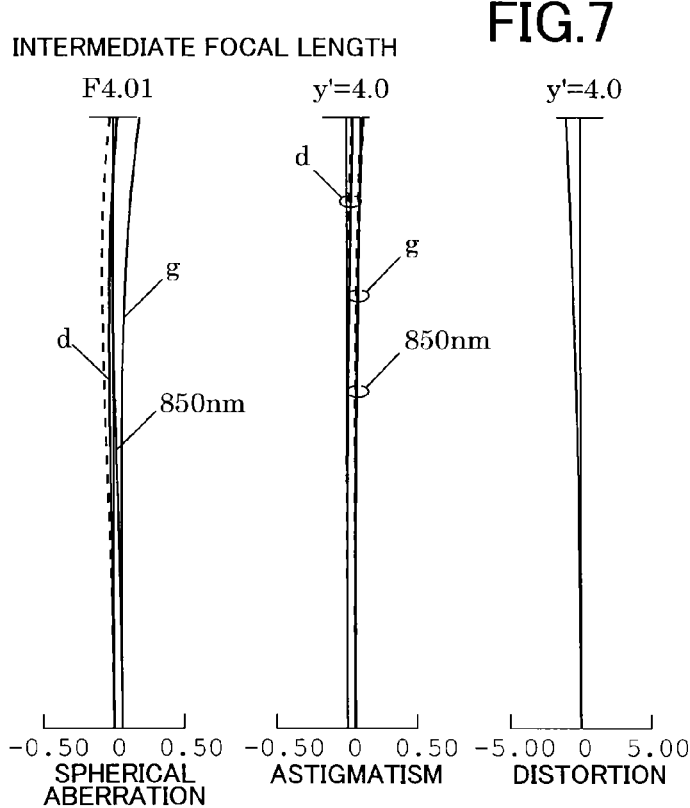
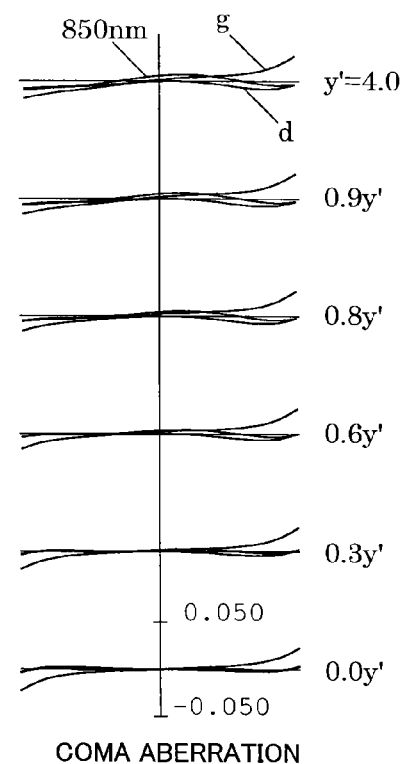

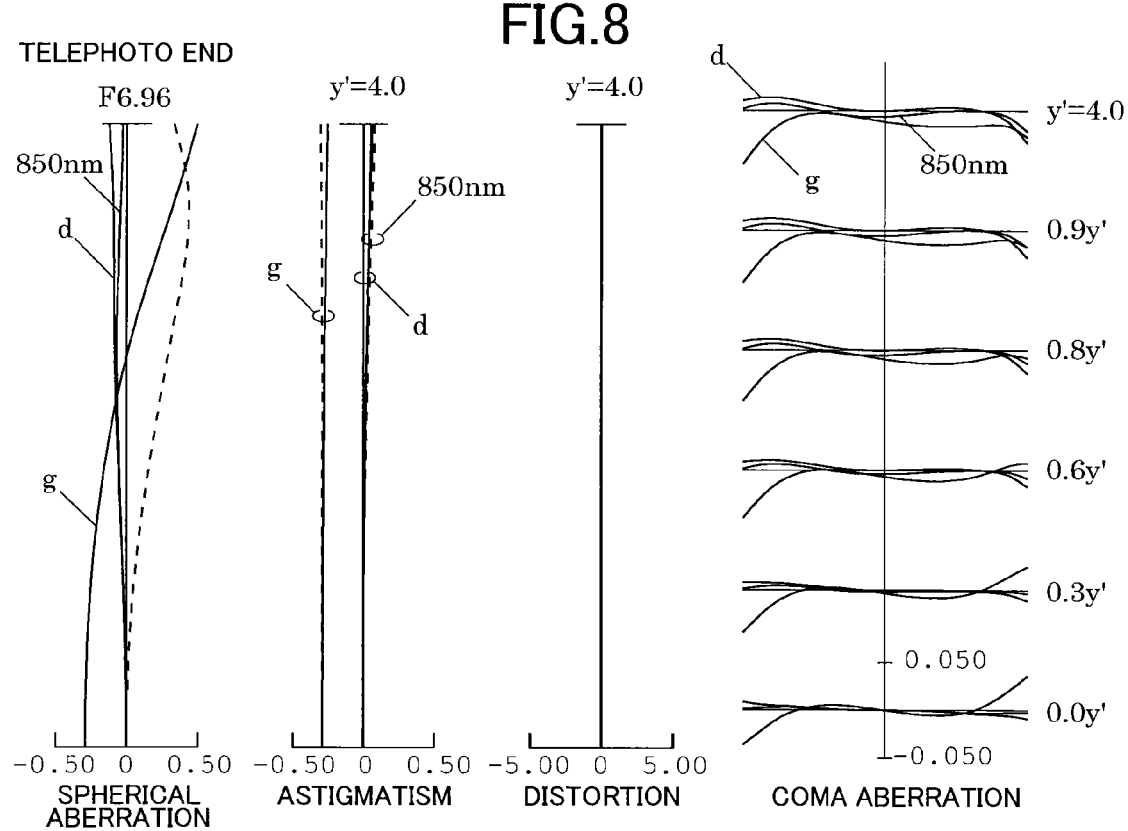

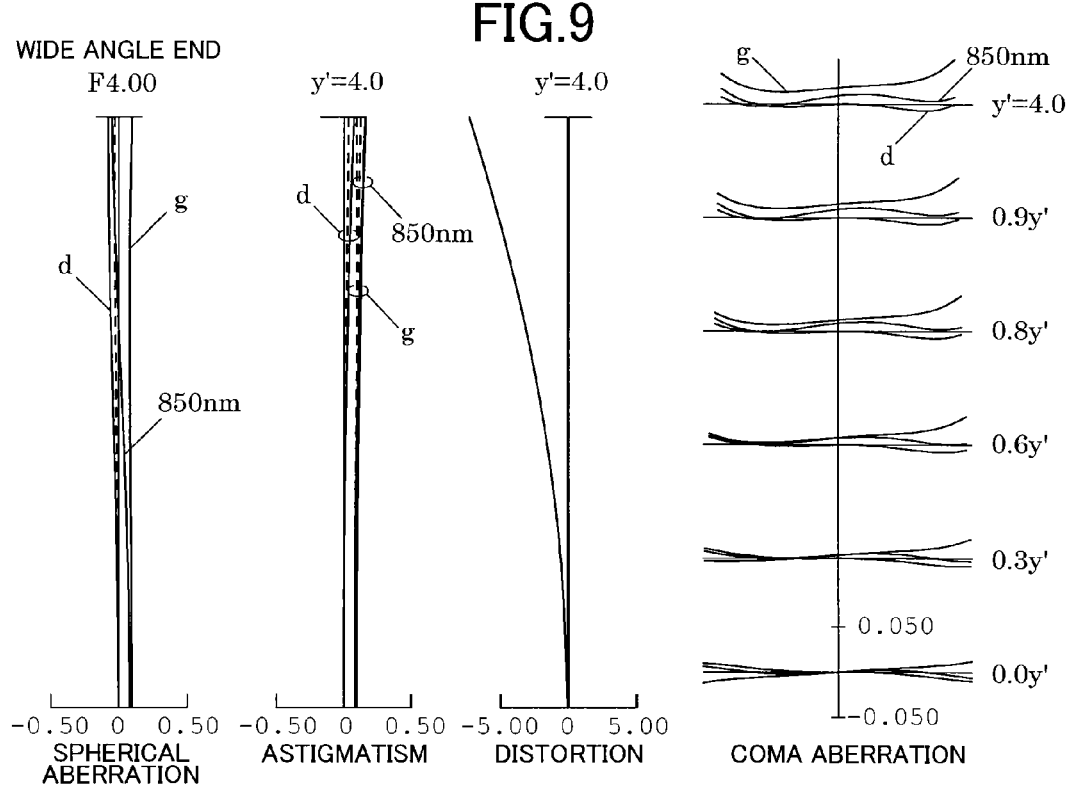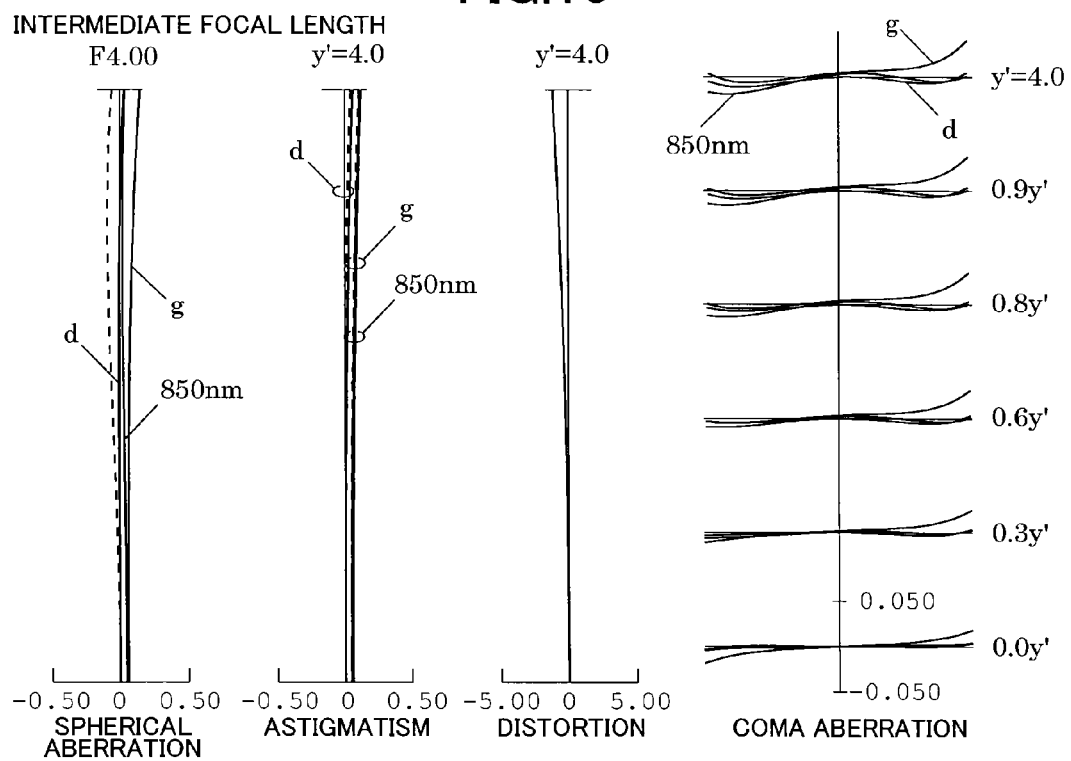

FIG.12
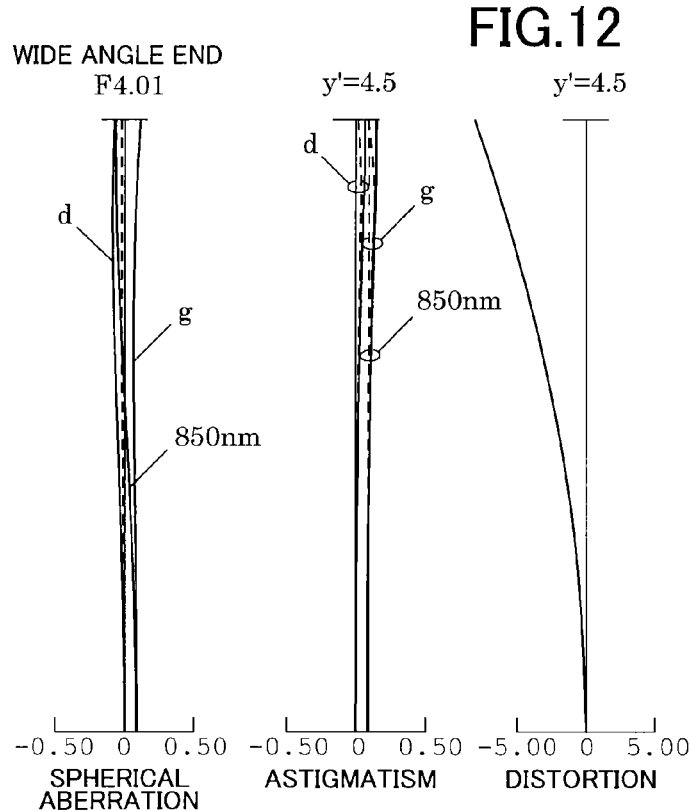
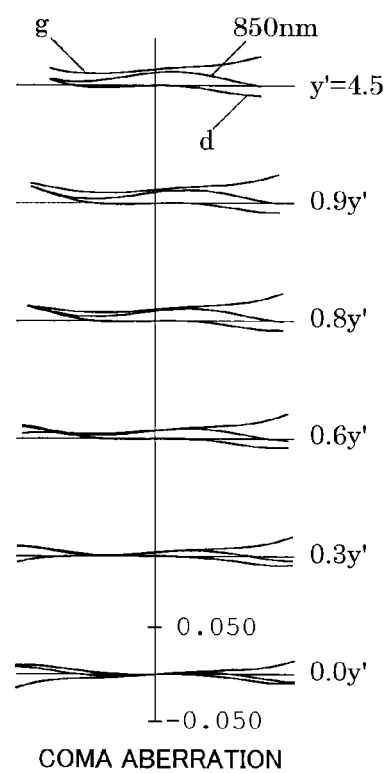
FIG.13
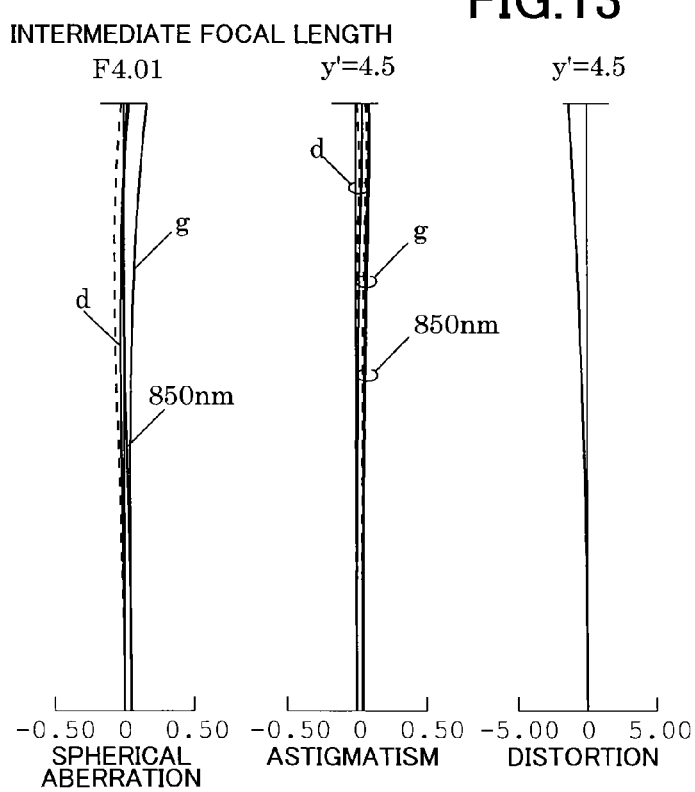
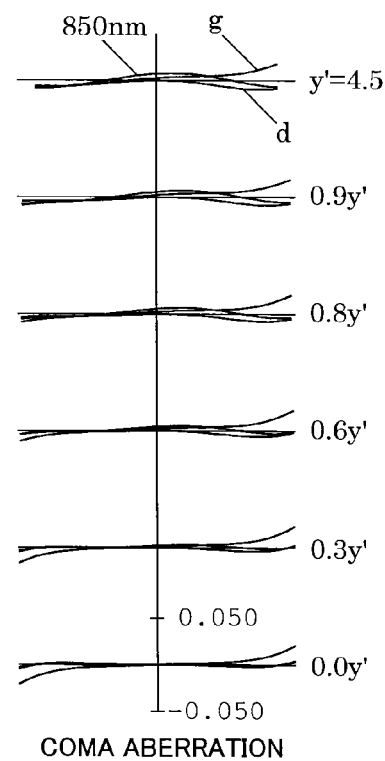

FIG.15
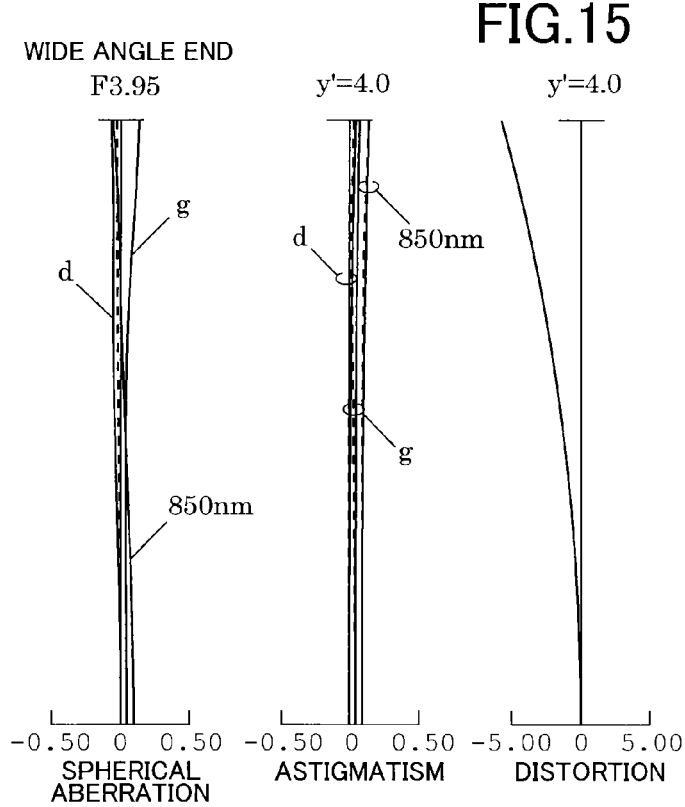
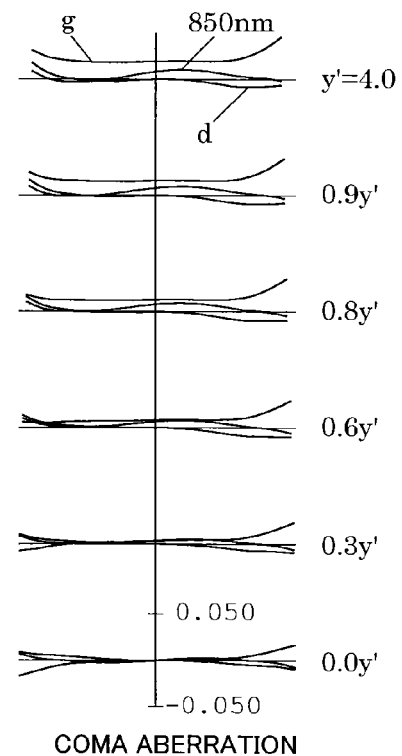
FIG.16
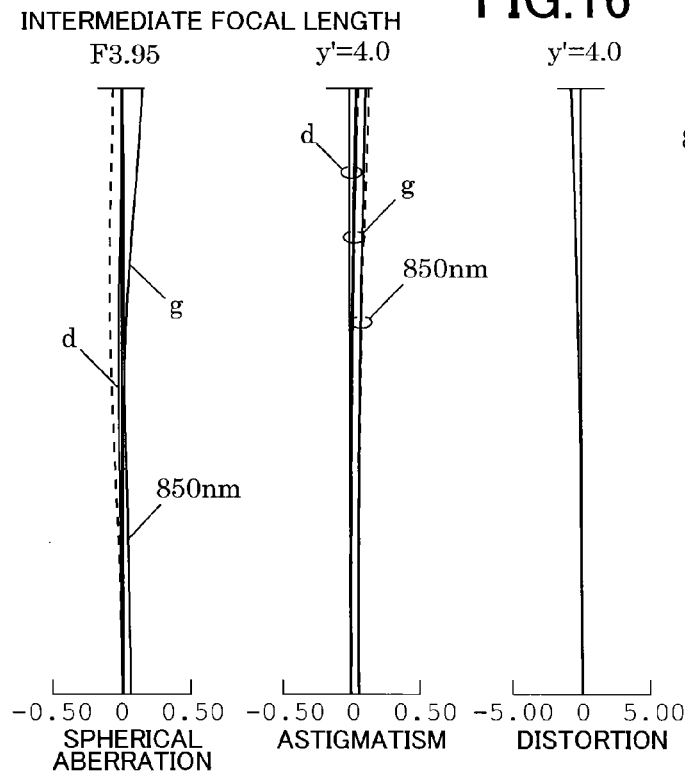
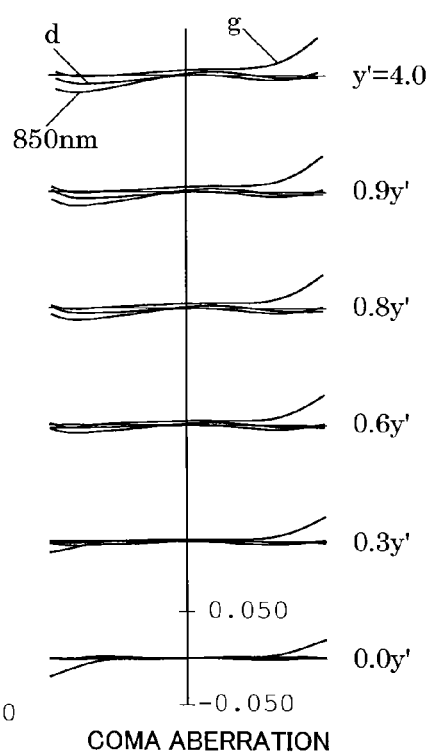

FIG.18
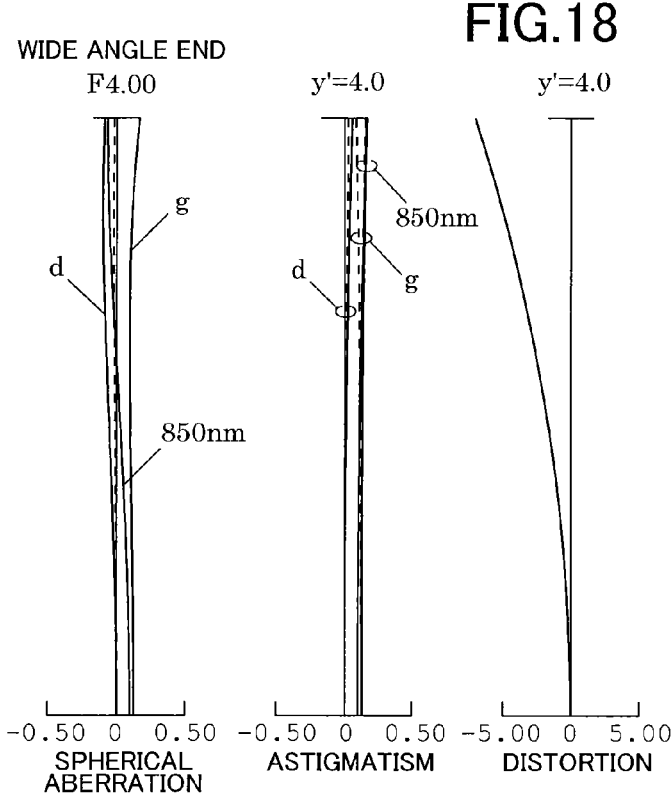
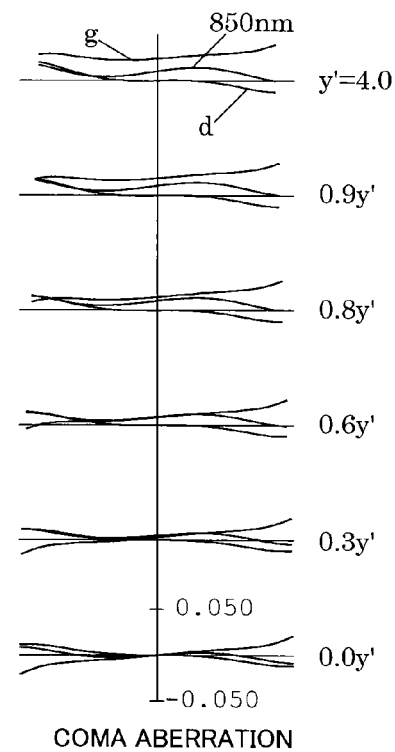
WIDE ANGLE END
FIG.19
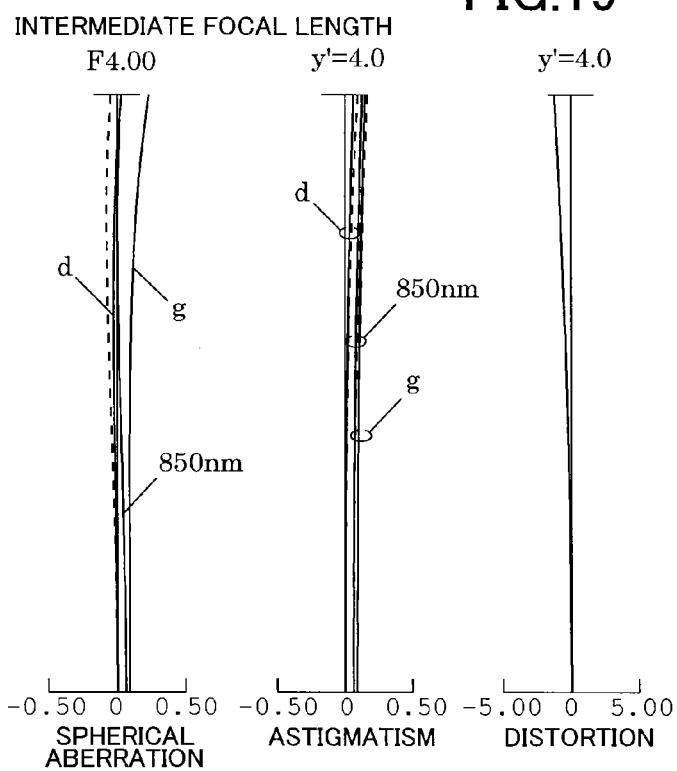
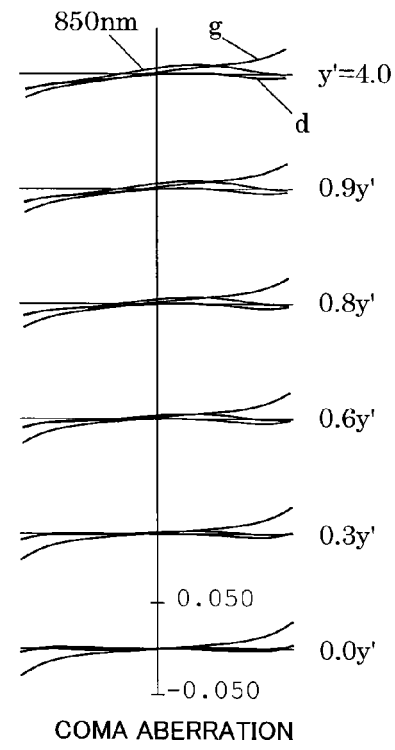
INTERMEDIATE FOCAL LENGTH

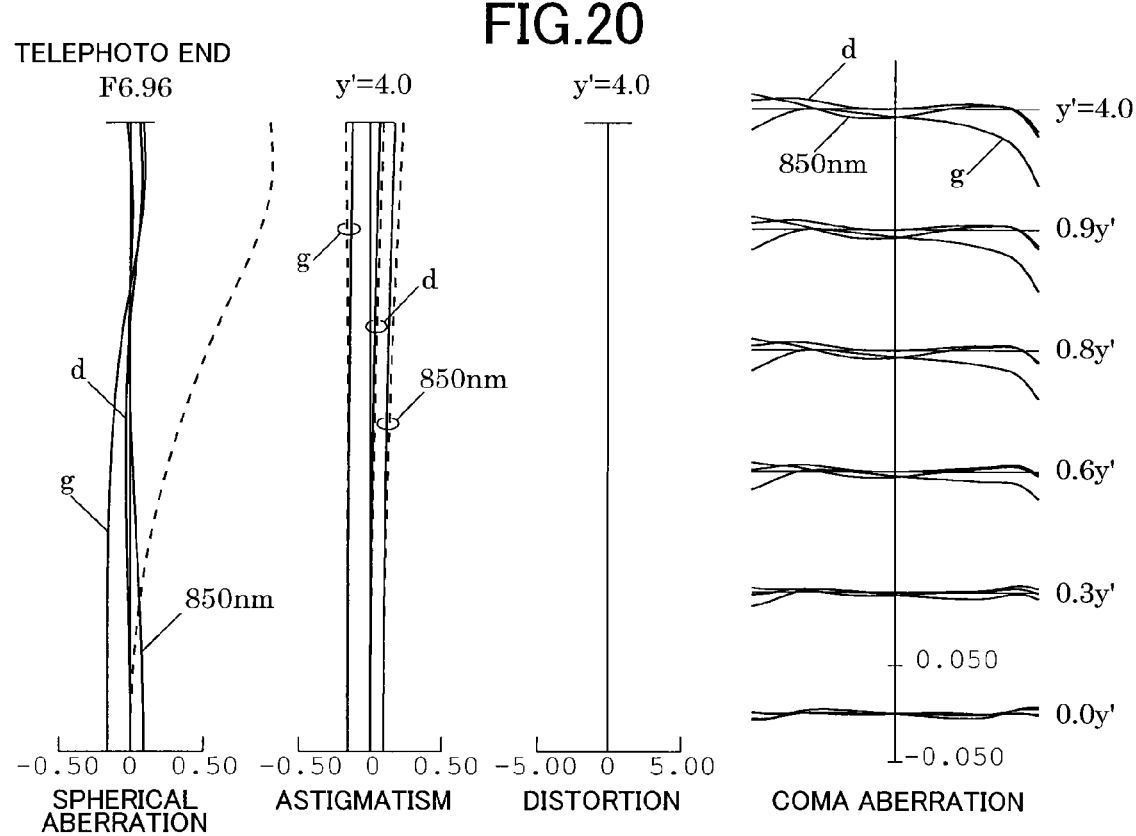

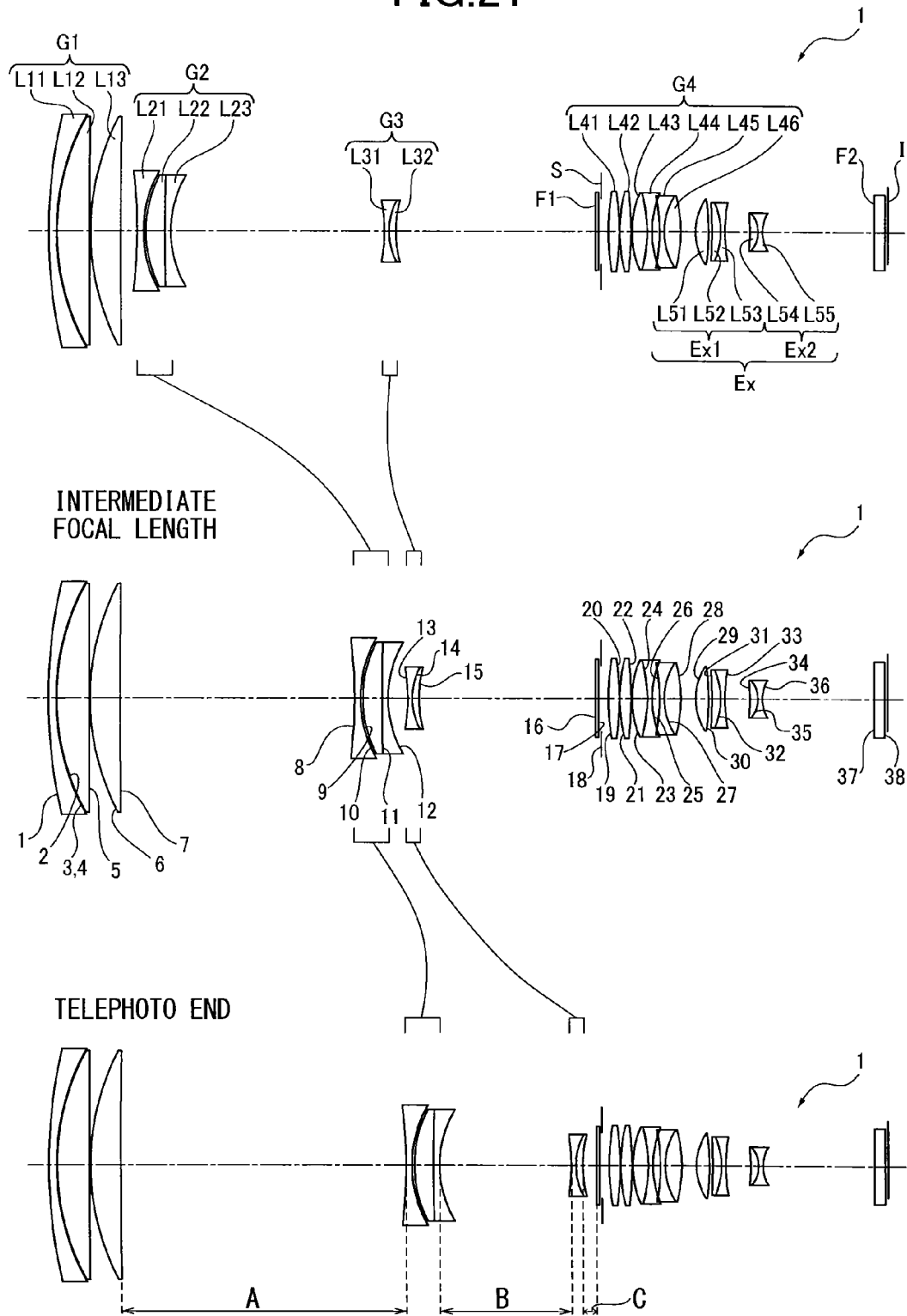

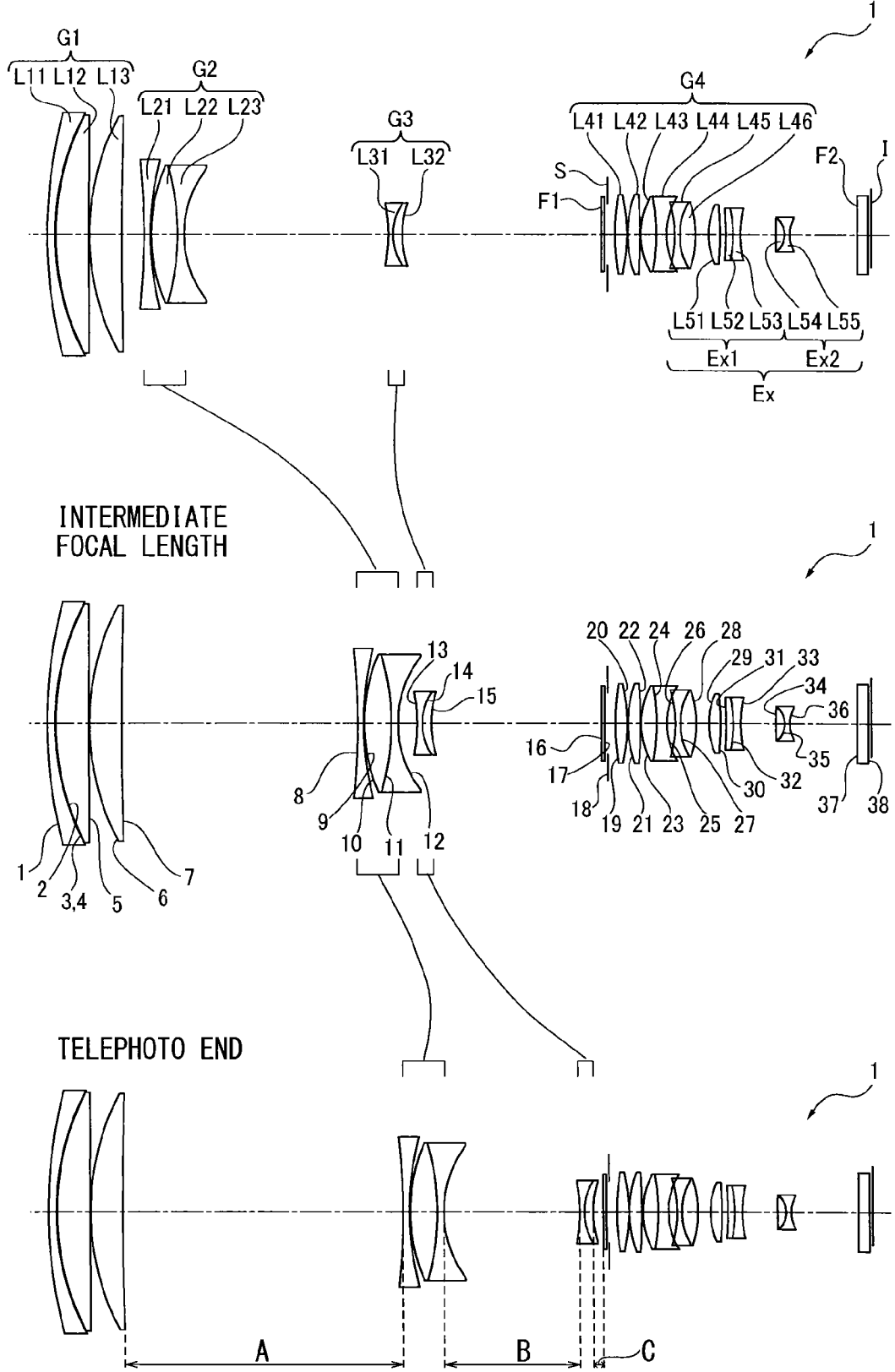

WIDE ANGLE END  FIG.23
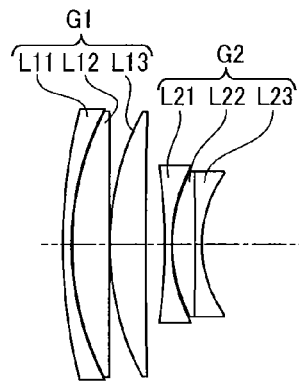
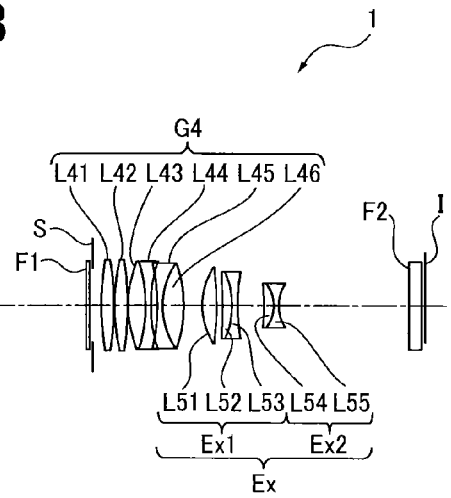
INTERMEDIATE FOCAL LENGTH
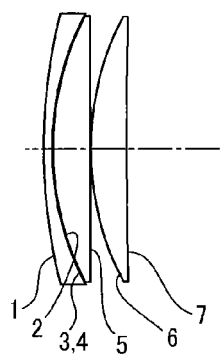
TELEPHOTO END
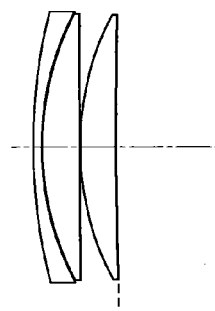

FIG.24
WIDE ANGLE END
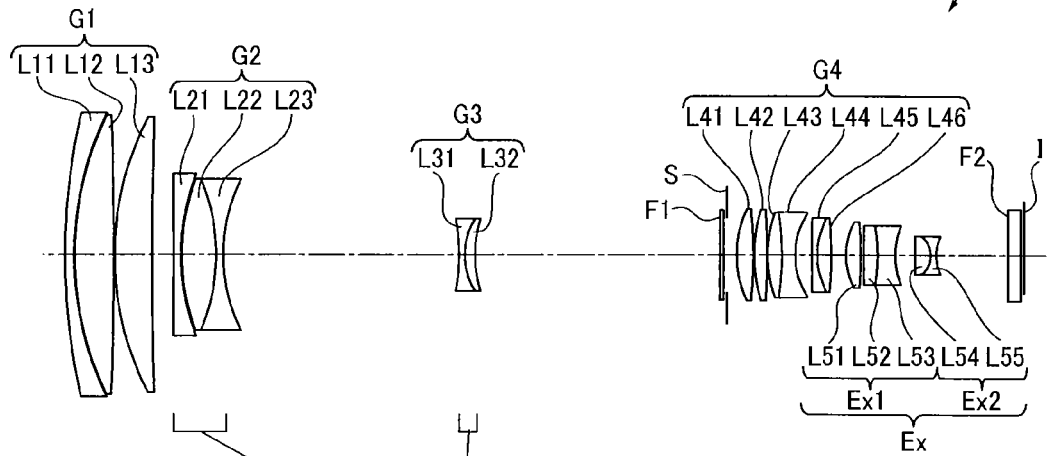
INTERMEDIATE FOCAL LENGTH
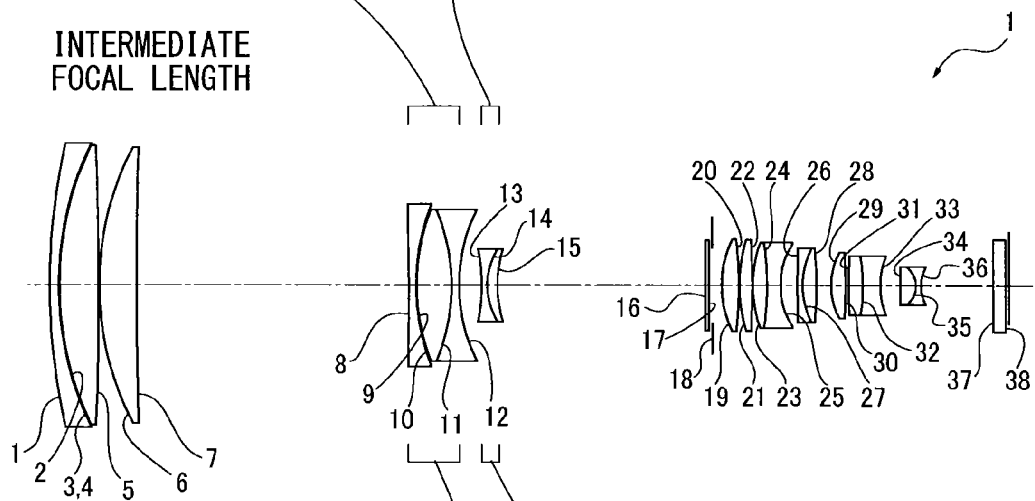
TELEPHOTO END
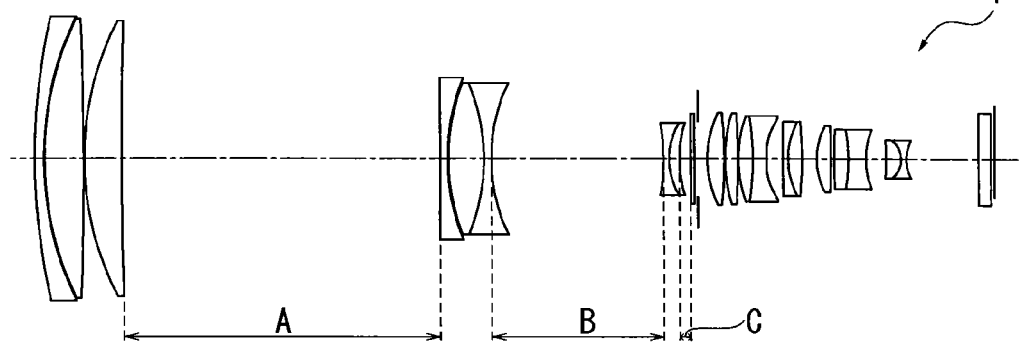

FIG.26
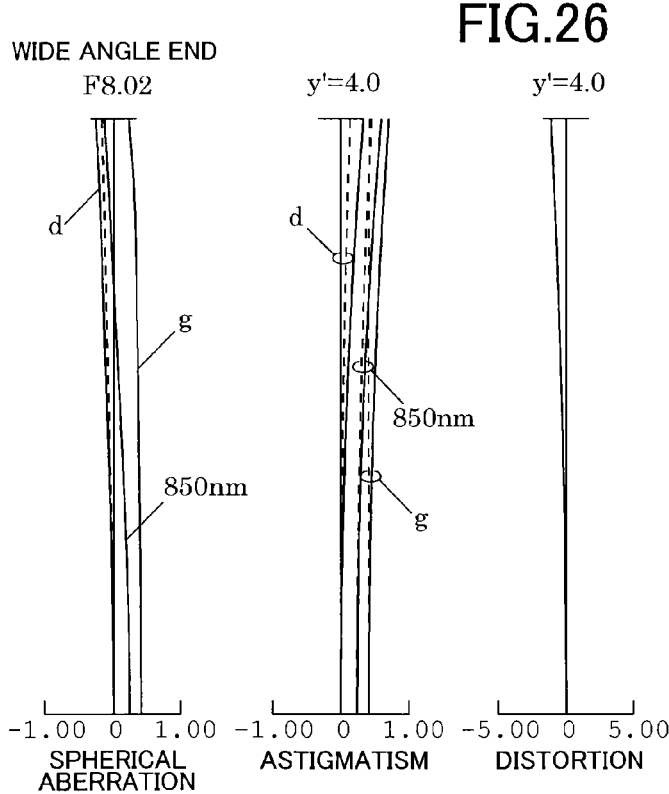
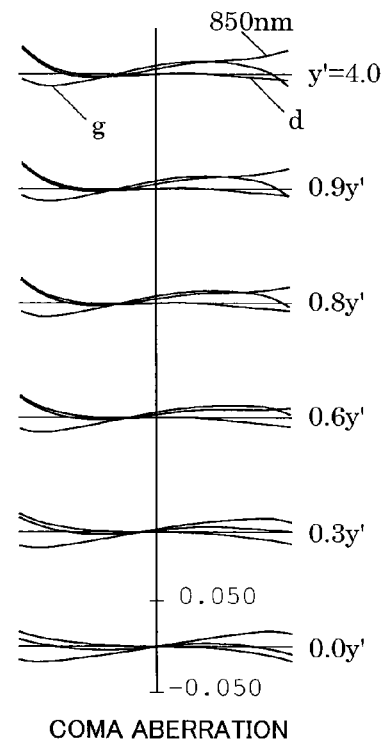
WIDE ANGLE END
FIG.27
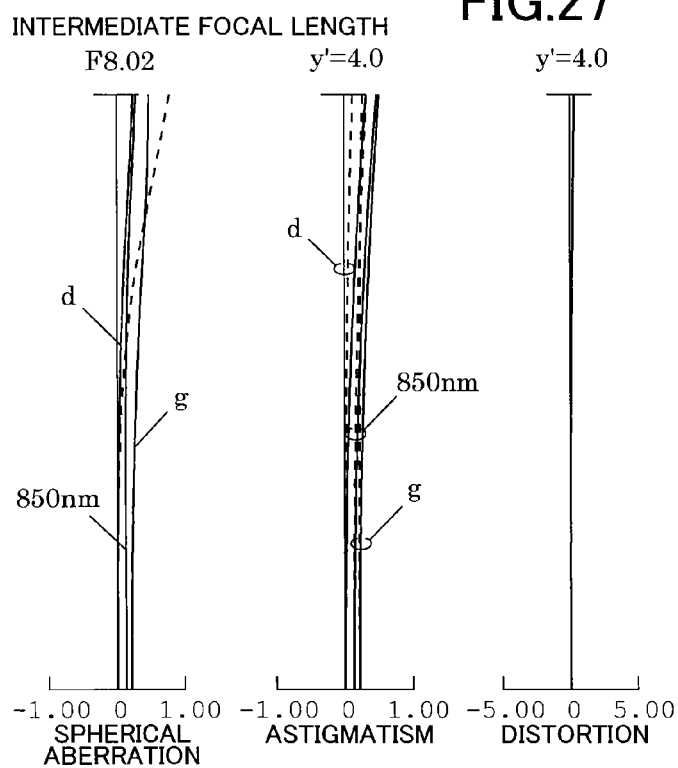
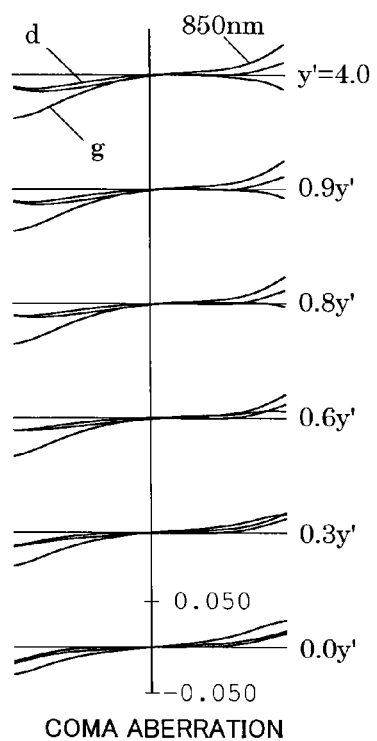
INTERMEDIATE FOCAL LENGTH

FIG.32
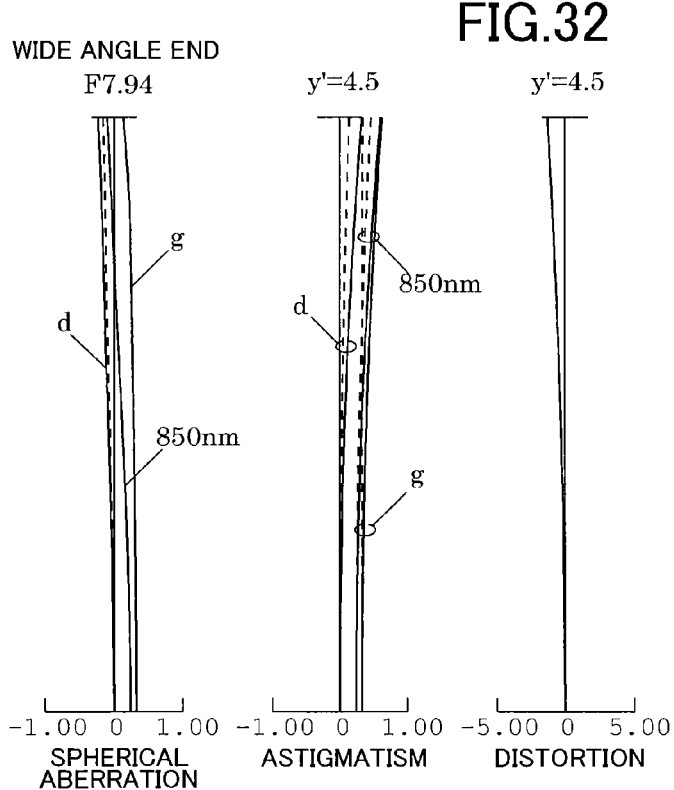
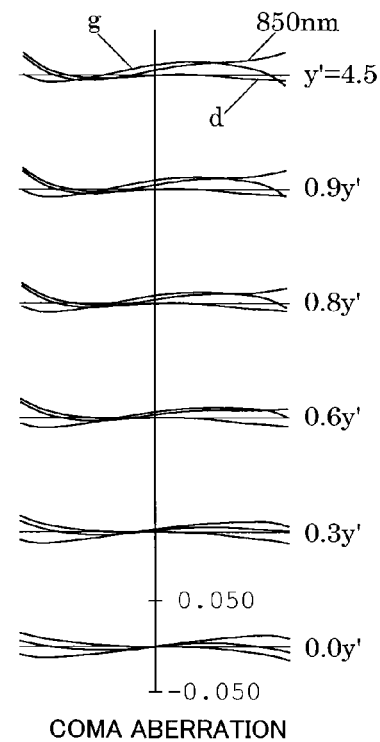
FIG.33
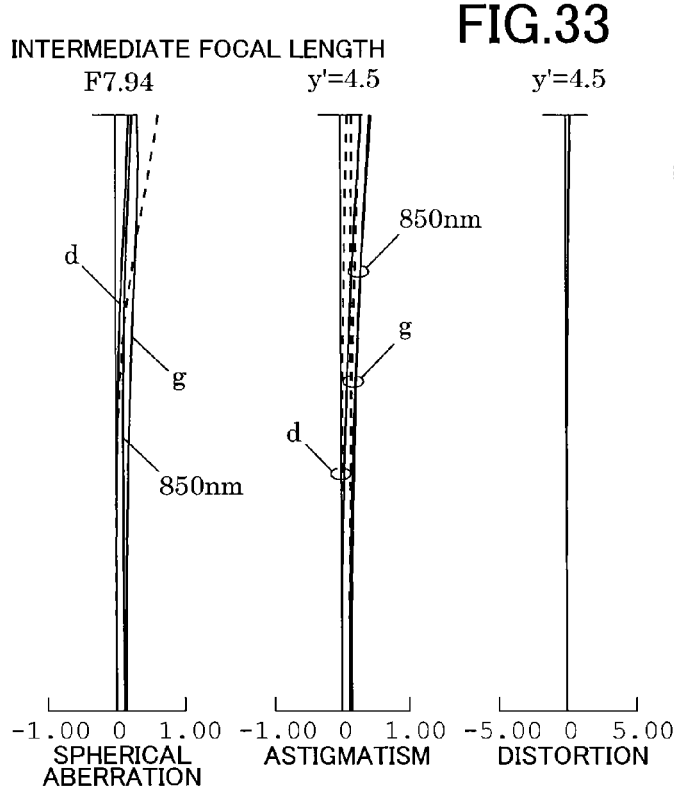
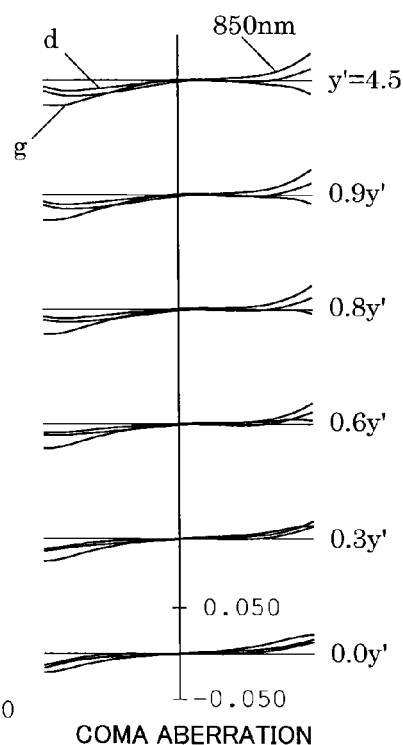

FIG.35
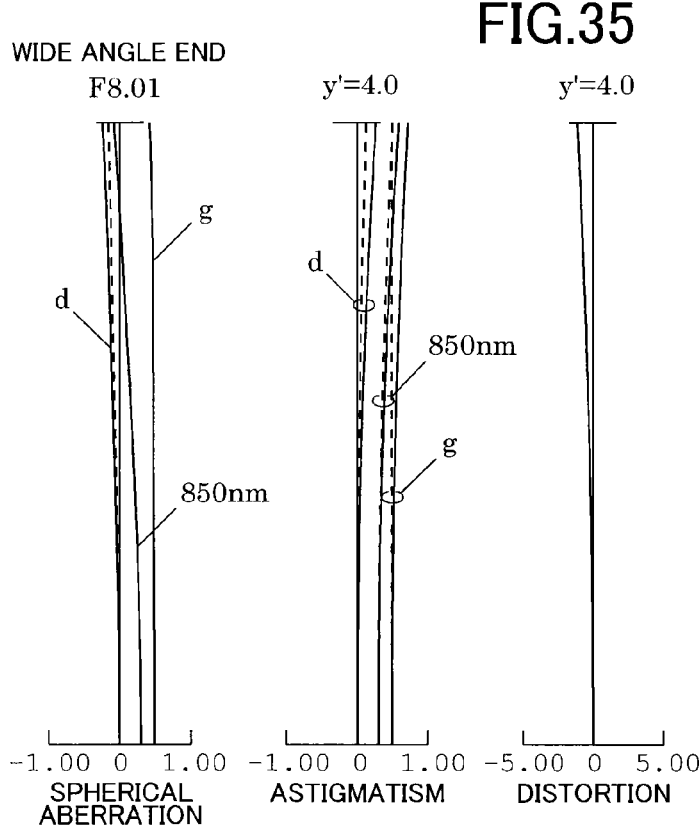
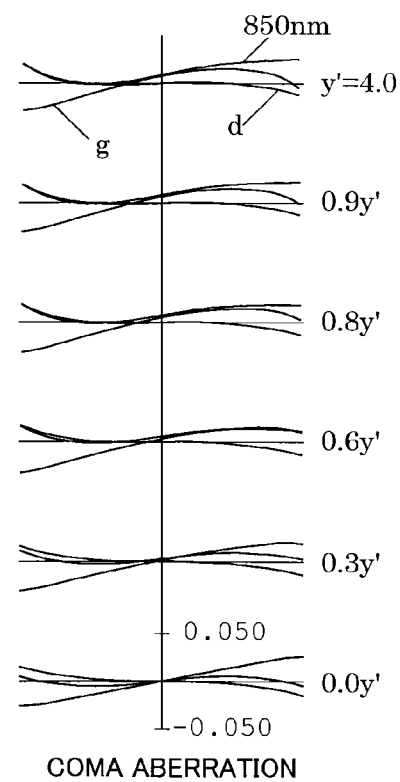
FIG.36
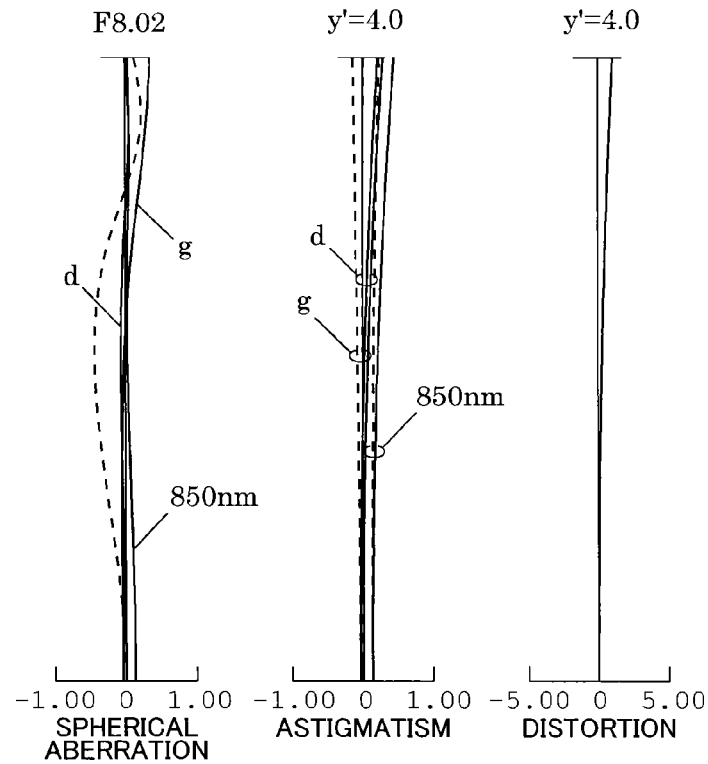
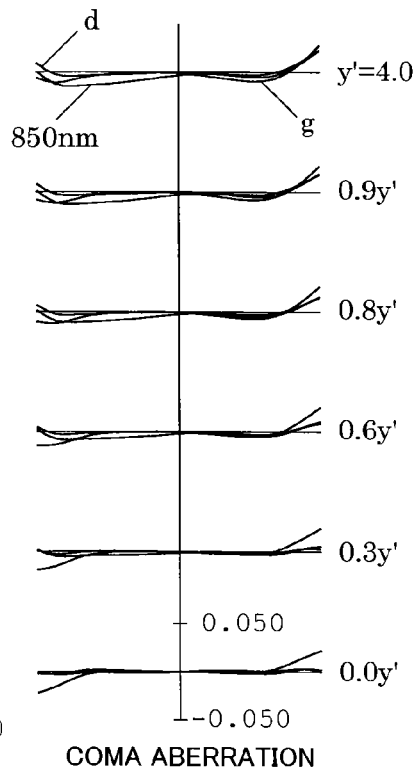

FIG.38
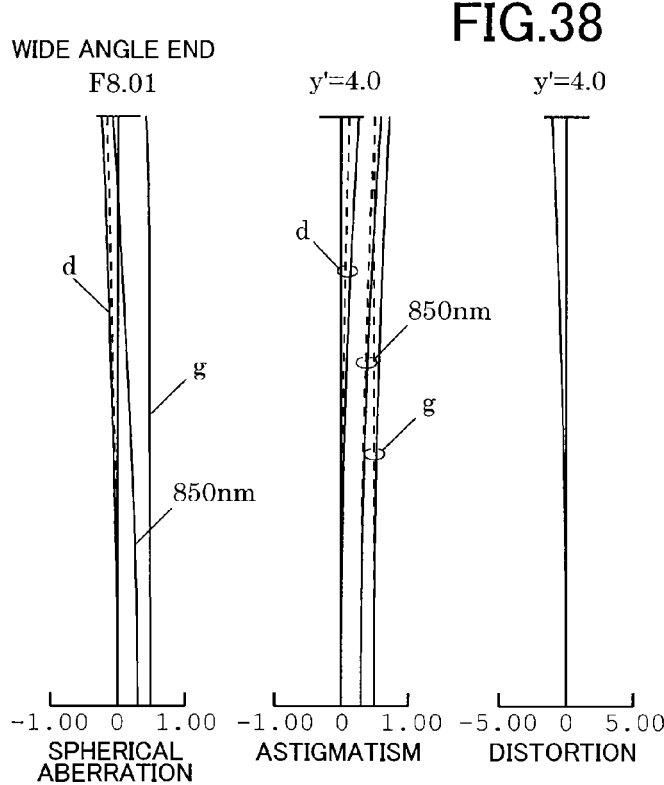
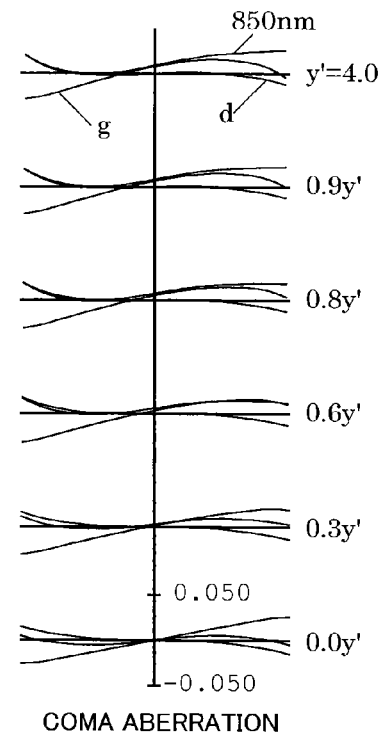
FIG.39
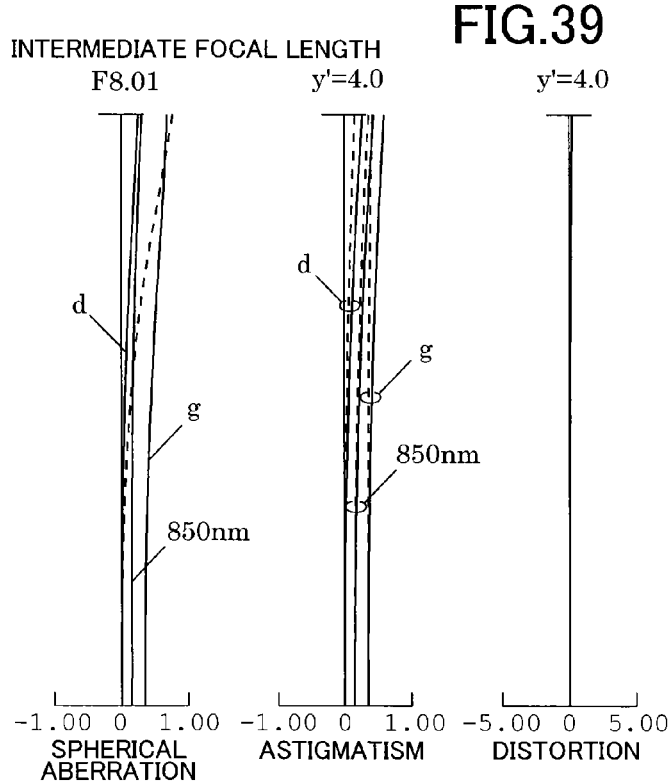
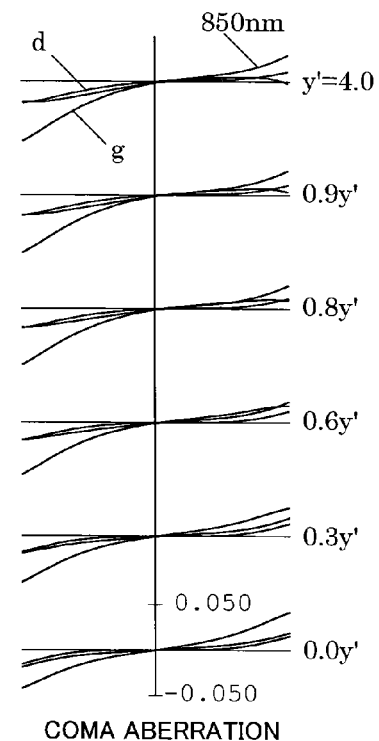

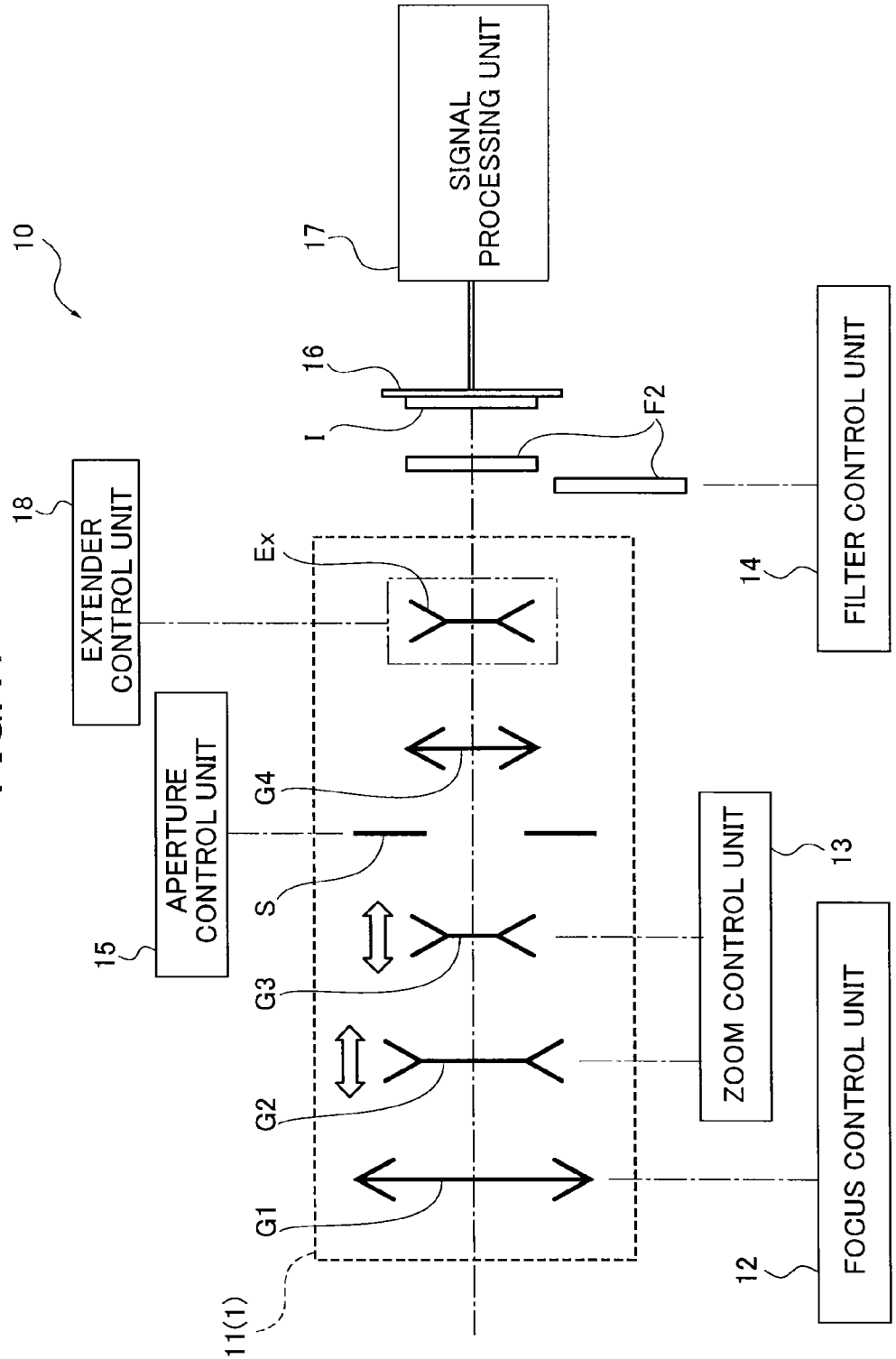

ZOOM LENS AND IMAGING DEVICE USING THE SAME

PRIORITY CLAIM

The present application is based on and claims priority from Japanese Patent Application No. 2014-012824, filed on Jan. 27, 2014, and Japanese Patent Application No. 2014-012831, filed on Jan. 27, 2014, the disclosures of which are hereby incorporated by reference in their entirety.

BACKGROUND

Field of the Invention

The present invention relates to a zoom lens used in a TV camera, a video camera and a digital camera, and used particularly for the purpose of monitoring, and also relates to an imaging device using the zoom lens.

Description of the Related Art

There are wide-ranging demands from users for TV cameras and video cameras. Especially, high image quality and compact size are always demanded by the users, and much weight is given thereto. Therefore, high performance and compact size are both required also for a zoom lens used in the TV camera or video camera. There are also demands for a zoom lens having as large a variable magnification ratio as possible. For the purpose of relatively long-distance monitoring, a relatively compact zoom lens having a variable magnification ratio exceeding 25 times and close to 30 times is supported by the market as one of the options.

Various types of such a zoom lens have been studied for use in a TV camera and the like. For example, as a zoom lens suitable for high variable magnification, there has been known one including: a first lens group having a positive focal length; a second lens group having a negative focal length; a third lens group having a negative focal length; and a fourth lens group having a positive focal length, the first to fourth lens groups being arranged in this order starting from the object side to the image side, in which, in magnification change, the second and third lens groups are moved so that intervals between the first and second lens groups, between the second and third lens groups and between the third and fourth lens groups are changed (see, e.g., Japanese Patent Application Publication No. 2010-175956).

As this type of zoom lens, there have been proposed one having a diffractive optical element provided in the first lens group (see, e.g., Japanese Patent No. 4928297 (Japanese Patent Application Publication No. 2008-197534)), one using extra-low dispersion glass in the first and fourth lens groups (see, e.g., Japanese Patent No. 5006076 (Japanese Patent Application Publication No. 2008-241884)), and the like.

In many zoom lenses with such a configuration, the second lens group functions as a variator for magnification change and the third lens group functions as a compensator for correcting a shift in image plane position due to magnification change. However, there is also a zoom lens having the third lens group also take charge of part of a magnification change operation for achieving both compact size and high variable magnification. Meanwhile, the fourth lens group takes charge of a main imaging operation as a master group, and the configuration of the fourth lens group is very important for favorably correcting various aberrations and ensuring high imaging performance.

Particularly, a TV camera for monitoring sometimes performs imaging with sensitivity up to near-infrared range having a wavelength of about 900 nm or less. For example, during the day with enough light, an accurate color image is obtained using only visible light while blocking near-infrared light. In a bad weather or in the twilight and dawn, an amount of light is earned by transmitting all the light from the visible range to near-infrared range. During the night, infrared having a wavelength of about 850 nm is projected and irradiated while blocking the visible light.

Thus, for a zoom lens used as a photographing lens, it is required to correct chromatic aberrations not only in the visible range but also in the near-infrared range. This is because, when chromatic aberrations up to the near-infrared range are not corrected, there arises a need for refocusing in switching between visible light and near-infrared light. Moreover, sufficient resolving power cannot be obtained when the zoom lens is used in a manner to transmit all the light from the visible range to near-infrared range.

Japanese Patent Application Publication No. 2010-175956 aims at favorable aberration correction by devising the configuration of the fourth lens group. However, in the zoom lens disclosed in Japanese Patent Application Publication No. 2010-175956, while good imaging performance is achieved in the visible range, aberrations up to the near-infrared range are not corrected. Moreover, the variable magnification ratio tops out at about 10 times.

On the other hand, the zoom lens disclosed in Japanese Patent No. 4928297 (Japanese Patent Application Publication No. 2008-197534) uses the diffractive optical element in the first lens group and performs chromatic aberration correction using negative dispersion of the diffractive optical element. However, again, only the visible range is considered and no aberrations up to the near-infrared range are corrected. Moreover, as for a zoom lens having a variable magnification ratio exceeding 25 times, a telephoto ratio (a ratio of the overall length of the lens to the focal length) at a telephoto end is as large as around 1.0. Thus, sufficient reduction in size is not achieved.

Meanwhile, in the zoom lens disclosed in Japanese Patent No. 5006076 (Japanese Patent Application Publication No. 2008-241884), aberrations up to the near-infrared range are corrected using the extra-low dispersion glass in the first lens group with a large axial marginal ray height on the telephoto side as well as in the fourth lens group with a large axial marginal ray height on the wide angle side. However, the variable magnification ratio is about 22 times, which is smaller than 25 times.

SUMMARY

The present invention has been made in consideration of the above problems. It is an object of the present invention to provide a high-magnification zoom lens capable of favorable aberration correction.

In order to achieve the above object, a zoom lens according to the present application includes: a first lens group having positive refractive power; a second lens group having negative refractive power; a third lens group having negative refractive power; and a fourth lens group having positive refractive power, the first to fourth lens groups being arranged in the order starting from an object side to an image plane side, in which, in magnification change, the second and third lens groups are moved so that intervals between the first and second lens groups, between the second and third lens groups and between the third and fourth lens groups are changed. The fourth lens group includes, in the order starting from the side closest to the image plane to the object side, a first positive lens, a first negative lens, a second negative lens and a second positive lens. When an Abbe number vd is a value obtained by (nd−1)/(ng−nC) where a refractive index relative to d-line is nd, a refractive index relative to g-line is ng, and a refractive index relative to C-line is nC, in terms of a material that forms the lenses, and when the Abbe number of the first positive lens is $vd_{P1}$ and the Abbe number of the first negative lens is $vd_{N1}$, the following conditional expression (1) is satisfied.

$$-40 < vd_{P1} - vd_{N1} < 0 \quad (1)$$

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIG. 1 is a cross-sectional view showing a configuration of a zoom lens and a zoom trajectory associated with magnification change in a wide angle end state, an intermediate focal length state, and a telephoto end state according to Example 1.

FIG. 2 is a cross-sectional view showing a configuration of a zoom lens and a zoom trajectory associated with magnification change in a wide angle end state, an intermediate focal length state, and a telephoto end state according to Example 2.

FIG. 3 is a cross-sectional view showing a configuration of a zoom lens and a zoom trajectory associated with magnification change in a wide angle end state, an intermediate focal length state, and a telephoto end state according to Example 3.

FIG. 4 is a cross-sectional view showing a configuration of a zoom lens and a zoom trajectory associated with magnification change in a wide angle end state, an intermediate focal length state, and a telephoto end state according to Example 4.

FIG. 5 is a cross-sectional view showing a configuration of a zoom lens and a zoom trajectory associated with magnification change in a wide angle end state, an intermediate focal length state, and a telephoto end state according to Example 5.

FIG. 6 is an aberration curve diagram at a wide angle end of the zoom lens according to Example 1.

FIG. 7 is an aberration curve diagram at an intermediate focal length of the zoom lens according to Example 1.

FIG. 8 is an aberration curve diagram at a telephoto end of the zoom lens according to Example 1.

FIG. 9 is an aberration curve diagram at a wide angle end of the zoom lens according to Example 2.

FIG. 10 is an aberration curve diagram at an intermediate focal length of the zoom lens according to Example 2.

FIG. 12 is an aberration curve diagram at a wide angle end of the zoom lens according to Example 3.

FIG. 13 is an aberration curve diagram at an intermediate focal length of the zoom lens according to Example 3.

FIG. 15 is an aberration curve diagram at a wide angle end of the zoom lens according to Example 4.

FIG. 16 is an aberration curve diagram at an intermediate focal length of the zoom lens according to Example 4.

FIG. 18 is an aberration curve diagram at a wide angle end of the zoom lens according to Example 5.

FIG. 19 is an aberration curve diagram at an intermediate focal length of the zoom lens according to Example 5.

FIG. 20 is an aberration curve diagram at a telephoto end of the zoom lens according to Example 5.

FIG. 21 is a cross-sectional view showing a configuration of a zoom lens (including an extender lens group) and a zoom trajectory associated with magnification change in a wide angle end state, an intermediate focal length state, and a telephoto end state according to Example 6.

FIG. 22 is a cross-sectional view showing a configuration of a zoom lens (including an extender lens group) and a zoom trajectory associated with magnification change in a wide angle end state, an intermediate focal length state, and a telephoto end state according to Example 7.

FIG. 23 is a cross-sectional view showing a configuration of a zoom lens (including an extender lens group) and a zoom trajectory associated with magnification change in a wide angle end state, an intermediate focal length state, and a telephoto end state according to Example 8.

FIG. 24 is a cross-sectional view showing a configuration of a zoom lens (including an extender lens group) and a zoom trajectory associated with magnification change in a wide angle end state, an intermediate focal length state, and a telephoto end state according to Example 9.

FIG. 26 is an aberration curve diagram at a wide angle end of the zoom lens (including the extender lens group) according to Example 6.

FIG. 27 is an aberration curve diagram at an intermediate focal length of the zoom lens (including the extender lens group) according to Example 6.

FIG. 32 is an aberration curve diagram at a wide angle end of the zoom lens (including the extender lens group) according to Example 8.

FIG. 33 is an aberration curve diagram at an intermediate focal length of the zoom lens (including the extender lens group) according to Example 8.

FIG. 35 is an aberration curve diagram at a wide angle end of the zoom lens (including the extender lens group) according to Example 9.

FIG. 36 is an aberration curve diagram at an intermediate focal length of the zoom lens (including the extender lens group) according to Example 9.

FIG. 38 is an aberration curve diagram at a wide angle end of the zoom lens (including the extender lens group) according to Example 10.

FIG. 39 is an aberration curve diagram at an intermediate focal length of the zoom lens (including the extender lens group) according to Example 10.

FIG. 41 is an explanatory diagram schematically showing an imaging device according to Example 11.

DETAILED DESCRIPTION OF THE PREFERRED EMBODIMENTS

Figure 11:
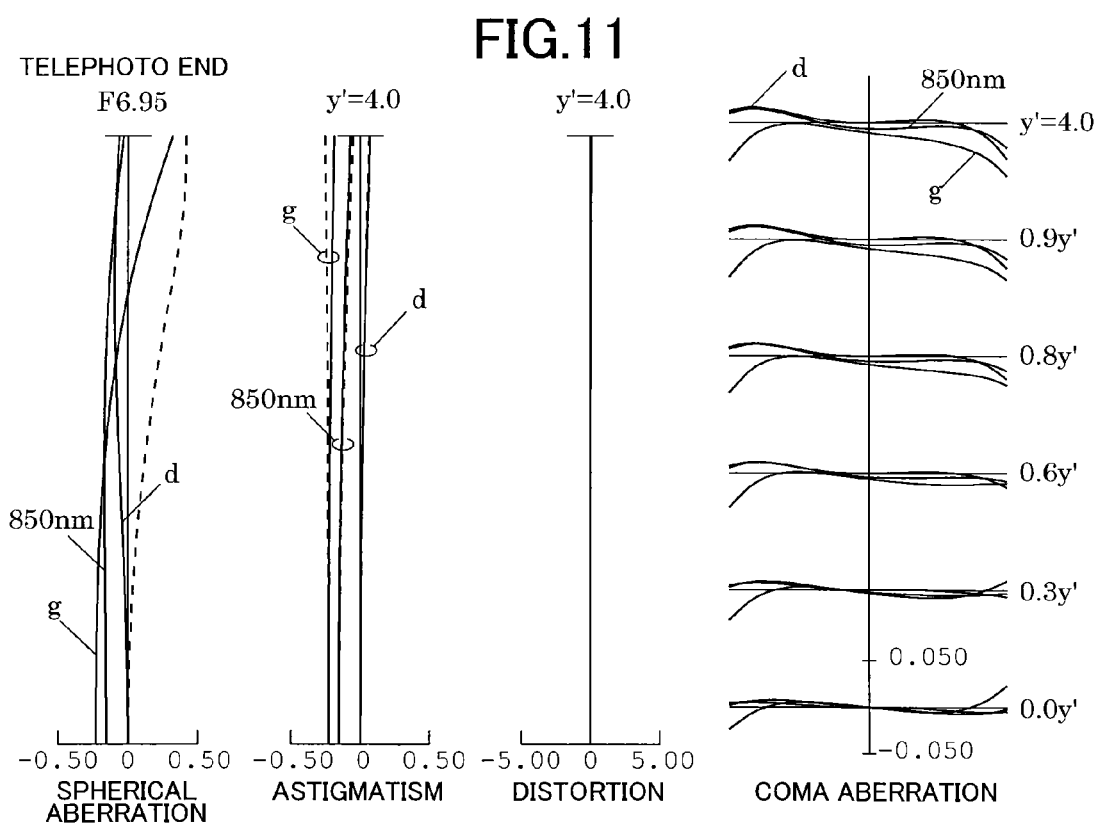
FIG. 11 is an aberration curve diagram at a telephoto end of the zoom lens according to Example 2.

With reference to the drawings, description is given of an embodiment of a zoom lens according to the present invention. As shown in FIGS. 1 to 5 and FIGS. 21 to 25, a zoom lens 1 according to the embodiment of the present invention includes: a first lens group G1 having positive refractive power; a second lens group G2 having negative refractive power; a third lens group G3 having negative refractive power; and a fourth lens group G4 having positive refractive power, which are arranged in the order starting from the object side to the side of an image plane I. In magnification change, the second and third lens groups G2 and G3 are moved so that intervals between the first and second lens groups G1 and G2, between the second and third lens groups G2 and G3 and between the third and fourth lens groups G3 and G4 are changed.

In the zoom lens 1 including the four positive, negative, negative and positive lens groups, as in the embodiment of the present invention, the second lens group G2 is generally configured as a so-called variator, which takes charge of main magnification change action, and the third lens group G3 can also take charge of part of the magnification change action. Thus, the zoom lens 1 is suitable for high variable magnification.

Moreover, the zoom lens 1 shown in FIGS. 21 to 25 includes an extender lens group Ex, which is detachably provided at the image side of the fourth lens group G4 and shifts the focal length of the whole system to the longer side without changing the distance between the image plane I and each of the first to fourth lens groups G1 to G4. By the extender lens group Ex detachably provided at the image side of the fourth lens group G4, the focal length of the whole system is shifted to the longer side without changing the distance between the image plane I and each of the first to fourth lens groups G1 to G4. The reason for adopting such a configuration is to include the extender lens group Ex in the zoom lens 1. On the other hand, with a configuration in which the distance between the image plane and each of the first to fourth lens groups is changed by attachment and detachment of the extender lens group, the first to fourth lens groups need to be moved to maintain a focusing state along with the attachment and detachment of the extender lens group. This is not preferable since a highly complex mechanism is required. In addition, in the embodiment of the present invention, the extender lens group Ex is provided at the image side of the fourth lens group G4 rather than in the middle of the fourth lens group G4. This makes it easy to maintain the assembly accuracy of the fourth lens group G4.

Furthermore, in the zoom lens 1 according to the embodiment of the present invention, as shown in FIG. 1, for example, the fourth lens group G4 that takes charge of a main imaging operation includes, in the order starting from the side closest to the image plane I to the object side, a first positive lens L46, a first negative lens L45, a second negative lens L44 and a second positive lens L43. Note that the positive lens is a lens having positive refractive power, while the negative lens is a lens having negative refractive power.

The fourth lens group G4 normally has an aperture stop S in the vicinity of the side closest to the object. Thus, in an image-side portion of the fourth lens group G4, principal rays directed to a center part and a peripheral part of an imaging plane (image plane I) pass while relatively separating from each other, thereby enabling correction of off-axis aberration. By adopting the positive-negative-negative-positive lens arrangement as described above in this portion, the off-axis aberration such as astigmatism, coma aberration and chromatic aberration of magnification can be sufficiently reduced while balancing with spherical aberration and axial chromatic aberration, which are on-axis aberrations.

Furthermore, in the zoom lens 1 according to the embodiment of the present invention, the fourth lens group G4 has a configuration that satisfies the following conditional expression (1). In the following conditional expression (1), $vd_{P1}$ represents an Abbe number of the first positive lens L46 and $vd_{N1}$ represents an Abbe number of the first negative lens L45 in the fourth lens group G4. Note that the Abbe number vd is a value obtained by (nd−1)/(ng−nC) when a refractive index relative to d-line is nd, a refractive index relative to g-line is ng, and a refractive index relative to C-line is nC, in terms of a material that forms the lenses.

$$-40 < vd_{P1} - vd_{N1} < 0 \qquad (1)$$

It is one of the objects of the present invention to correct chromatic aberrations from visible range to near-infrared range. Thus, the present invention requires an idea slightly different from chromatic aberration correction only in the visible range. The above conditional expression (1) represents that the first negative lens L45 has lower dispersion than the first positive lens L46 in the fourth lens group G4 having positive refractive power as a whole. By providing a lens pair having characteristics that satisfy conditional expression (1) on the side of the fourth lens group G4, that is closest to the image plane I, axial chromatic aberration and chromatic aberration of magnification from visible range to near-infrared range can be favorably corrected.

Here, if $vd_{P1} - vd_{N1}$ is not more than −40, the axial chromatic aberration is not sufficiently corrected as a whole. Also, the chromatic aberration of magnification in the near-infrared range is generated on the positive side at the wide angle end, and the chromatic aberration of magnification of g-line is generated on the negative side at the telephoto end, which is not preferable. On the other hand, if $vd_{P1} - vd_{N1}$ is not less than 0, the axial chromatic aberration is excessively corrected as a whole. Also, the chromatic aberration of magnification of g-line is generated on the positive side at the wide angle end, and the chromatic aberration of magnification in the near-infrared range is generated on the negative side at the telephoto end, which is, again, not preferable.

In the zoom lens 1 including the extender lens group Ex, the focal length is further shifted to the longer side by the extender lens group Ex. Therefore, aberrations generated when the extender lens group Ex is not attached need to be favorably corrected.

For this reason, when the above conditional expression (1) is satisfied, it is more preferable to satisfy the following conditional expression (1'). Accordingly, a good correction effect can be ensured for the axial chromatic aberration and chromatic aberration of magnification from visible range to near-infrared range.

$$-30 < vd_{P1} - vd_{N1} < -10 \quad (1')$$

With the configuration as described above, the zoom lens 1 according to the embodiment of the present invention can be provided, which has a variable magnification ratio exceeding 25 times and includes a small number of lenses. The zoom lens 1 is also light and small with a telephoto ratio (a ratio of the overall length of the lens to the focal length) of less than 0.60. Moreover, the zoom lens 1 realizes favorable correction of chromatic aberrations from visible range to near-infrared range, and has a resolving power compatible with an imaging device with two million pixels or more.

FIG. 41 shows an imaging device 10 according to the embodiment of the present invention, including the zoom lens 1 described above as a photographing optical system. As for the imaging device 10, the use of the zoom lens 1 as described above can realize a sufficiently small and light imaging device with high variable magnification and high image quality, which suppresses focus shift and image degradation from visible range to near-infrared range.

Moreover, in the zoom lens 1 according to the embodiment of the present invention, for more favorable correction of monochromatic aberrations, it is preferable that the fourth lens group G4 further satisfies the following conditional expression (2). In the following conditional expression (2), $R_{N21}$ represents a curvature radius of an image-side surface of the second negative lens L44, and $R_{N10}$ represents a curvature radius of an object-side surface of the first negative lens L45.

$$-2.0 < (R_{N21} + R_{N10})/(R_{N21} - R_{N10}) < 0.0 \quad (2)$$

Here, when $(R_{N21} + R_{N10})$ $(R_{N21} - R_{N10})$ is not more than −2.0, the refractive power of the image-side surface of the second negative lens L44 becomes relatively too strong. As a result, a large spherical aberration is likely to be generated in an over direction, or an introversive coma aberration is likely to remain, which is not preferable. On the other hand, when $(R_{N21} + R_{N10})$ $(R_{N21} - R_{N10})$ is not less than 0.0, the refractive power of the object-side surface of the first negative lens L45 becomes relatively too strong. As a result, astigmatism is likely to be generated, or coma aberration around a pupil is likely to be disturbed, which is not preferable.

By satisfying the above conditional expression (2), the configuration of the fourth lens group G4 that takes charge of the main imaging operation is optimized. Thus, the zoom lens 1 capable of better monochromatic aberration correction can be provided. Moreover, the use of the zoom lens 1 can realize an imaging device with higher image quality.

Furthermore, in the zoom lens according to the embodiment of the present invention, it is preferable that the fourth lens group G4 includes two positive lenses L41 and L42 on the object side of the second positive lens L43, as shown in FIG. 1, for example, and satisfies the following conditional expression (3). In the following conditional expression (3), $vd_{4GP}$ represents the average value of the Abbe numbers of materials that form the three lenses including the second positive lens L43 and the two positive lenses L41 and L42.

$$75 < vd_{4GP} < 96 \quad (3)$$

By satisfying the above conditional expression (3), the configuration of the fourth lens group G4 that takes charge of the main imaging operation is further optimized. Thus, the zoom lens 1 capable of better correction of chromatic aberrations particularly in a wide angle region of the variable magnification range can be provided. Moreover, the use of the zoom lens 1 can realize a user-friendly imaging device with higher image quality.

Besides the above, it is preferable that at least one of the second positive lens L43 and the two positive lenses L41 and L42 satisfies the following conditional expressions (4) and (5). In the following conditional expressions (4) and (5), vd represents the Abbe number of the material that forms the positive lens, and $\theta_{C,A'}$ represents a partial dispersion ratio of the material that forms the positive lens. Here, the partial dispersion ratio $\theta_{C,A'}$ is a value obtained by (nC−nA')/(nF−nC) when a refractive index relative to F-line is nF, a refractive index relative to C-line is nC, and a refractive index relative to A'-line is nA', in terms of the material that forms the positive lens.

$$75 < vd < 96 \quad (4)$$

$$\theta_{C,A'} < 0.000667 \cdot vd + 0.300 \quad (5)$$

As described above, at least one of the positive lenses (L41, L42 and L43) disposed close to the object side in the fourth lens group G4 is formed of the material that satisfies the above conditional expressions (4) and (5). Thus, the chromatic aberrations including the near-infrared region can be more favorably corrected in the wide angle region of the variable magnification range. Moreover, the configuration of the fourth lens group G4 that takes charge of the main imaging operation is further optimized. The use of the zoom lens 1 capable of better chromatic aberration correction can realize a user-friendly imaging device with higher image quality.

Note that it is preferable that the first positive lens L46 and the first negative lens L45 are joined and the second negative lens L44 and the second positive lens L43 are joined in the fourth lens group G4. On each of the lens surfaces within the fourth lens group G4, large aberrations are handled to reduce a final aberration amount, often resulting in increased manufacturing error sensitivity. Therefore, by joining the first positive lens L46 and the first negative lens L45 and joining the second negative lens L44 and the second positive lens L43, substantial manufacturing error sensitivity is reduced, and thus stable performance can be easily obtained. This also leads to reduction in the number of parts of a lens barrel that actually holds the lenses. Moreover, the use of the zoom lens 1 having high productivity by suppressing the manufacturing error sensitivity can realize an imaging device capable of favorable representation without any variations.

Furthermore, it is preferable that the zoom lens 1 according to the embodiment of the present invention satisfies the following conditional expression (6) for the arrangement of the fourth lens group G4. In the following conditional expression (6), $L_4$ represents a distance along an optical axis from the plane closest to the object side to the plane closest to the image side in the fourth lens group G4. $T_{4F-I}$ represents a distance along the optical axis from the plane closest to the object side to the image plane I in the fourth lens group G4, and, if an optical element having no refractive power is included on the side closer to the image than the fourth lens group G4, represents an air equivalent length on the assumption that the optical element does not exist.

$$0.2 < L_4/T_{4F-I} < 0.5 \quad (6)$$

By satisfying the above conditional expression (6), the zoom lens 1 can be provided, which has the fourth lens group G4 appropriately arranged with respect to the image plane I, and can achieve higher performance while ensuring sufficient back focus. Moreover, the use of the zoom lens 1 can realize an imaging device having high image quality with realistic arrangement of a filter switching mechanism and the like.

Here, when $L_4/T_{4F-I}$ is not more than 0.2, the degree of freedom of the configuration of the fourth lens group G4 is impaired, which may make it difficult to correct various aberrations and is thus not preferable. On the other hand, when $L_4/T_{4F-I}$ is not less than 0.5, a sufficient space cannot be secured between the fourth lens group G4 and the image plane I. As a result, the degree of freedom of the configuration of the extender lens group Ex is impaired, leading to insufficient correction of various aberrations. Moreover, there arises a problem in providing a switching mechanism such as an infrared light blocking filter and a visible light blocking filter, or ghost is likely to be generated by reflection of each plane or filter in the fourth lens group G4 or the extender lens group Ex, which is not preferable.

Note that, when the above conditional expression (6) is satisfied, it is more preferable to satisfy the following conditional expression (6'). Accordingly, sufficient back focus and higher performance can be further ensured.

$$0.2 < L_4/T_{4F-I} < 0.4 \tag{6'}$$

In the zoom lens 1 according to the embodiment of the present invention, it is preferable that the first lens group G1 includes, in the order starting from the object side to the image plane I side, a negative meniscus lens L11 with a concave surface directed to the image side, a positive lens L12 with a convex surface directed to the object side, the convex surface having a smaller absolute value of a curvature radius than on the image side, and a positive lens L13 with a convex surface directed to the object side, the convex surface having a smaller absolute value of a curvature radius than on the image side, and that the first lens group G1 includes a diffractive optical element, as shown in FIG. 1, for example. With this configuration, chromatic aberrations particularly in the telephoto region can be more favorably corrected. Thus, the zoom lens 1 of the present invention can be further realized. Moreover, the use of the zoom lens 1 as described above can realize a small and light imaging device with high variable magnification and high image quality, which suppresses focus shift and image degradation from visible range to near-infrared range.

Here, trying to achieve high variable magnification, particularly, to increase the focal length at the telephoto end makes it difficult to correct a secondary spectrum of the axial chromatic aberration on the telephoto side. The difficulty is further increased when trying to correct chromatic aberrations not only in the visible range but also in the near-infrared range. The configuration of the first lens group G1 with an axial marginal ray height that is increased on the telephoto side is important for axial chromatic aberration correction in the telephoto range. Thus, with such a configuration of the first lens group G1 including the diffractive optical element, even when the chromatic aberration correction is sufficiently performed in the telephoto range including the near-infrared range, the number of the lenses having a large lens diameter, which are included in the first lens group G1, can be suppressed to three. Thus, weight reduction can be achieved.

In the zoom lens 1 having the extender lens group Ex, the focal length is shifted to the longer side by the extender lens group Ex. Thus, the axial chromatic aberrations need to be even more favorably corrected. This is because of the following reason. Specifically, for example, when the magnification (lateral magnification) of the extender lens group Ex is 2, an F-number is doubled, and thus a focal depth is doubled. Since the axial chromatic aberrations are vertical aberrations, squaring is enough, and thus the aberration amount is quadrupled.

When the diffractive optical element is provided in the first lens group G1 as described above, it is preferable to satisfy the following conditional expression (7). In the following conditional expression (7), $f_T$ represents a focal length of the whole system at the telephoto end, and $f_{DOE}$ represents a focal length of a diffraction part of the diffractive optical element.

$$0.01 < f_T/f_{DOE} < 0.05 \tag{7}$$

Again, by satisfying the above conditional expression (7), the chromatic aberrations in the telephoto range can be more favorably corrected. Thus, the zoom lens 1 of the present invention can be further realized. Moreover, the use of the zoom lens 1 as described above can realize a small and light imaging device with high variable magnification and high image quality, which suppresses focus shift and image degradation from visible range to near-infrared range.

Here, when the refractive power of the diffractive optical element is weaker as $f_T/f_{DOE}$ reaches 0.01 or less, it is difficult to perform sufficient correction of the chromatic aberrations in the telephoto range, which is not preferable. On the other hand, when the refractive power of the diffractive optical element is stronger as $f_T/f_{DOE}$ reaches 0.05 or more, the correction of the chromatic aberrations on the telephoto side becomes excessive, which is also not preferable.

Moreover, when the diffractive optical element is provided in the first lens group G1 as described above and when the extender lens group Ex is provided, it is preferable to satisfy the following conditional expression (7-2). In the following conditional expression (7-2), $f_{TC}$ represents a focal length of the whole system at the telephoto end in a state where the extender lens group Ex is attached, and $f_{DOE}$ represents the focal length of the diffraction part of the diffractive optical element.

$$0.02 < f_{TC}/f_{DOE} < 0.10 \tag{7-2}$$

Again, by satisfying the above conditional expression (7-2), the chromatic aberrations particularly in the telephoto range can be more favorably corrected. Thus, the zoom lens 1 of the present invention can be further realized. Moreover, the use of the zoom lens 1 as described above can realize more surely a small and light imaging device with high variable magnification and high image quality, which suppresses focus shift and image degradation from visible range to near-infrared range.

Here, when the refractive power of the diffractive optical element is weaker as $f_T/f_{DOE}$ reaches 0.02 or less, it is difficult to perform sufficient correction of the chromatic aberrations in the telephoto range, which is not preferable. On the other hand, when the refractive power of the diffractive optical element is stronger as $f_T/f_{DOE}$ reaches 0.10 or more, the correction of the chromatic aberrations on the telephoto side becomes excessive, which is also not preferable.

In the zoom lens 1 according to the embodiment of the present invention, the first lens group G1 can also include five lenses, including, in the order starting from the object side to the image plane I side, a negative meniscus lens L11 with a concave surface directed to the image side, a positive lens L12 with a convex surface directed to the object side, the convex surface having a smaller absolute value of a curvature radius than on the image side, a negative meniscus lens L13 with a concave surface directed to the image side, a positive lens L14 with a convex surface directed to the object side, the convex surface having a smaller absolute value of a curvature radius than on the image side, and a positive lens L15 with a convex surface directed to the object side, the convex surface having a smaller absolute value of a curvature radius than on the image side, as shown in FIG. 5, for example.

With this configuration, chromatic aberrations particularly in the telephoto region can be more favorably corrected. Thus, the zoom lens 1 of the present invention can be further realized. Moreover, the use of the zoom lens 1 as described above can realize more surely a small and light imaging device with high variable magnification and high image quality, which suppresses focus shift and image degradation from visible range to near-infrared range. Furthermore, in this case, the diffractive optical element is no longer required in the first lens group G1, leading to an advantage of not having to consider unnecessary secondary diffracted light due to wavelength dependence of the diffractive optical element, a flare attributable to the structure of the diffractive optical element, and the like.

Moreover, in the zoom lens 1 according to the embodiment of the present invention, it is preferable that the first lens group G1 and the fourth lens group G4 are fixed to the image plane I during magnification change.

The zoom lens 1 for TV camera or video camera is desired to have constant overall length and have unchanging weight balance during magnification change. This can be realized by adopting a configuration in which the first lens group G1 and the fourth lens group G4 are not moved. Moreover, in terms of mechanism, it is advantageous that the number of moving groups (movable lens groups) is small. This leads to reduction in weight and in the number of parts, and to reliability improvement. With such a configuration, the high-performance zoom lens 1 with excellent operability can be provided, in which the movable lens groups are limited during magnification change and the weight balance is less likely to be disturbed without change in overall length. Moreover, the use of the zoom lens 1 as described above can realize a user-friendly, highly reliable imaging device.

Furthermore, in the zoom lens 1 according to the embodiment of the present invention, it is preferable that the positive lenses included in the first lens group G1 satisfy the following conditional expression (8). In the following conditional expression (8), $vd_{1GP}$ represents the average value of the Abbe numbers of materials that form the positive lenses included in the first lens group G1.

$$75 < vd_{1GP} < 96 \tag{8}$$

By satisfying the above conditional expression (8), the chromatic aberrations in the telephoto range can be more favorably corrected. Here, when $vd_{1GP}$ is 75 or less, the chromatic aberration correction in the telephoto range becomes insufficient, which is not preferable. Meanwhile, a material having $vd_{1GP}$ of 96 or more does not exist or, even if it does, is very rare and expensive, which is not realistic. Note that, also when another chromatic aberration correction device is used, such as providing a diffractive optical element in the first lens group G1, it is preferable to satisfy the conditional expression (8) if it is required to perform advanced chromatic aberration correction including the near-infrared range.

Note that, when the above conditional expression (8) is satisfied, it is more preferable to satisfy the following conditional expression (8'). Accordingly, favorable correction of chromatic aberrations in the telephoto range can be further ensured.

$$80 < vd_{1GP} < 96 \tag{8'}$$

Moreover, in the zoom lens 1 according to the embodiment of the present invention, it is preferable that at least one of the positive lenses included in the first lens group G1 satisfies the following conditional expressions (9) and (10). In the following conditional expressions (9) and (10), vd represents the Abbe number of the material that forms the positive lens, and $\theta_{C,A'}$ represents a partial dispersion ratio of the material that forms the positive lens. Here, the partial dispersion ratio $\theta_{C,A'}$ is a value obtained by (nC−nA')/(nF−nC) when a refractive index relative to F-line is nF, a refractive index relative to C-line is nC, and a refractive index relative to A'-line is nA', in terms of the material that forms the positive lens.

$$75 < vd < 96 \tag{9}$$

$$\theta_{C,A'} < 0.000667 \cdot vd + 0.300 \tag{10}$$

By providing the positive lens that satisfies the above conditional expressions (9) and (10) in the first lens group G1, the chromatic aberrations including the near-infrared range can be more favorably corrected in the telephoto region of the variable magnification range.

Moreover, it is preferable that the refractive powers of the lens groups G1 to G4 satisfy the following conditional expressions (11) to (14), respectively. In the following conditional expressions (11) to (14), $f_1$ represents a focal length of the first lens group G1, $f_2$ represents a focal length of the second lens group G2, $f_3$ represents a focal length of the third lens group G3, $f_4$ represents a focal length of the fourth lens group G4, and $f_W$ represents a focal length of the whole system at the wide angle end.

$$6.0 < f_1/f_W < 12.0 \tag{11}$$

$$-5.0 < f_2/f_W < -2.0 \tag{12}$$

$$-4.5 < f_3/f_W < -1.5 \tag{13}$$

$$1.5 < f_4/f_W < 4.5 \tag{14}$$

By setting the refractive power of the each of the lens groups G1 to G4 within the range of each of the conditional expressions (11) to (14), the lenses become more suitable for the zoom lens 1 which has a variable magnification ratio exceeding 25 times and a half field angle of about 0.5 degrees at the telephoto end.

Moreover, in the zoom lens 1 according to the embodiment of the present invention, it is preferable that the extender lens group Ex includes, in the order starting from the object side to the image plane I side, an extender lens front group Ex1 having a positive lens L51, a positive lens L52 and a negative lens L53 and an extender lens rear group Ex2 having a positive lens L54 and a negative lens L55, as shown in FIG. 21, for example.

The extender lens front group Ex1 has positive refractive power as a whole, while the extender lens rear group Ex2 has negative refractive power as a whole. With this configuration, the focal length of the whole system can be shifted to the longer side without changing the distance between the image plane I and each of the first to fourth lens groups G1 to G4. Furthermore, by using multiple lenses to configure the extender lens front group Ex1 and the extender lens rear group Ex2, aberration correction of the extender lens group Ex can be more favorably performed.

Moreover, it is preferable that the refractive power of the extender lens group Ex satisfies the following conditional expression (15). In the following conditional expression (15), $f_E$ represents a focal length of the extender lens group Ex, and $f_W$ represents the focal length of the whole system at the wide angle end.

$$-2.5 < f_E/f_W < -0.7 \quad (15)$$

By setting the refractive power of the extender lens group Ex within the range of the above conditional expression (15), the lenses become more suitable for a built-in extender lens of about double power.

Moreover, in the zoom lens 1 according to the embodiment of the present invention, various methods are conceivable for focusing to a limited distance. The easiest method is to move the first lens group G1.

EXAMPLES

With reference to the drawings, examples of the present invention are described below. FIGS. 1 to 5 are cross-sectional views showing a configuration of a zoom lens 1 and a zoom trajectory according to Examples 1 to 5. The zoom lens 1 according to Examples 1 to 5 includes, in the order starting from the object side to the side of an image plane I, a first lens group G1 having positive refractive power, a second lens group G2 having negative refractive power, a third lens group G3 having negative refractive power, and a fourth lens group G4 having positive refractive power.

FIGS. 21 to 25 are cross-sectional views showing a configuration of a zoom lens 1 and a zoom trajectory according to Examples 6 to 10. Examples 6 to 10 are examples in a state where an extender lens group Ex is attached to the zoom lens 1 according to Examples 1 to 5 shown in FIGS. 1 to 5. The zoom lens 1 according to Examples 6 to 10 includes, in the order starting from the object side to the side of an image plane I, a first lens group G1 having positive refractive power, a second lens group G2 having negative refractive power, a third lens group G3 having negative refractive power, a fourth lens group G4 having positive refractive power, and a detachable extender lens group Ex.

In the zoom lens 1 according to Examples 1 to 10, during magnification change, the second and third lens groups G2 and G3 are moved so that intervals between the first and second lens groups G1 and G2, between the second and third lens groups G2 and G3 and between the third and fourth lens groups G3 and G4 are changed. FIGS. 1 to 5 and FIGS. 21 to 25 show a movement direction (zoom trajectory) of the second and third lens groups G2 and G3 along an optical axis during the magnification change.

In the zoom lens 1 according to Examples 1 to 4 and Examples 6 to 9 shown in FIGS. 1 to 4 and FIGS. 21 to 24, the first lens group G1 includes, in the order starting from the object side to the image plane I side, a negative meniscus lens L11 with a concave surface directed to the image side, a positive lens L12 with a convex surface directed to the object side, the convex surface having a smaller absolute value of a curvature radius than on the image side, and a positive lens L13 with a convex surface directed to the object side, the convex surface having a smaller absolute value of a curvature radius than on the image side.

Figure 25:
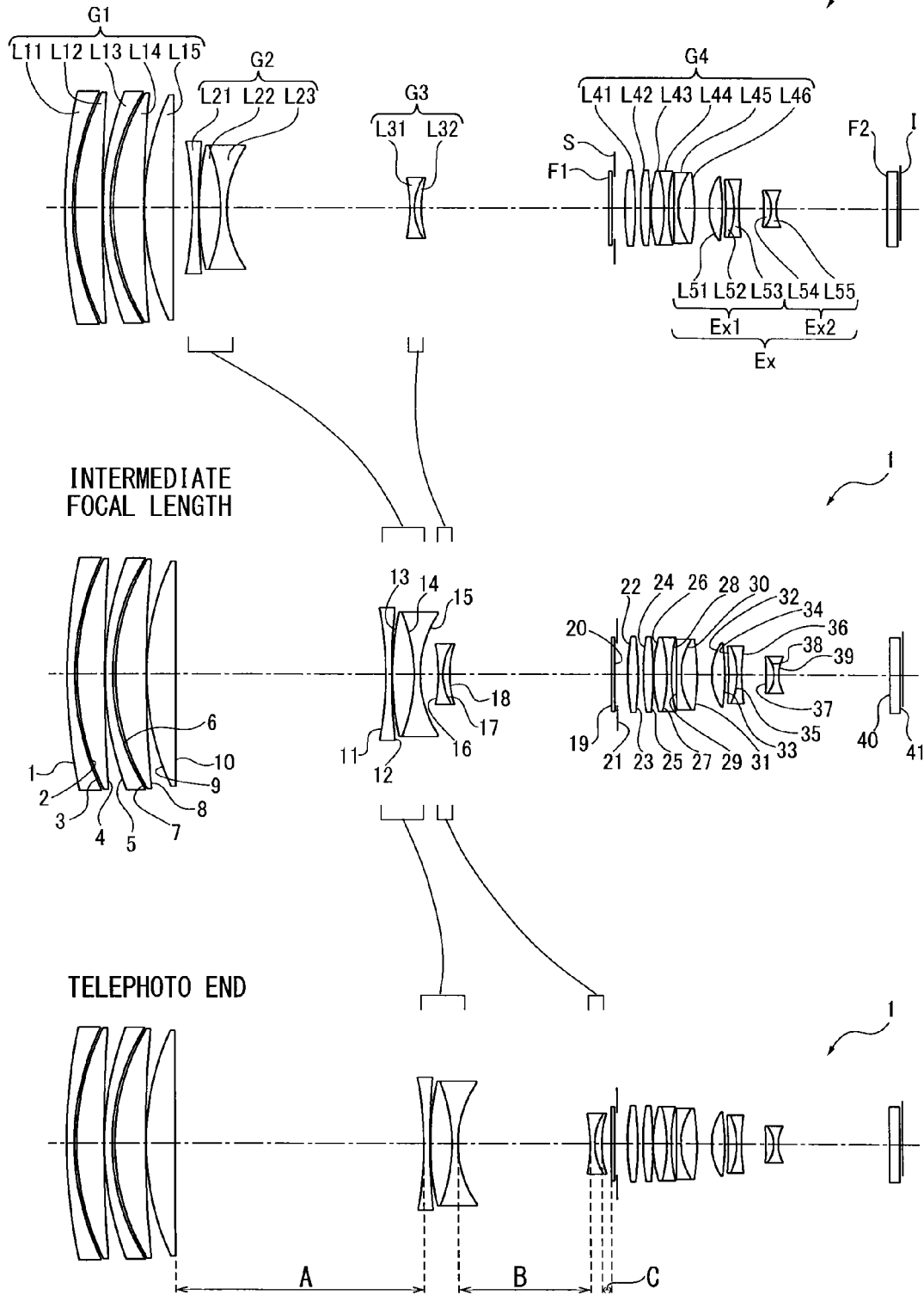
FIG. 25 is a cross-sectional view showing a configuration of a zoom lens (including an extender lens group) and a zoom trajectory associated with magnification change in a wide angle end state, an intermediate focal length state, and a telephoto end state according to Example 10.

In the zoom lens 1 according to Examples 5 and 10 shown in FIGS. 5 and 25, the first lens group G1 includes five lenses including, in the order starting from the object side to the image plane I side, a negative meniscus lens L11 with a concave surface directed to the image side, a positive lens L12 with a convex surface directed to the object side, the convex surface having a smaller absolute value of a curvature radius than on the image side, a negative meniscus lens L13 with a concave surface directed to the image side, a positive lens L14 with a convex surface directed to the object side, the convex surface having a smaller absolute value of a curvature radius than on the image side, and a positive lens L15 with a convex surface directed to the object side, the convex surface having a smaller absolute value of a curvature radius than on the image side.

In each of the examples, the second lens group G2 includes, in the order starting from the object side to the image plane I side, a negative lens L21 and a cemented lens of a positive lens L22 and a negative lens L23. The third lens group G3 includes, in the order starting from the object side to the image plane I side, a cemented lens of a negative lens L31 and a positive lens L32.

The fourth lens group G4 includes, in the order starting from the side closest to the image plane to the object side, a cemented lens of a first positive lens L46 and a first negative lens L45 and a cemented lens of a second negative lens L44 and a second positive lens L43. The fourth lens group G4 further includes two positive lenses L42 and L41 on the object side of the second positive lens L43.

Moreover, the extender lens group Ex includes, in the order starting from the object side to the image plane I side, an extender lens front group Ex1 having a positive lens L51, a positive lens L52 and a negative lens L53 and an extender lens rear group Ex2 having a positive lens L54 and a negative lens L55. Hereinafter, a state where the extender lens group Ex is attached is referred to as "extender lens group Ex included".

A specific numerical example of the zoom lens 1 according to Examples 1 to 5 is described below. Note that a maximum image height y' is 4.0 mm in Examples 1, 2, 4, 5, 6, 7, 9 and 10, and 4.5 mm in Examples 3 and 8. In each of the examples, various filters, such as an optical low-pass filter and an infrared blocking filter, or cover glass (seal glass) of an imaging element such as a CCD sensor is assumed as an optical element F2 formed of parallel flat plates provided on the image plate I side of the fourth lens group G4. Also, an ND filter for controlling an amount of light is assumed as an optical element F1 formed of parallel flat plates provided between the third and fourth lens group G3 and G4.

As for the material of each of the lenses, optical glass is used in all the examples except Examples 1 to 4 where resin is used for the diffraction part of the diffractive optical element included in the first lens group G1.

The aberrations in each example are sufficiently corrected, thereby enabling compatibility with an imaging device with two million pixels or more. It is apparent from each example that, with such a configuration of the zoom lens 1 according to the present invention, very good imaging performance can be ensured while achieving a variable magnification ratio exceeding 25 times and sufficient reduction in size.

Reference numerals common to all the examples mean as follows.
f: focal length of whole system
F: F-number
ω: half field angle
r: curvature radius (paraxial curvature radius for aspheric surface)

d: surface interval
nd: refractive index
vd: Abbe number
$\theta_{C,A'}$: partial dispersion ratio: (nC−nA')/(nF−nC)
$C_2$: secondary coefficient of phase function
$C_4$: quartic coefficient of phase function
K: constant of aspheric cone
$A_4$: quartic coefficient of aspheric formula
$A_6$: sextic coefficient of aspheric formula
$A_8$: eighth degree coefficient of aspheric formula Note that, in Tables 1 to 5 of Examples 1 to 5 described below, those made by Ohara Corporation are abbreviated as OHARA as the manufacturer name of glass material before the glass type name. Also, in Examples 1 to 4, a lens plane with plane number 3 (third plane) indicated by attaching "* (asterisk)" to each of the plane numbers in Tables 1 to 4 is a diffraction plane (diffraction part). Moreover, in Example 4, a lens plane with plane number 19 (nineteenth plane) indicated by attaching "*" to the plane number in Table 4 is an aspheric surface. Furthermore, the curvature radius r=∞ represents a flat surface.

In Examples 1 to 4, an intermediate layer made of two kinds of resin is provided between the negative lens L11 and the positive lens L12 in the first lens group G1, and a junction plane between the resins is used as the diffraction plane. The diffraction plane used here is represented by the following phase function, where λ is a reference wavelength is and h is a height from the optical axis. Note that primary diffraction light is used as imaging light, and refractive power of the diffraction part is $-2 \cdot C_2$.

$$\varphi(h) = \frac{2\pi}{\lambda}(C_2 \cdot h^2 + C_4 \cdot h^4) \quad \text{[Equation 1]}$$

In Example 4, the object-side lens surface of the positive lens L41 in the fourth lens group G4 is an aspheric surface. The aspheric surface used here is represented by the following aspheric formula, where R is a paraxial curvature radius and H is a height from the optical axis.

$$X = \frac{(1/R) \cdot H^2}{1 + \sqrt{\{1 - (1+K) \cdot (H/R)^2\}}} + A_4 \cdot H^4 + A_6 \cdot H^6 + A_8 \cdot H^8 \quad \text{[Equation 2]}$$

Example 1

A numerical example of the zoom lens 1 according to Example 1 shown in FIG. 1 is described below.

f=17.1 to 487, F=4.01 to 6.96, ω=14.0 to 0.470

TABLE 1 f = 17.1~487, F = 4.01~6.96, ω = 14.0~0.470

| SURFACE NUMBER | r | d | nd | vd | $\theta_{C,A'}$ | GLASS TYPE |
|---|---|---|---|---|---|---|
| 01 | 156.920 | 2.50 | 1.83400 | 37.16 | 0.3245 | OHARA S-LAH60 |
| 02 | 72.464 | 0.10 | 1.64310 | 38.82 | 0.3124 | RESIN MATERIAL |
| 03* | 72.464 | 0.10 | 1.61505 | 26.54 | 0.2831 | RESIN MATERIAL |
| 04 | 72.464 | 10.92 | 1.48749 | 70.24 | 0.3633 | OHARA S-FSL5 |
| 05 | 6408.772 | 0.20 | | | | |
| 06 | 74.473 | 10.24 | 1.48749 | 70.24 | 0.3633 | OHARA S-FSL5 |
| 07 | 2661.489 | VARIABLE(A) | | | | |
| 08 | −155.290 | 2.00 | 1.59522 | 67.73 | 0.3431 | OHARA S-FPM2 |
| 09 | 36.938 | 0.85 | | | | |
| 10 | 37.153 | 6.33 | 1.80000 | 29.84 | 0.3117 | OHARA S-NBH55 |
| 11 | −478.798 | 2.00 | 1.70000 | 48.08 | 0.3414 | OHARA S-LAM51 |
| 12 | 33.103 | VARIABLE(B) | | | | |
| 13 | −51.800 | 1.50 | 1.60300 | 65.44 | 0.3498 | OHARA S-PHM53 |
| 14 | 19.600 | 2.32 | 1.85026 | 32.27 | 0.3145 | OHARA S-LAH71 |
| 15 | 36.026 | VARIABLE(C) | | | | |
| 16 | ∞ | 1.00 | 1.51633 | 64.14 | 0.3349 | FILTER |
| 17 | ∞ | 0.90 | | | | |
| 18 | APERTURE | 2.50 | | | | |
| 19 | 78.048 | 3.54 | 1.49700 | 81.54 | 0.3501 | OHARA S-FPL51 |
| 20 | −78.048 | 0.20 | | | | |
| 21 | 48.307 | 3.90 | 1.49700 | 81.54 | 0.3501 | OHARA S-FPL51 |
| 22 | −94.368 | 0.20 | | | | |
| 23 | 29.840 | 4.96 | 1.49700 | 81.54 | 0.3501 | OHARA S-FPL51 |
| 24 | −46.356 | 1.55 | 1.83400 | 37.16 | 0.3245 | OHARA S-LAH60 |
| 25 | 31.127 | 2.47 | | | | |

TABLE 1-continued

| $f = 17.1\sim487$, $F = 4.01\sim6.96$, $\omega = 14.0\sim0.470$ | | | | | | |
|---|---|---|---|---|---|---|
| 26 | −54.114 | 1.50 | 1.48749 | 70.24 | 0.3633 | OHARA S-FSL5 |
| 27 | 20.000 | 5.64 | 1.54072 | 47.23 | 0.3353 | OHARA S-TIL2 |
| 28 | −41.537 | 64.518 | | | | |
| 29 | ∞ | 3.50 | 1.51633 | 64.14 | | VARIOUS FILTER |
| 30 | ∞ | 1.000 | | | | |

DIFFRACTION PLANE; THIRD PLANE $\lambda = 587.56$(nm), $C_2 = -3.06070 \times 10^{-5}$, $C_4 = 2.23341 \times 10^{-10}$

VARIABLE INTERVAL

| | WIDE ANGLE END $f = 17.07$ | INTERMEDIATE FOCAL LENGTH $f = 91.31$ | TELEPHOTO END $f = 487.4$ |
|---|---|---|---|
| A | 5.487 | 77.906 | 94.869 |
| B | 71.175 | 6.645 | 44.244 |
| C | 66.650 | 59.061 | 4.500 |

MAGNIFICATION OF EACH LENS GROUP

| | WIDE ANGLE END $f = 17.07$ | INTERMEDIATE FOCAL LENGTH $f = 91.31$ | TELEPHOTO END $f = 487.4$ |
|---|---|---|---|
| SECOND LENS GROUP | −0.680 | −20.953 | 3.501 |
| THIRD LENS GROUP | 0.217 | −0.0376 | −1.202 |
| FOURTH LENS GROUP | −0.793 | −0.793 | −0.793 |

NUMERICAL VALUES IN CONDITIONAL EXPRESSIONS (1) $vd_{P1} - vd_{N1} = -23.0$
(2) $(R_{N2I} + R_{N1O})/(R_{N2I} - R_{N1O}) = -0.269$
(3) $vd_{4GP} = 81.5$
(6) $L_4/T_{4F-I} = 0.257$
(7) $f_T/f_{DOE} = 0.0298$
(11) $f_1/f_W = 8.55$
(12) $f_2/f_W = -2.98$
(13) $f_3/f_W = -2.58$
(14) $f_4/f_W = 2.76$

TELEPHOTO RATIO AT TELEPHOTO END: 0.575

Note that, as can be seen from Table 1, the second positive lens L43 and the positive lenses L42 and L41 in the fourth lens group G4 of Example 1 all have the Abbe number vd=81.54, and satisfy conditional expression (4). Also, all of the above lenses have the partial dispersion ratio $\theta_{C,A'}$=0.3501 (<0.000667·vd+0.300=0.3544), and satisfy conditional expression (5).

FIGS. 6 to 8 are aberration curve diagrams of spherical aberration, astigmatism, distortion and coma aberration at the wide angle end, intermediate focal length and telephoto end of the zoom lens 1 according to Example 1. In FIGS. 6 to 8, the solid line in the spherical aberration represents spherical aberration, while the broken line represents a sine condition. Also, the solid line in the astigmatism represents sagittal aberration, while the broken line represents meridional aberration. The same goes for aberration curve diagrams according to the other examples.

Example 2

A numerical example of the zoom lens 1 according to Example 2 shown in FIG. 2 is described below. Also, FIGS. 9 to 11 are aberration curve diagrams of spherical aberration, astigmatism, distortion and coma aberration at the wide angle end, intermediate focal length and telephoto end of the zoom lens 1 according to Example 2.

$f$=17.1 to 486, $F$=4.00 to 6.95, $\omega$=14.2 to 0.471

TABLE 2

| $f = 17.1\sim486$, $F = 4.00\sim6.95$, $\omega = 14.2\sim0.471$ | | | | | | |
|---|---|---|---|---|---|---|
| SURFACE NUMBER | r | d | nd | vd | $\theta_{C,A'}$ | GLASS TYPE |
| 01 | 138.534 | 2.50 | 1.83400 | 37.16 | 0.3245 | OHARA S-LAH60 |
| 02 | 75.010 | 0.10 | 1.64310 | 38.82 | 0.3124 | RESIN MATERIAL |
| 03* | 75.010 | 0.10 | 1.61505 | 26.54 | 0.2831 | RESIN MATERIAL |
| 04 | 75.010 | 10.72 | 1.48749 | 70.24 | 0.3633 | OHARA S-FSL5 |
| 05 | 9346.827 | 0.20 | | | | |
| 06 | 73.420 | 10.32 | 1.43875 | 94.94 | 0.3529 | OHARA S-FPL53 |
| 07 | 1141.217 | VARIABLE(A) | | | | |
| 08 | −211.333 | 2.00 | 1.59522 | 67.73 | 0.3431 | OHARA S-FPM2 |

TABLE 2-continued f = 17.1~486, F = 4.00~6.95, ω = 14.2~0.471

| | | | | | | |
|---|---|---|---|---|---|---|
| 09 | 85.820 | 0.20 | | | | |
| 10 | 50.000 | 8.57 | 1.68893 | 31.07 | 0.3142 | OHARA S-TIM28 |
| 11 | −72.415 | 2.00 | 1.74320 | 49.34 | 0.3414 | OHARA S-LAM60 |
| 12 | 32.269 | VARIABLE(B) | | | | |
| 13 | −46.892 | 1.50 | 1.59522 | 67.73 | 0.3431 | OHARA S-FPM2 |
| 14 | 16.804 | 2.86 | 1.85026 | 32.27 | 0.3145 | OHARA S-LAH71 |
| 15 | 29.833 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 71.102 | 3.88 | 1.43875 | 94.94 | 0.3529 | OHARA S-FPL53 |
| 20 | −49.574 | 0.20 | | | | |
| 21 | 33.482 | 3.99 | 1.49700 | 81.54 | 0.3501 | OHARA S-FPL51 |
| 22 | −174.686 | 0.21 | | | | |
| 23 | 23.063 | 4.97 | 1.49700 | 81.54 | 0.3501 | OHARA S-FPL51 |
| 24 | −59.924 | 3.33 | 1.83400 | 37.16 | 0.3245 | OHARA S-LAH60 |
| 25 | 20.958 | 2.86 | | | | |
| 26 | −31.574 | 1.50 | 1.48749 | 70.24 | 0.3633 | OHARA S-FSL5 |
| 27 | 20.000 | 5.03 | 1.54814 | 45.78 | 0.3331 | OHARA S-TIL1 |
| 28 | −31.180 | 51.371 | | | | |
| 29 | ∞ | 3.50 | 1.51633 | 64.14 | | VARIOUS FILTER |
| 30 | ∞ | 1.000 | | | | |

DIFFRACTION PLANE; THIRD PLANE $\lambda = 587.56$(nm), $C_2 = -2.05523 \times 10^{-5}$, $C_4 = 8.88676 \times 10^{-10}$

VARIABLE INTERVAL

| | WIDE ANGLE END f = 17.08 | INTERMEDIATE FOCAL LENGTH f = 91.53 | TELEPHOTO END f = 486.2 |
|---|---|---|---|
| A | 7.192 | 75.842 | 89.762 |
| B | 65.781 | 6.155 | 43.715 |
| C | 63.691 | 54.667 | 3.187 |

MAGNIFICATION OF EACH LENS GROUP

| | WIDE ANGLE END f = 17.08 | INTERMEDIATE FOCAL LENGTH f = 91.53 | TELEPHOTO END f = 486.2 |
|---|---|---|---|
| SECOND LENS GROUP | −0.787 | 19.702 | 3.137 |
| THIRD LENS GROUP | 0.194 | −0.0415 | −1.383 |
| FOURTH LENS GROUP | −0.777 | −0.777 | −0.777 |

NUMERICAL VALUES IN CONDITIONAL EXPRESSIONS (1) $vd_{P1} - vd_{N1} = -24.5$
(2) $(R_{N2I} + R_{N1O})/(R_{N2I} - R_{N1O}) = -0.202$
(3) $vd_{4GP} = 86.0$
(6) $L_4/T_{4F-I} = 0.322$
(7) $f_T/f_{DOE} = 0.0200$
(8) $vd_{1GP} = 82.6$
(11) $f_1/f_W = 8.45$
(12) $f_2/f_W = -3.04$
(13) $f_3/f_W = -2.25$
(14) $f_4/f_W = 2.48$

TELEPHOTO RATIO AT TELEPHOTO END: 0.543

Note that, as can be seen from Table 2, the second positive lens L43 and the positive lens L42 in the fourth lens group G4 of Example 2 have the Abbe number vd=81.54 and the partial dispersion ratio $\theta_{C,A}$=0.3501 (<0.000667·vd+0.300=0.3544), and thus satisfy conditional expressions (4) and (5). Also, the positive lens L41 has the Abbe number vd=94.94 and the partial dispersion ratio $\theta_{C,A}$=0.3529 (<0.000667·vd+0.300=0.3633), and thus satisfies conditional expressions (4) and (5). Moreover, as can be seen from Table 2, the positive lens L13 in the first lens group G1 of Example 2 has the Abbe number vd=94.94 and thus satisfies conditional expression (9). Furthermore, the positive lens L13 has the partial dispersion ratio $\theta_{C,A}$=0.3529 (<0.000667·vd+0.300=0.3633), and thus satisfies conditional expression (10).

Example 3

Figure 14:
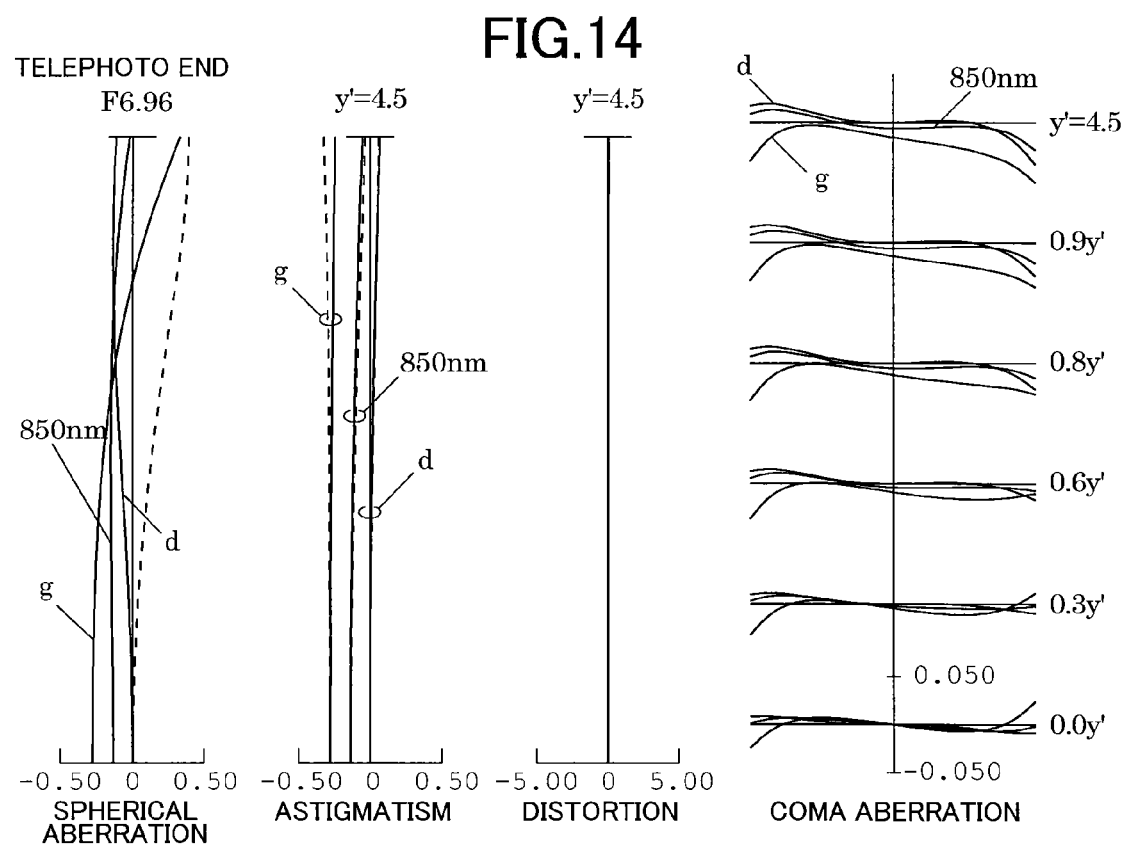
FIG. 14 is an aberration curve diagram at a telephoto end of the zoom lens according to Example 3.

A numerical example of the zoom lens 1 according to Example 3 shown in FIG. 3 is described below. Also, FIGS. 12 to 14 are aberration curve diagrams of spherical aberration, astigmatism, distortion and coma aberration at the wide angle end, intermediate focal length and telephoto end of the zoom lens 1 according to Example 3.

*f*=17.1 to 487, *F*=4.01 to 6.96, ω=16.0 to 0.529

TABLE 3 f = 17.1~487, F = 4.01~6.96, ω = 16.0~0.529

| SURFACE NUMBER | r | d | nd | vd | $\theta_{C, A'}$ | GLASS TYPE |
|---|---|---|---|---|---|---|
| 01 | 143.610 | 2.50 | 1.83400 | 37.16 | 0.3245 | OHARA S-LAH60 |
| 02 | 76.816 | 0.10 | 1.64310 | 38.82 | 0.3124 | RESIN MATERIAL |
| 03* | 76.816 | 0.10 | 1.61505 | 26.54 | 0.2831 | RESIN MATERIAL |
| 04 | 76.816 | 10.55 | 1.48749 | 70.24 | 0.3633 | OHARA S-FSL5 |
| 05 | 15446.495 | 0.20 | | | | |
| 06 | 75.559 | 10.17 | 1.43875 | 94.94 | 0.3529 | OHARA S-FPL53 |
| 07 | 1368.706 | VARIABLE(A) | | | | |
| 08 | −146.028 | 2.00 | 1.59522 | 67.73 | 0.3431 | OHARA S-FPM2 |
| 09 | 42.654 | 0.20 | | | | |
| 10 | 40.000 | 6.73 | 1.80000 | 29.84 | 0.3117 | OHARA S-NBH55 |
| 11 | −3191.505 | 2.00 | 1.67003 | 47.23 | 0.3338 | OHARA S-BAH10 |
| 12 | 31.671 | VARIABLE(B) | | | | |
| 13 | −50.487 | 1.50 | 1.60300 | 65.44 | 0.3498 | OHARA S-PHM53 |
| 14 | 18.890 | 2.94 | 1.85026 | 32.27 | 0.3145 | OHARA S-LAH71 |
| 15 | 34.671 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 80.235 | 3.47 | 1.49700 | 81.54 | 0.3501 | OHARA S-FPL51 |
| 20 | −73.028 | 0.20 | | | | |
| 21 | 57.165 | 3.63 | 1.49700 | 81.54 | 0.3501 | OHARA S-FPL51 |
| 22 | −89.319 | 0.20 | | | | |
| 23 | 30.165 | 5.04 | 1.49700 | 81.54 | 0.3501 | OHARA S-FPL51 |
| 24 | −38.510 | 1.50 | 1.83400 | 37.16 | 0.3245 | OHARA S-LAH60 |
| 25 | 33.545 | 2.44 | | | | |
| 26 | −47.119 | 1.50 | 1.48749 | 70.24 | 0.3633 | OHARA S-FSL5 |
| 27 | 20.000 | 5.95 | 1.54072 | 47.23 | 0.3353 | OHARA S-TIL2 |
| 28 | −33.828 | 64.462 | | | | |
| 29 | ∞ | 3.50 | 1.51633 | 64.14 | | VARIOUS FILTER |
| 30 | ∞ | 1.000 | | | | |

DIFFRACTION PLANE; THIRD PLANE

λ = 587.56 (nm), $C_2$ = −2.06961 × $10^{-5}$, $C_4$ = 1.17380 × $10^{-10}$

VARIABLE INTERVAL

| | WIDE ANGLE END f = 17.07 | INTERMEDIATE FOCAL LENGTH f = 91.26 | TELEPHOTO END f = 487.2 |
|---|---|---|---|
| A | 5.400 | 78.425 | 94.911 |
| B | 71.253 | 6.594 | 44.438 |
| C | 66.028 | 57.662 | 3.332 |

MAGNIFICATION OF EACH LENS GROUP

| | WIDE ANGLE END f = 17.07 | INTERMEDIATE FOCAL LENGTH f = 91.26 | TELEPHOTO END f = 487.2 |
|---|---|---|---|
| SECOND LENS GROUP | −0.713 | −73.919 | 3.335 |
| THIRD LENS GROUP | 0.207 | 0.0107 | −1.264 |
| FOURTH LENS GROUP | −0.780 | −0.780 | −0.780 |

NUMERICAL VALUES IN CONDITIONAL EXPRESSIONS (1) $vd_{P1} - vd_{N1} = -23.0$
(2) $(R_{N2I} + R_{N1O})/(R_{N2I} - R_{N1O}) = -0.168$
(3) $vd_{4GP} = 81.5$
(6) $L_4/T_{4F-I} = 0.261$
(7) $f_T/f_{DOE} = 0.0202$
(8) $vd_{1GP} = 82.6$
(11) $f_1/f_W = 8.68$
(12) $f_2/f_W = -3.08$
(13) $f_3/f_W = -2.50$
(14) $f_4/f_W = 2.74$

TELEPHOTO RATIO AT TELEPHOTO END: 0.573

Note that, as can be seen from Table 3, the second positive lens L43 and the positive lenses L42 and L41 in the fourth lens group G4 of Example 3 all have the Abbe number νd=81.54, and satisfy conditional expression (4). Also, all of the above lenses have the partial dispersion ratio $\theta_{C,A'}$=0.3501 (<0.000667·νd+0.300=0.3544), and satisfy conditional expression (5). Moreover, as can be seen from Table 3, the positive lens L13 in the first lens group G1 of Example 3 has the Abbe number νd=94.94 and thus satisfies conditional expression (9). Furthermore, the positive lens L13 has the partial dispersion ratio $\theta_{C,A'}$=0.3529 (<0.000667·νd+0.300=0.3633), and thus satisfies conditional expression (10).

Example 4

Figure 17:
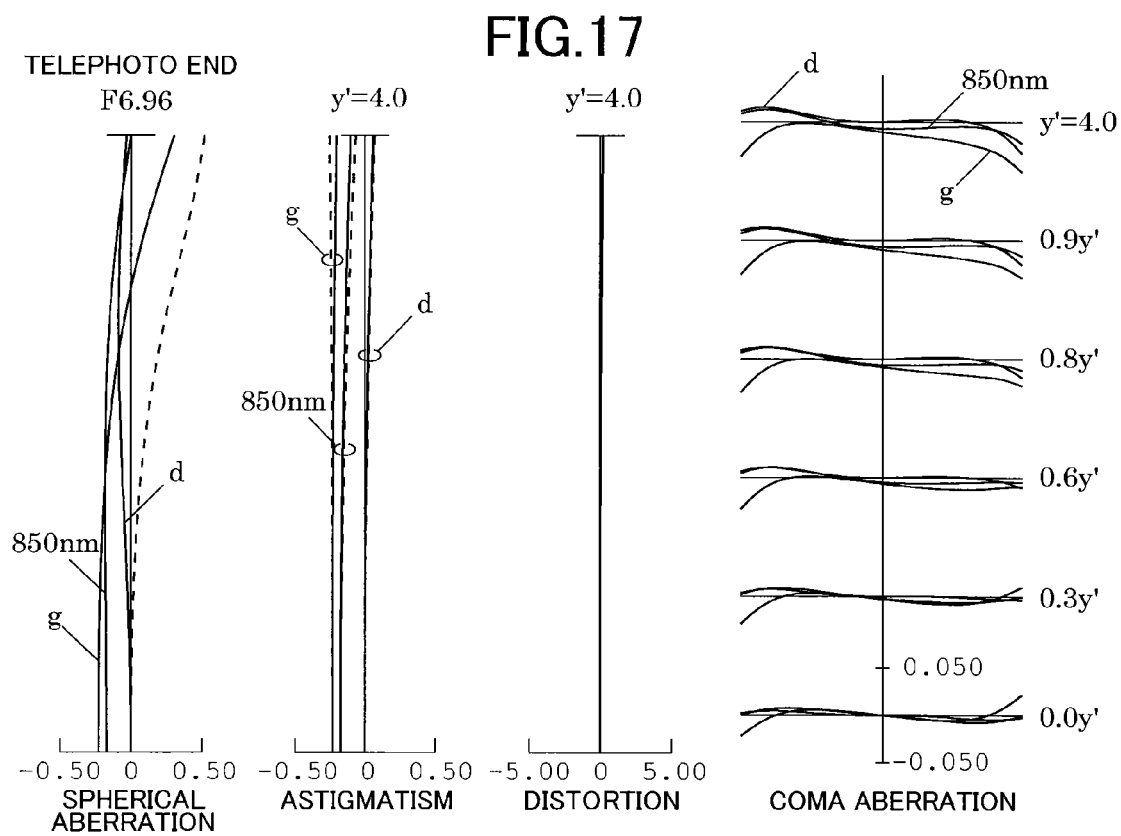
FIG. 17 is an aberration curve diagram at a telephoto end of the zoom lens according to Example 4.

A numerical example of the zoom lens 1 according to Example 4 shown in FIG. 4 is described below. Also, FIGS. 15 to 17 are aberration curve diagrams of spherical aberration, astigmatism, distortion and coma aberration at the wide angle end, intermediate focal length and telephoto end of the zoom lens 1 according to Example 4.

$f$=17.1 to 487, $F$=3.95 to 6.96, ω=14.0 to 0.470

TABLE 4

| | | | | | | |
|---|---|---|---|---|---|---|
| \multicolumn{7}{c}{f = 17.1~487, F = 3.95~6.96, ω = 14.0~0.470} |
| SURFACE NUMBER | r | d | nd | νd | $\theta_{C,A'}$ | GLASS TYPE |
| 01 | 157.716 | 2.50 | 1.83400 | 37.16 | 0.3245 | OHARA S-LAH60 |
| 02 | 80.188 | 0.10 | 1.64310 | 38.82 | 0.3124 | RESIN MATERIAL |
| 03* | 80.188 | 0.10 | 1.61505 | 26.54 | 0.2831 | RESIN MATERIAL |
| 04 | 80.188 | 10.84 | 1.48749 | 70.24 | 0.3633 | OHARA S-FSL5 |
| 05 | −965.701 | 0.20 | | | | |
| 06 | 74.859 | 10.21 | 1.43875 | 94.94 | 0.3529 | OHARA S-FPL53 |
| 07 | 1250.261 | VARIABLE(A) | | | | |
| 08 | −1102.688 | 2.00 | 1.59522 | 67.73 | 0.3431 | OHARA S-FPM2 |
| 09 | 54.624 | 0.20 | | | | |
| 10 | 51.978 | 9.76 | 1.68893 | 31.07 | 0.3142 | OHARA S-TIM28 |
| 11 | −48.077 | 2.00 | 1.85026 | 32.27 | 0.3331 | OHARA S-LAH51 |
| 12 | 42.896 | VARIABLE(B) | | | | |
| 13 | −47.465 | 1.50 | 1.59522 | 67.73 | 0.3431 | OHARA S-FPM2 |
| 14 | 16.926 | 2.87 | 1.85026 | 32.27 | 0.3145 | OHARA S-LAH71 |
| 15 | 30.040 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19* | 25.662 | 4.50 | 1.43875 | 94.94 | 0.3529 | OHARA S-FPL53 |
| 20 | −107.684 | 0.20 | | | | |
| 21 | 39.448 | 3.48 | 1.49700 | 81.54 | 0.3501 | OHARA S-FPL51 |
| 22 | −244.335 | 0.20 | | | | |
| 23 | 30.534 | 4.06 | 1.49700 | 81.54 | 0.3501 | OHARA S-FPL51 |
| 24 | −65.075 | 3.64 | 1.80610 | 40.93 | 0.3289 | OHARA S-LAH53 |
| 25 | 19.436 | 4.53 | | | | |
| 26 | 385.080 | 1.50 | 1.48749 | 70.24 | 0.3633 | OHARA S-FSL5 |
| 27 | 20.000 | 3.89 | 1.54814 | 45.78 | 0.3331 | OHARA S-TIL1 |
| 28 | −99.699 | 48.589 | | | | |
| 29 | ∞ | 3.50 | 1.51633 | 64.14 | | VARIOUS FILTER |
| 30 | ∞ | 1.000 | | | | |
| \multicolumn{7}{c}{DIFFRACTION PLANE; THIRD PLANE} |
| \multicolumn{7}{c}{λ = 587.56 (nm), $C_2$ = −2.07977 × $10^{-5}$, $C_4$ = 9.76351 × $10^{-10}$} |
| \multicolumn{7}{c}{ASPHERIC SURFACE; NINETEENTH PLANE} |
| \multicolumn{7}{c}{K = 0.0, $A_4$ = −7.21843 × $10^{-6}$, $A_6$ = −6.52396 × $10^{-9}$, $A_8$ = 4.67279 × $10^{-12}$} |
| \multicolumn{7}{c}{VARIABLE INTERVAL} |

| | WIDE ANGLE END $f$ = 17.05 | INTERMEDIATE FOCAL LENGTH $f$ = 91.30 | TELEPHOTO END $f$ = 487.3 |
|---|---|---|---|
| A | 5.846 | 75.128 | 87.903 |
| B | 65.173 | 6.100 | 47.276 |
| C | 67.232 | 57.023 | 3.072 |

TABLE 4-continued f = 17.1~487, F = 3.95~6.96, ω = 14.0~0.470

MAGNIFICATION OF EACH LENS GROUP

|  | WIDE ANGLE END f = 17.05 | INTERMEDIATE FOCAL LENGTH f = 91.30 | TELEPHOTO END f = 487.3 |
|---|---|---|---|
| SECOND LENS GROUP | −0.847 | 11.221 | 3.093 |
| THIRD LENS GROUP | 0.188 | −0.0758 | −1.469 |
| FOURTH LENS GROUP | −0.749 | −0.749 | −0.749 |

NUMERICAL VALUES IN CONDITIONAL EXPRESSIONS (1) $vd_{P1} - vd_{N1} = -24.5$
(2) $(R_{N2I} + R_{N1O})/(R_{N2I} - R_{N1O}) = -1.11$
(3) $vd_{4GP} = 86.0$
(6) $L_4/T_{4F-I} = 0.334$
(7) $f_T/f_{DOE} = 0.0203$
(8) $vd_{1GP} = 82.6$
(11) $f_1/f_W = 8.39$
(12) $f_2/f_W = -3.19$
(13) $f_3/f_W = -2.27$
(14) $f_4/f_W = 2.47$

TELEPHOTO RATIO AT TELEPHOTO END: 0.542

Note that, as can be seen from Table 4, the second positive lens L43 and the positive lens L42 in the fourth lens group G4 of Example 4 have the Abbe number vd=81.54 and the partial dispersion ratio $\theta_{C,A'}$=0.3501 (<0.000667·vd+0.300=0.3544), and thus satisfy conditional expressions (4) and (5). Also, the positive lens L41 has the Abbe number vd=94.94 and the partial dispersion ratio $\theta_{C,A'}$=0.3529 (<0.000667·vd+0.300=0.3633), and thus satisfies conditional expressions (4) and (5). Moreover, as can be seen from Table 4, the positive lens L13 in the first lens group G1 of Example 4 has the Abbe number vd=94.94 and thus satisfies conditional expression (9). Furthermore, the positive lens L13 has the partial dispersion ratio $\theta_{C,A'}$=0.3529 (<0.000667·vd+0.300=0.3633), and thus satisfies conditional expression (10).

Example 5

A numerical example of the zoom lens 1 according to Example 5 shown in FIG. 5 is described below. Also, FIGS. 18 to 20 are aberration curve diagrams of spherical aberration, astigmatism, distortion and coma aberration at the wide angle end, intermediate focal length and telephoto end of the zoom lens 1 according to Example 5.

$f$=17.1 to 487, $F$=4.00 to 6.96, ω=14.1 to 0.470

TABLE 5 f = 17.1~487, F = 4.00~6.96, ω = 14.1~0.470

| SURFACE NUMBER | r | d | nd | vd | $\theta_{C,A'}$ | GLASS TYPE |
|---|---|---|---|---|---|---|
| 01 | 172.744 | 2.50 | 1.78800 | 47.37 | 0.3383 | OHARA S-LAH64 |
| 02 | 81.144 | 0.78 | | | | |
| 03 | 80.286 | 9.17 | 1.43875 | 94.94 | 0.3529 | OHARA S-FPL53 |
| 04 | 505.373 | 0.20 | | | | |
| 05 | 98.978 | 2.50 | 1.51742 | 52.43 | 0.3410 | OHARA S-NSL36 |
| 06 | 68.083 | 0.96 | | | | |
| 07 | 69.238 | 10.05 | 1.43875 | 94.94 | 0.3529 | OHARA S-FPL53 |
| 08 | 368.951 | 0.20 | | | | |
| 09 | 82.756 | 9.61 | 1.43875 | 94.94 | 0.3529 | OHARA S-FPL53 |
| 10 | 5833.436 | VARIABLE(A) | | | | |
| 11 | −104.036 | 2.00 | 1.59522 | 67.73 | 0.3431 | OHARA S-FPM2 |
| 12 | 211.482 | 0.20 | | | | |
| 13 | 86.251 | 7.34 | 1.80000 | 29.84 | 0.3117 | OHARA S-NBH55 |
| 14 | −50.501 | 2.00 | 1.74320 | 49.34 | 0.3414 | OHARA S-LAM60 |
| 15 | 33.103 | VARIABLE(B) | | | | |
| 16 | −46.420 | 1.50 | 1.60300 | 65.44 | 0.3498 | OHARA S-PHM53 |
| 17 | 16.928 | 2.36 | 1.85026 | 32.27 | 0.3145 | OHARA S-LAH71 |
| 18 | 30.729 | VARIABLE(C) | | | | |
| 19 | ∞ | 1.00 | 1.51633 | 64.14 | | FILTER |
| 20 | ∞ | 0.90 | | | | |
| 21 | APERTURE | 3.50 | | | | |
| 22 | 75.345 | 3.41 | 1.49700 | 81.54 | 0.3501 | OHARA S-FPL51 |
| 23 | −86.106 | 1.70 | | | | |
| 24 | 70.964 | 3.31 | 1.49700 | 81.54 | 0.3501 | OHARA S-FPL51 |
| 25 | −117.159 | 0.20 | | | | |

TABLE 5-continued

| f = 17.1~487, F = 4.00~6.96, ω = 14.1~0.470 | | | | | | |
|---|---|---|---|---|---|---|
| 26 | 41.750 | 4.51 | 1.49700 | 81.54 | 0.3501 | OHARA S-FPL51 |
| 27 | −45.320 | 1.50 | 1.83400 | 37.16 | 0.3245 | OHARA S-LAH60 |
| 28 | 50.233 | 1.71 | | | | |
| 29 | 629.774 | 1.50 | 1.48749 | 70.24 | 0.3633 | OHARA S-FSL5 |
| 30 | 20.000 | 5.48 | 1.51742 | 52.43 | 0.3410 | OHARA S-NSL36 |
| 31 | −63.386 | 64.546 | | | | |
| 32 | ∞ | 3.50 | 1.51633 | 64.14 | | VARIOUS FILTER |
| 33 | ∞ | 1.000 | | | | |

VARIABLE INTERVAL

| | WIDE ANGLE END f = 17.08 | INTERMEDIATE FOCAL LENGTH f = 91.51 | TELEPHOTO END f = 487.2 |
|---|---|---|---|
| A | 6.436 | 70.816 | 83.849 |
| B | 61.795 | 6.263 | 43.915 |
| C | 62.699 | 53.851 | 3.166 |

MAGNIFICATION OF EACH LENS GROUP

| | WIDE ANGLE END f = 17.08 | INTERMEDIATE FOCAL LENGTH f = 91.51 | TELEPHOTO END f = 487.2 |
|---|---|---|---|
| SECOND LENS GROUP | −0.774 | 30.028 | 3.314 |
| THIRD LENS GROUP | 0.203 | −0.0281 | −1.353 |
| FOURTH LENS GROUP | −0.801 | −0.801 | −0.801 |

NUMERICAL VALUES IN CONDITIONAL EXPRESSIONS (1) $vd_{P1} - vd_{N1} = -17.8$
(2) $(R_{N2I} + R_{N1O})/(R_{N2I} - R_{N1O}) = -1.17$
(3) $vd_{4GP} = 81.5$
(6) $L_4/T_{4F-I} = 0.256$
(7) $f_T/f_{DOE} = $ NA
(8) $vd_{1GP} = 94.9$
(11) $f_1/f_W = 7.94$
(12) $f_2/f_W = -2.84$
(13) $f_3/f_W = -2.24$
(14) $f_4/f_W = 2.66$

TELEPHOTO RATIO AT TELEPHOTO END: 0.575

Note that, as can be seen from Table 5, the second positive lens L43 and the positive lenses L42 and L41 in the fourth lens group G4 of Example 5 all have the Abbe number vd=81.54, and satisfy conditional expression (4). Also, all of the above lenses have the partial dispersion ratio $\theta_{C,A'}$=0.3501 (<0.000667·vd+0.300=0.3544), and satisfy conditional expression (5). Moreover, as can be seen from Table 5, the positive lens L12, L14, and L15 in the first lens group G1 of Example 5 all have the Abbe number vd=94.94 and thus satisfies conditional expression (9). Furthermore, the positive lens L13 has the partial dispersion ratio $\theta_{C,A'}$=0.3529 (<0.000667·vd+0.300=0.3633), and thus satisfies conditional expression (10).

Example 6

Extender Lens Group Ex Included

Figure 28:
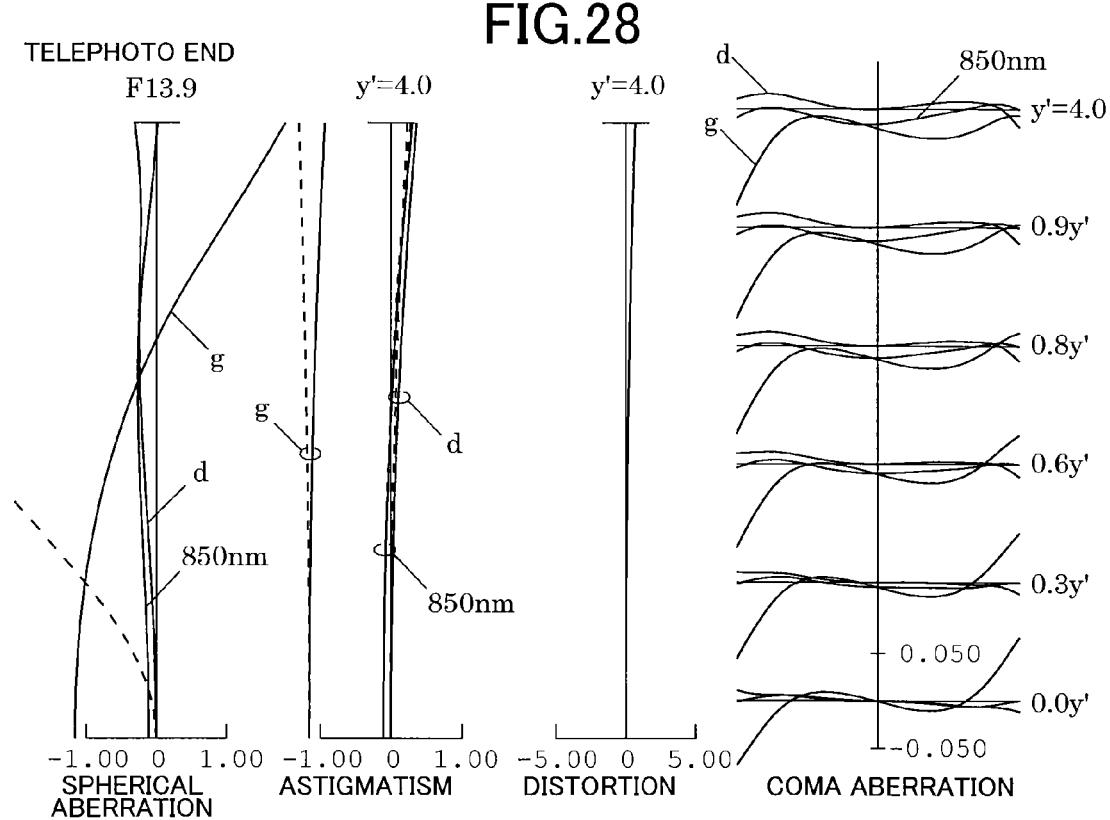
FIG. 28 is an aberration curve diagram at a telephoto end of the zoom lens (including the extender lens group) according to Example 6.

A numerical example of the zoom lens 1 according to Example 6 in a state where the extender lens group Ex shown in FIG. 21 is attached is described below. FIGS. 26 to 28 are aberration curve diagrams of spherical aberration, astigmatism, distortion and coma aberration at the wide angle end, intermediate focal length and telephoto end of the zoom lens 1 according to Example 6 in this state.

$f$=33.9 to 968, $F$=7.96 to 13.8, ω=6.78 to 0.235

TABLE 6

| f = 33.9~968, F = 7.96~13.8, ω = 6.78~0.235 | | | | | | |
|---|---|---|---|---|---|---|
| SURFACE NUMBER | r | d | nd | vd | $\theta_{C, A'}$ | GLASS TYPE |
| 01 | 156.920 | 2.50 | 1.83400 | 37.16 | 0.3245 | OHARA S-LAH60 |
| 02 | 72.464 | 0.10 | 1.64310 | 38.82 | 0.3124 | RESIN MATERIAL |
| 03* | 72.464 | 0.10 | 1.61505 | 26.54 | 0.2831 | RESIN MATERIAL |
| 04 | 72.464 | 10.92 | 1.48749 | 70.24 | 0.3633 | OHARA S-FSL5 |
| 05 | 6408.772 | 0.20 | | | | |
| 06 | 74.473 | 10.24 | 1.48749 | 70.24 | 0.3633 | OHARA S-FSL5 |
| 07 | 2661.489 | VARIABLE(A) | | | | |
| 08 | −155.290 | 2.00 | 1.59522 | 67.73 | 0.3431 | OHARA S-FPM2 |
| 09 | 36.938 | 0.85 | | | | |

TABLE 6-continued f = 33.9~968, F = 7.96~13.8, ω = 6.78~0.235

| | | | | | | |
|---|---|---|---|---|---|---|
| 10 | 37.153 | 6.33 | 1.80000 | 29.84 | 0.3117 | OHARA S-NBH55 |
| 11 | −478.798 | 2.00 | 1.70000 | 48.08 | 0.3414 | OHARA S-LAM51 |
| 12 | 33.103 | VARIABLE(B) | | | | |
| 13 | −51.800 | 1.50 | 1.60300 | 65.44 | 0.3498 | OHARA S-PHM53 |
| 14 | 19.600 | 2.32 | 1.85026 | 32.27 | 0.3145 | OHARA S-LAH71 |
| 15 | 36.026 | VARIABLE(C) | | | | |
| 16 | ∞ | 1.00 | 1.51633 | 64.14 | 0.3349 | FILTER |
| 17 | ∞ | 0.90 | | | | |
| 18 | APERTURE | 2.50 | | | | |
| 19 | 78.048 | 3.54 | 1.49700 | 81.54 | 0.3501 | OHARA S-FPL51 |
| 20 | −78.048 | 0.20 | | | | |
| 21 | 48.307 | 3.90 | 1.49700 | 81.54 | 0.3501 | OHARA S-FPL51 |
| 22 | −94.368 | 0.20 | | | | |
| 23 | 29.840 | 4.96 | 1.49700 | 81.54 | 0.3501 | OHARA S-FPL51 |
| 24 | −46.356 | 1.55 | 1.83400 | 37.16 | 0.3245 | OHARA S-LAH60 |
| 25 | 31.127 | 2.47 | | | | |
| 26 | −54.114 | 1.50 | 1.48749 | 70.24 | 0.3633 | OHARA S-FSL5 |
| 27 | 20.000 | 5.64 | 1.54072 | 47.23 | 0.3353 | OHARA S-TIL2 |
| 28 | −41.537 | 4.921 | | | | |
| 29 | 17.945 | 4.37 | 1.49700 | 81.54 | 0.3501 | OHARA S-FPL51 |
| 30 | −70.751 | 1.10 | | | | |
| 31 | −162.994 | 2.84 | 1.48749 | 70.24 | 0.3633 | OHARA S-FSL5 |
| 32 | −22.360 | 1.50 | 1.60562 | 43.71 | 0.3289 | OHARA S-BAM4 |
| 33 | 54.030 | 8.25 | | | | |
| 34 | −56.960 | 2.65 | 1.84666 | 23.78 | 0.3035 | OHARA S-TIH53 |
| 35 | −8.945 | 1.50 | 1.80400 | 46.58 | 0.3371 | OHARA S-LAH65V |
| 36 | 11.006 | 29.221 | | | | |
| 37 | ∞ | 3.50 | 1.51633 | 64.14 | | VARIOUS FILTER |
| 38 | ∞ | 1.000 | | | | |

DIFFRACTION PLANE; THIRD PLANE $\lambda = 587.56(nm)$, $C_2 = -3.06070 \times 10^{-5}$, $C_4 = 2.23341 \times 10^{-10}$

VARIABLE INTERVAL

| | WIDE ANGLE END f = 34.16 | INTERMEDIATE FOCAL LENGTH f = 182.7 | TELEPHOTO END f = 975.2 |
|---|---|---|---|
| A | 5.487 | 77.906 | 94.869 |
| B | 71.175 | 6.645 | 44.244 |
| C | 66.650 | 59.061 | 4.500 |

MAGNIFICATION OF EACH LENS GROUP

| | WIDE ANGLE END f = 34.16 | INTERMEDIATE FOCAL LENGTH f = 182.7 | TELEPHOTO END f = 975.2 |
|---|---|---|---|
| SECOND LENS GROUP | −0.680 | −20.953 | 3.501 |
| THIRD LENS GROUP | 0.217 | −0.0376 | −1.202 |
| FOURTH LENS GROUP | −0.793 | −0.793 | −0.793 |
| EXTENDER LENS GROUP | 2.000 | 2.000 | 2.000 |

NUMERICAL VALUES IN CONDITIONAL EXPRESSIONS (1) $vd_{P1} - vd_{N1} = -23.0$
(2) $(R_{N2I} + R_{N1O})/(R_{N2I} - R_{N1O}) = -0.269$
(3) $vd_{4GP} = 81.5$
(6) $L_4/T_{4F-I} = 0.257$
(7-2) $f_{TC}/f_{DOE} = 0.0597$
(11) $f_1/f_W = 8.55$
(12) $f_2/f_W = -2.98$
(13) $f_3/f_W = -2.58$
(14) $f_4/f_W = 2.76$
(15) $f_E/f_W = -1.73$

TELEPHOTO RATIO AT TELEPHOTO END: 0.575

Note that, as can be seen from Table 6, the second positive lens L43 and the positive lenses L42 and L41 in the fourth lens group G4 of Example 6 all have the Abbe number νd=81.54, and satisfy conditional expression (4). Also, all of the above lenses have the partial dispersion ratio $\theta_{C,A'}$=0.3501 (<0.000667·νd+0.300=0.3544), and satisfy conditional expression (5).

Example 7

Extender Lens Group Ex Included

Figure 29:
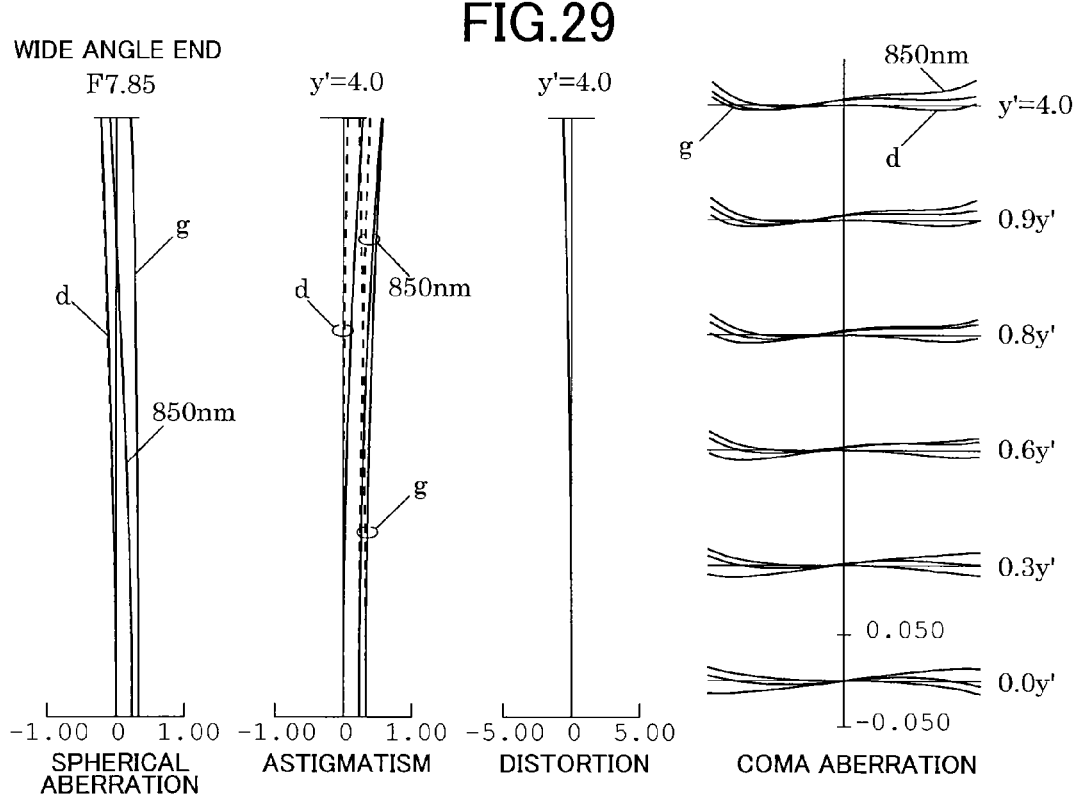
FIG. 29 is an aberration curve diagram at a wide angle end of the zoom lens (including the extender lens group) according to Example 7.
Figure 30:
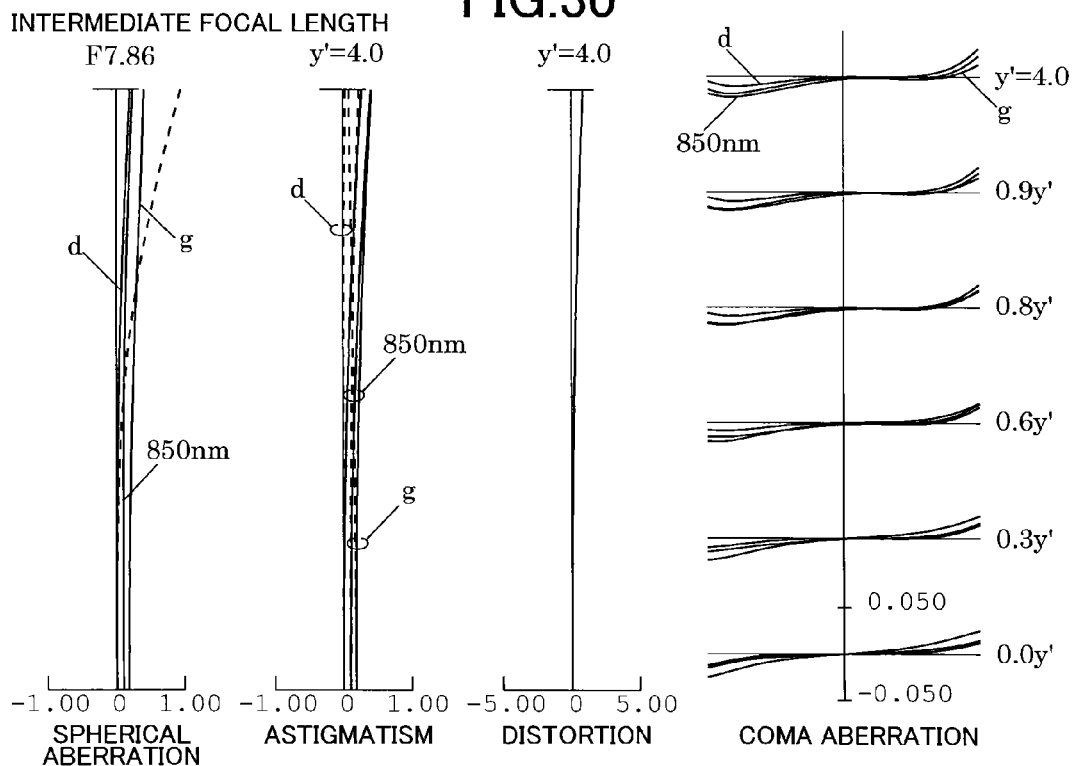
FIG. 30 is an aberration curve diagram at an intermediate focal length of the zoom lens (including the extender lens group) according to Example 7.
Figure 31:
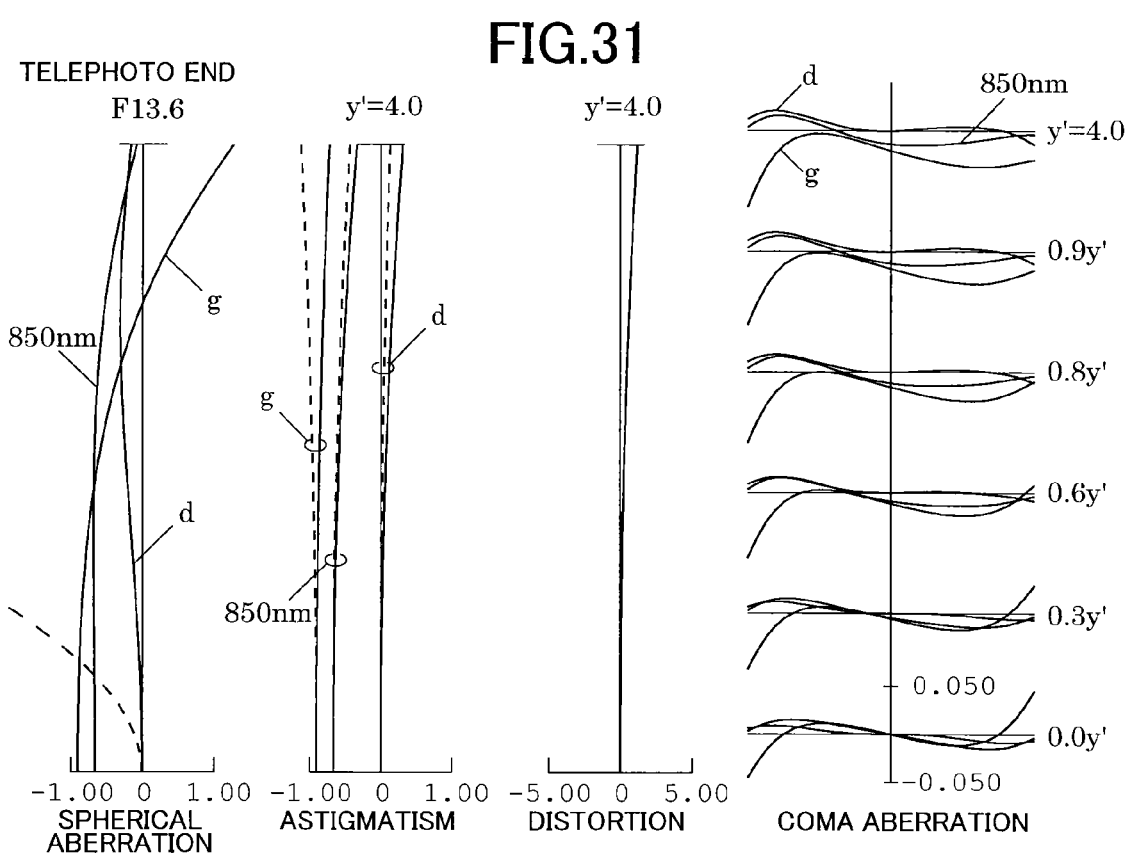
FIG. 31 is an aberration curve diagram at a telephoto end of the zoom lens (including the extender lens group) according to Example 7.

A numerical example of the zoom lens 1 according to Example 7 in a state where the extender lens group Ex shown in FIG. 22 is attached is described below. FIGS. 29 to 31 are aberration curve diagrams of spherical aberration, astigmatism, distortion and coma aberration at the wide angle end, intermediate focal length and telephoto end of the zoom lens 1 according to Example 7 in this state.

$f$=33.5 to 954, $F$=7.85 to 13.6, ω=6.85 to 0.237

TABLE 7 f = 33.5~954, F = 7.85~13.6, ω = 6.85~0.237

| SURFACE NUMBER | r | d | nd | νd | $\theta_{C,A'}$ | GLASS TYPE |
|---|---|---|---|---|---|---|
| 01 | 138.534 | 2.50 | 1.83400 | 37.16 | 0.3245 | OHARA S-LAH60 |
| 02 | 75.010 | 0.10 | 1.64310 | 38.82 | 0.3124 | RESIN MATERIAL |
| 03* | 75.010 | 0.10 | 1.61505 | 26.54 | 0.2831 | RESIN MATERIAL |
| 04 | 75.010 | 10.72 | 1.48749 | 70.24 | 0.3633 | OHARA S-FSL5 |
| 05 | 9346.827 | 0.20 | | | | |
| 06 | 73.420 | 10.32 | 1.43875 | 94.94 | 0.3529 | OHARA S-FPL53 |
| 07 | 1141.217 | VARIABLE(A) | | | | |
| 08 | −211.333 | 2.00 | 1.59522 | 67.73 | 0.3431 | OHARA S-FPM2 |
| 09 | 85.820 | 0.20 | | | | |
| 10 | 50.000 | 8.57 | 1.68893 | 31.07 | 0.3142 | OHARA S-TIM28 |
| 11 | −72.415 | 2.00 | 1.74320 | 49.34 | 0.3414 | OHARA S-LAM60 |
| 12 | 32.269 | VARIABLE(B) | | | | |
| 13 | −46.892 | 1.50 | 1.59522 | 67.73 | 0.3431 | OHARA S-FPM2 |
| 14 | 16.804 | 2.86 | 1.85026 | 32.27 | 0.3145 | OHARA S-LAH71 |
| 15 | 29.833 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 71.102 | 3.88 | 1.43875 | 94.94 | 0.3529 | OHARA S-FPL53 |
| 20 | −49.574 | 0.20 | | | | |
| 21 | 33.482 | 3.99 | 1.49700 | 81.54 | 0.3501 | OHARA S-FPL51 |
| 22 | −174.686 | 0.21 | | | | |
| 23 | 23.063 | 4.97 | 1.49700 | 81.54 | 0.3501 | OHARA S-FPL51 |
| 24 | −59.924 | 3.33 | 1.83400 | 37.16 | 0.3245 | OHARA S-LAH60 |
| 25 | 20.958 | 2.86 | | | | |
| 26 | −31.574 | 1.50 | 1.48749 | 70.24 | 0.3633 | OHARA S-FSL5 |
| 27 | 20.000 | 5.03 | 1.54814 | 45.78 | 0.3331 | OHARA S-TIL1 |
| 28 | −31.180 | 4.086 | | | | |
| 29 | 20.373 | 3.68 | 1.49700 | 81.54 | 0.3501 | OHARA S-FPL51 |
| 30 | −91.838 | 1.88 | | | | |
| 31 | −198.726 | 2.43 | 1.48749 | 70.24 | 0.3633 | OHARA S-FSL5 |
| 32 | −33.723 | 2.38 | 1.65844 | 50.88 | 0.3370 | OHARA S-BSM25 |
| 33 | 32.345 | 11.37 | | | | |
| 34 | 345.188 | 2.70 | 1.80518 | 25.42 | 0.3054 | OHARA S-TIH6 |
| 35 | −6.641 | 1.56 | 1.80610 | 40.93 | 0.3289 | OHARA S-LAH53 |
| 36 | 9.719 | 21.285 | | | | |

TABLE 7-continued f = 33.5~954, F = 7.85~13.6, ω = 6.85~0.237

| 37 | ∞ | 3.50 | 1.51633 | 64.14 | VARIOUS FILTER |
|----|---|------|---------|-------|----------------|
| 38 | ∞ | 1.000 | | | |

DIFFRACTION PLANE; THIRD PLANE $\lambda = 587.56(nm)$, $C_2 = -2.05523 \times 10^{-5}$, $C_4 = 8.88676 \times 10^{-10}$

VARIABLE INTERVAL

| | WIDE ANGLE END f = 33.50 | INTERMEDIATE FOCAL LENGTH f = 179.5 | TELEPHOTO END f = 953.7 |
|---|---|---|---|
| A | 7.192 | 75.842 | 89.762 |
| B | 65.781 | 6.155 | 43.715 |
| C | 63.691 | 54.667 | 3.187 |

MAGNIFICATION OF EACH LENS GROUP

| | WIDE ANGLE END f = 33.50 | INTERMEDIATE FOCAL LENGTH f = 179.5 | TELEPHOTO END f = 953.7 |
|---|---|---|---|
| SECOND LENS GROUP | −0.787 | 19.702 | 3.137 |
| THIRD LENS GROUP | 0.194 | −0.0415 | −1.383 |
| FOURTH LENS GROUP | −0.777 | −0.777 | −0.777 |
| EXTENDER LENS GROUP | 1.962 | 1.962 | 1.962 |

NUMERICAL VALUES IN CONDITIONAL EXPRESSIONS (1) $vd_{P1} - vd_{N1} = -24.5$
(2) $(R_{N2I} + R_{N1O})/(R_{N2I} - R_{N1O}) = -0.202$
(3) $vd_{4GP} = 86.0$
(6) $L_4/T_{4F-I} = 0.322$
(7-2) $f_{TC}/f_{DOE} = 0.0392$
(8) $vd_{1GP} = 82.6$
(11) $f_1/f_W = 8.45$
(12) $f_2/f_W = -3.04$
(13) $f_3/f_W = -2.25$
(14) $f_4/f_W = 2.48$
(15) $f_E/f_W = -1.15$

TELEPHOTO RATIO AT TELEPHOTO END: 0.543

Note that, as can be seen from Table 7, the second positive lens L43 and the positive lens L42 in the fourth lens group G4 of Example 7 have the Abbe number vd=81.54 and the partial dispersion ratio $\theta_{C,A'}$=0.3501 (<0.000667·vd+0.300=0.3544), and thus satisfy conditional expressions (4) and (5). Also, the positive lens L41 has the Abbe number vd=94.94 and the partial dispersion ratio $\theta_{C,A'}$=0.3529 (<0.000667·vd+0.300=0.3633), and thus satisfies conditional expressions (4) and (5). Moreover, as can be seen from Table 7, the positive lens L13 in the first lens group G1 of Example 7 has the Abbe number vd=94.94 and thus satisfies conditional expression (9). Furthermore, the positive lens L13 has the partial dispersion ratio $\theta_{C,A'}$=0.3529 (<0.000667·vd+0.300=0.3633), and thus satisfies conditional expression (10).

Example 8

Extender Lens Group Ex Included

Figure 34:
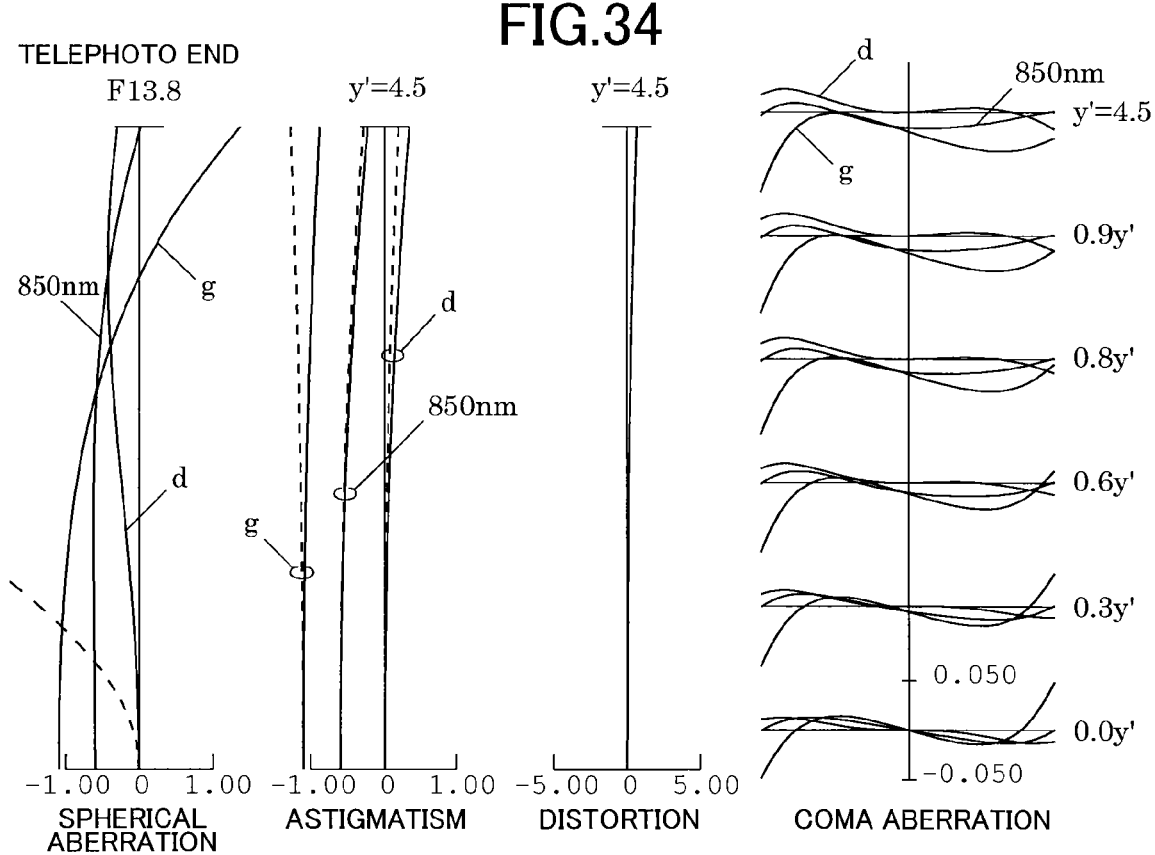
FIG. 34 is an aberration curve diagram at a telephoto end of the zoom lens (including the extender lens group) according to Example 8.

A numerical example of the zoom lens 1 according to Example 8 in a state where the extender lens group Ex shown in FIG. 23 is attached is described below. FIGS. 32 to 34 are aberration curve diagrams of spherical aberration, astigmatism, distortion and coma aberration at the wide angle end, intermediate focal length and telephoto end of the zoom lens 1 according to Example 8 in this state.

f=33.9 to 968, F=7.96 to 13.8, ω=6.78 to 0.235

TABLE 8 f = 33.9~968, F = 7.96~13.8, ω = 6.78~0.235

| SURFACE NUMBER | r | d | nd | vd | $\theta_{C,A'}$ | GLASS TYPE |
|---|---|---|---|---|---|---|
| 01 | 143.610 | 2.50 | 1.83400 | 37.16 | 0.3245 | OHARA S-LAH60 |
| 02 | 76.816 | 0.10 | 1.64310 | 38.82 | 0.3124 | RESIN MATERIAL |
| 03* | 76.816 | 0.10 | 1.61505 | 26.54 | 0.2831 | RESIN MATERIAL |
| 04 | 76.816 | 10.55 | 1.48749 | 70.24 | 0.3633 | OHARA S-FSL5 |
| 05 | 15446.495 | 0.20 | | | | |
| 06 | 75.559 | 10.17 | 1.43875 | 94.94 | 0.3529 | OHARA S-FPL53 |

TABLE 8-continued $f = 33.9\sim968, F = 7.96\sim13.8, \omega = 6.78\sim0.235$

| | | | | | | |
|---|---|---|---|---|---|---|
| 07 | 1368.706 | VARIABLE(A) | | | | |
| 08 | −146.028 | 2.00 | 1.59522 | 67.73 | 0.3431 | OHARA S-FPM2 |
| 09 | 42.654 | 0.20 | | | | |
| 10 | 40.000 | 6.73 | 1.80000 | 29.84 | 0.3117 | OHARA S-NBH55 |
| 11 | −3191.505 | 2.00 | 1.67003 | 47.23 | 0.3338 | OHARA S-BAH10 |
| 12 | 31.671 | VARIABLE(B) | | | | |
| 13 | −50.487 | 1.50 | 1.60300 | 65.44 | 0.3498 | OHARA S-PHM53 |
| 14 | 18.890 | 2.94 | 1.85026 | 32.27 | 0.3145 | OHARA S-LAH71 |
| 15 | 34.671 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19 | 80.235 | 3.47 | 1.49700 | 81.54 | 0.3501 | OHARA S-FPL51 |
| 20 | −73.028 | 0.20 | | | | |
| 21 | 57.165 | 3.63 | 1.49700 | 81.54 | 0.3501 | OHARA S-FPL51 |
| 22 | −89.319 | 0.20 | | | | |
| 23 | 30.165 | 5.04 | 1.49700 | 81.54 | 0.3501 | OHARA S-FPL51 |
| 24 | −38.510 | 1.50 | 1.83400 | 37.16 | 0.3245 | OHARA S-LAH60 |
| 25 | 33.545 | 2.44 | | | | |
| 26 | −47.119 | 1.50 | 1.48749 | 70.24 | 0.3633 | OHARA S-FSL5 |
| 27 | 20.000 | 5.95 | 1.54072 | 47.23 | 0.3353 | OHARA S-TIL2 |
| 28 | −33.828 | 4.971 | | | | |
| 29 | 17.944 | 4.31 | 1.49700 | 81.54 | 0.3501 | OHARA S-FPL51 |
| 30 | −80.952 | 1.67 | | | | |
| 31 | −197.901 | 2.82 | 1.48749 | 70.24 | 0.3633 | OHARA S-FSL5 |
| 32 | −22.010 | 1.55 | 1.60562 | 43.71 | 0.3289 | OHARA S-BAM4 |
| 33 | 48.486 | 7.51 | | | | |
| 34 | −66.664 | 2.85 | 1.84666 | 23.78 | 0.3035 | OHARA S-TIH53 |
| 35 | −9.531 | 1.50 | 1.80400 | 46.58 | 0.3371 | OHARA S-LAH65V |
| 36 | 11.184 | 37.282 | | | | |
| 37 | ∞ | 3.50 | 1.51633 | 64.14 | | VARIOUS FILTER |
| 38 | ∞ | 1.000 | | | | |

DIFFRACTION PLANE; THIRD PLANE $\lambda = 587.56$ (nm), $C_2 = -2.06961 \times 10^{-5}$, $C_4 = 1.17380 \times 10^{-10}$

VARIABLE INTERVAL

| | WIDE ANGLE END $f = 33.79$ | INTERMEDIATE FOCAL LENGTH $f = 180.7$ | TELEPHOTO END $f = 964.7$ |
|---|---|---|---|
| A | 5.400 | 78.425 | 94.911 |
| B | 71.253 | 6.594 | 44.438 |
| C | 66.028 | 57.662 | 3.332 |

MAGNIFICATION OF EACH LENS GROUP

| | WIDE ANGLE END $f = 33.79$ | INTERMEDIATE FOCAL LENGTH $f = 180.7$ | TELEPHOTO END $f = 964.7$ |
|---|---|---|---|
| SECOND LENS GROUP | −0.713 | −73.919 | 3.335 |
| THIRD LENS GROUP | 0.207 | 0.0107 | −1.264 |
| FOURTH LENS GROUP | −0.780 | −0.780 | −0.780 |
| EXTENDER LENS GROUP | 1.980 | 1.980 | 1.980 |

NUMERICAL VALUES IN CONDITIONAL EXPRESSIONS (1) $vd_{P1} - vd_{N1} = -23.0$
(2) $(R_{N2I} + R_{N1O})/(R_{N2I} - R_{N1O}) = -0.168$
(3) $vd_{4GP} = 81.5$
(6) $L_4/T_{4F-I} = 0.261$
(7-2) $f_{TC}/f_{DOE} = 0.0399$
(8) $vd_{1GP} = 82.6$
(11) $f_1/f_W = 8.68$
(12) $f_2/f_W = -3.08$
(13) $f_3/f_W = -2.50$
(14) $f_4/f_W = 2.74$
(15) $f_E/f_W = -1.76$

TELEPHOTO RATIO AT TELEPHOTO END: 0.573

Note that, as can be seen from Table 8, the second positive lens L43 and the positive lenses L42 and L41 in the fourth lens group G4 of Example 8 all have the Abbe number vd=81.54, and satisfy conditional expression (4). Also, all of the above lenses have the partial dispersion ratio $\theta_{C,A'}$=0.3501 (<0.000667·vd+0.300=0.3544), and satisfy conditional expression (5). Moreover, as can be seen from Table 8, the positive lens L13 in the first lens group G1 of Example 8 has the Abbe number vd=94.94 and thus satisfies conditional expression (9). Furthermore, the positive lens L13 has the partial dispersion ratio $\theta_{C,A'}$=0.3529 (<0.000667·vd+0.300=0.3633), and thus satisfies conditional expression (10).

Example 9

Extender Lens Group Ex Included

Figure 37:
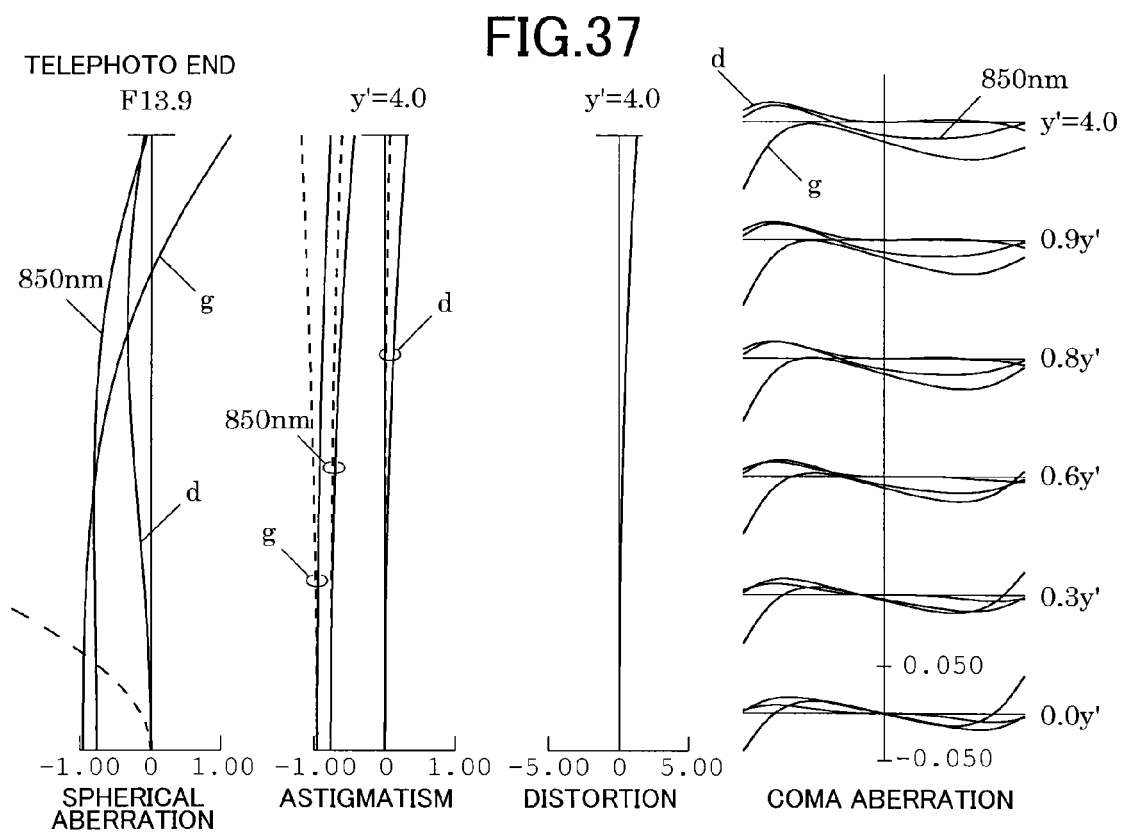
FIG. 37 is an aberration curve diagram at a telephoto end of the zoom lens (including the extender lens group) according to Example 9.

A numerical example of the zoom lens 1 according to Example 9 in a state where the extender lens group Ex shown in FIG. 24 is attached is described below. FIGS. 35 to 37 are aberration curve diagrams of spherical aberration, astigmatism, distortion and coma aberration at the wide angle end, intermediate focal length and telephoto end of the zoom lens 1 according to Example 9 in this state.

*f*=33.9 to 968, *F*=7.96 to 13.8, ω=6.78 to 0.235

TABLE 9 f = 33.9~968, F = 7.96~13.8, ω = 6.78~0.235

| SURFACE NUMBER | r | d | nd | vd | $\theta_{C,A'}$ | GLASS TYPE |
| --- | --- | --- | --- | --- | --- | --- |
| 01 | 157.716 | 2.50 | 1.83400 | 37.16 | 0.3245 | OHARA S-LAH60 |
| 02 | 80.188 | 0.10 | 1.64310 | 38.82 | 0.3124 | RESIN MATERIAL |
| 03* | 80.188 | 0.10 | 1.61505 | 26.54 | 0.2831 | RESIN MATERIAL |
| 04 | 80.188 | 10.84 | 1.48749 | 70.24 | 0.3633 | OHARA S-FSL5 |
| 05 | −965.701 | 0.20 | | | | |
| 06 | 74.859 | 10.21 | 1.43875 | 94.94 | 0.3529 | OHARA S-FPL53 |
| 07 | 1250.261 | VARIABLE(A) | | | | |
| 08 | −1102.688 | 2.00 | 1.59522 | 67.73 | 0.3431 | OHARA S-FPM2 |
| 09 | 54.624 | 0.20 | | | | |
| 10 | 51.978 | 9.76 | 1.68893 | 31.07 | 0.3142 | OHARA S-TIM28 |
| 11 | −48.077 | 2.00 | 1.85026 | 32.27 | 0.3331 | OHARA S-LAH51 |
| 12 | 42.896 | VARIABLE(B) | | | | |
| 13 | −47.465 | 1.50 | 1.59522 | 67.73 | 0.3431 | OHARA S-FPM2 |
| 14 | 16.926 | 2.87 | 1.85026 | 32.27 | 0.3145 | OHARA S-LAH71 |
| 15 | 30.040 | VARIABLE(C) | | | | |
| 16 | ∞ | 1.00 | 1.51633 | 64.14 | | FILTER |
| 17 | ∞ | 0.90 | | | | |
| 18 | APERTURE | 2.50 | | | | |
| 19* | 25.662 | 4.50 | 1.43875 | 94.94 | 0.3529 | OHARA S-FPL53 |
| 20 | −107.684 | 0.20 | | | | |
| 21 | 39.448 | 3.48 | 1.49700 | 81.54 | 0.3501 | OHARA S-FPL51 |
| 22 | −244.335 | 0.20 | | | | |
| 23 | 30.534 | 4.06 | 1.49700 | 81.54 | 0.3501 | OHARA S-FPL51 |
| 24 | −65.075 | 3.64 | 1.80610 | 40.93 | 0.3289 | OHARA S-LAH53 |
| 25 | 19.436 | 4.53 | | | | |
| 26 | 385.080 | 1.50 | 1.48749 | 70.24 | 0.3633 | OHARA S-FSL5 |
| 27 | 20.000 | 3.89 | 1.54814 | 45.78 | 0.3331 | OHARA S-TIL1 |
| 28 | −99.699 | 4.081 | | | | |
| 29 | 17.333 | 3.88 | 1.49700 | 81.54 | 0.3501 | OHARA S-FPL51 |
| 30 | −196.841 | 0.87 | | | | |
| 31 | 106.050 | 3.93 | 1.48749 | 70.24 | 0.3633 | OHARA S-FSL5 |
| 32 | −46.918 | 4.82 | 1.69350 | 53.20 | 0.3455 | OHARA S-LAL13 |
| 33 | 19.815 | 5.45 | | | | |

TABLE 9-continued f = 33.9~968, F = 7.96~13.8, ω = 6.78~0.235

| | | | | | | |
|---|---|---|---|---|---|---|
| 34 | −145.623 | 4.36 | 1.78472 | 25.68 | 0.3059 | OHARA S-TIH11 |
| 35 | −6.064 | 1.50 | 1.83481 | 42.72 | 0.3314 | OHARA S-LAH55V |
| 36 | 10.300 | 19.697 | | | | |
| 37 | ∞ | 3.50 | 1.51633 | 64.14 | | VARIOUS FILTER |
| 38 | ∞ | 1.000 | | | | |

DIFFRACTION PLANE; THIRD PLANE $\lambda = 587.56$ (nm), $C_2 = -2.07977 \times 10^{-5}$, $C_4 = 9.76351 \times 10^{-10}$

ASPHERIC SURFACE; NINETEENTH PLANE $K = 0.0$, $A_4 = -7.21843 \times 10^{-6}$, $A_6 = -6.52396 \times 10^{-9}$, $A_8 = 4.67279 \times 10^{-12}$

VARIABLE INTERVAL

| | WIDE ANGLE END f = 34.04 | INTERMEDIATE FOCAL LENGTH f = 182.3 | TELEPHOTO END f = 972.8 |
|---|---|---|---|
| A | 5.846 | 75.128 | 87.903 |
| B | 65.173 | 6.100 | 47.276 |
| C | 67.232 | 57.023 | 3.072 |

MAGNIFICATION OF EACH LENS GROUP

| | WIDE ANGLE END f = 34.04 | INTERMEDIATE FOCAL LENGTH f = 182.3 | TELEPHOTO END f = 972.8 |
|---|---|---|---|
| SECOND LENS GROUP | −0.847 | 11.221 | 3.093 |
| THIRD LENS GROUP | 0.188 | −0.0758 | −1.469 |
| FOURTH LENS GROUP | −0.749 | −0.749 | −0.749 |
| EXTENDER LENS GROUP | 1.996 | 1.996 | 1.996 |

NUMERICAL VALUES IN CONDITIONAL EXPRESSIONS (1) $vd_{P1} - vd_{N1} = -24.5$
(2) $(R_{N2I} + R_{N1O})/(R_{N2I} - R_{N1O}) = -1.11$
(3) $vd_{4GP} = 86.0$
(6) $L_4/T_{4F-I} = 0.334$
(7-2) $f_{TC}/f_{DOE} = 0.0405$
(8) $vd_{1GP} = 82.6$
(11) $f_1/f_W = 8.39$
(12) $f_2/f_W = -3.19$
(13) $f_3/f_W = -2.27$
(14) $f_4/f_W = 2.47$
(15) $f_E/f_W = -1.02$

TELEPHOTO RATIO AT TELEPHOTO END: 0.542

Note that, as can be seen from Table 9, the second positive lens L43 and the positive lens L42 in the fourth lens group G4 of Example 9 have the Abbe number vd=81.54 and the partial dispersion ratio $\theta_{C,A}$=0.3501 (<0.000667·vd+ 0.300=0.3544), and thus satisfy conditional expressions (4) and (5). Also, the positive lens L41 has the Abbe number vd=94.94 and the partial dispersion ratio $\theta_{C,A}$=0.3529 (<0.000667·vd+0.300=0.3633), and thus satisfies conditional expressions (4) and (5). Moreover, as can be seen from Table 9, the positive lens L13 in the first lens group G1 of Example 9 has the Abbe number vd=94.94 and thus satisfies conditional expression (9). Furthermore, the positive lens L13 has the partial dispersion ratio $\theta_{C,A}$=0.3529 (<0.000667·vd+0.300=0.3633), and thus satisfies conditional expression (10).

Example 10

Extender Lens Group Ex Included

Figure 40:
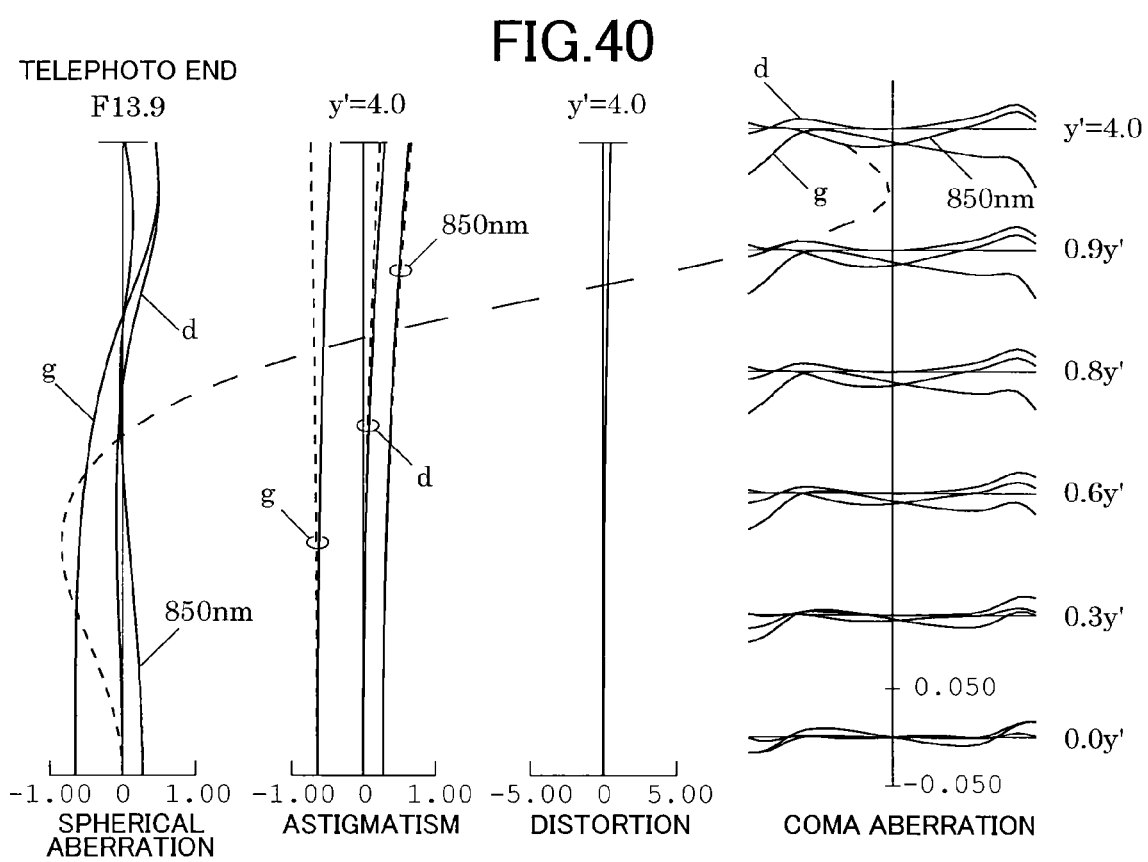
FIG. 40 is an aberration curve diagram at a telephoto end of the zoom lens (including the extender lens group) according to Example 10.

A numerical example of the zoom lens 1 according to Example 10 in a state where the extender lens group Ex shown in FIG. 25 is attached is described below. FIGS. 38 to 40 are aberration curve diagrams of spherical aberration, astigmatism, distortion and coma aberration at the wide angle end, intermediate focal length and telephoto end of the zoom lens 1 according to Example 10 in this state.

$f$=33.9 to 968, $F$=7.96 to 13.8, ω=6.78 to 0.235

TABLE 10

| | f = 33.9~968, F = 7.96~13.8, ω = 6.78~0.235 | | | | | |
|---|---|---|---|---|---|---|
| SURFACE NUMBER | r | d | nd | vd | $\theta_{C, A'}$ | GLASS TYPE |
| 01 | 172.744 | 2.50 | 1.78800 | 47.37 | 0.3383 | OHARA S-LAH64 |
| 02 | 81.144 | 0.78 | | | | |
| 03 | 80.286 | 9.17 | 1.43875 | 94.94 | 0.3529 | OHARA S-FPL53 |
| 04 | 505.373 | 0.20 | | | | |
| 05 | 98.978 | 2.50 | 1.51742 | 52.43 | 0.3410 | OHARA S-NSL36 |
| 06 | 68.083 | 0.96 | | | | |
| 07 | 69.238 | 10.05 | 1.43875 | 94.94 | 0.3529 | OHARA S-FPL53 |
| 08 | 368.951 | 0.20 | | | | |
| 09 | 82.756 | 9.61 | 1.43875 | 94.94 | 0.3529 | OHARA S-FPL53 |
| 10 | 5833.436 | VARIABLE(A) | | | | |
| 11 | −104.036 | 2.00 | 1.59522 | 67.73 | 0.3431 | OHARA S-FPM2 |
| 12 | 211.482 | 0.20 | | | | |
| 13 | 86.251 | 7.34 | 1.80000 | 29.84 | 0.3117 | OHARA S-NBH55 |
| 14 | −50.501 | 2.00 | 1.74320 | 49.34 | 0.3414 | OHARA S-LAM60 |
| 15 | 33.103 | VARIABLE(B) | | | | |
| 16 | −46.420 | 1.50 | 1.60300 | 65.44 | 0.3498 | OHARA S-PHM53 |
| 17 | 16.928 | 2.36 | 1.85026 | 32.27 | 0.3145 | OHARA S-LAH71 |
| 18 | 30.729 | VARIABLE(C) | | | | |
| 19 | ∞ | 1.00 | 1.51633 | 64.14 | | FILTER |
| 20 | ∞ | 0.90 | | | | |
| 21 | APERTURE | 3.50 | | | | |
| 22 | 75.345 | 3.41 | 1.49700 | 81.54 | 0.3501 | OHARA S-FPL51 |
| 23 | −86.106 | 1.70 | | | | |
| 24 | 70.964 | 3.31 | 1.49700 | 81.54 | 0.3501 | OHARA S-FPL51 |
| 25 | −117.159 | 0.20 | | | | |
| 26 | 41.750 | 4.51 | 1.49700 | 81.54 | 0.3501 | OHARA S-FPL51 |
| 27 | −45.320 | 1.50 | 1.83400 | 37.16 | 0.3245 | OHARA S-LAH60 |
| 28 | 50.233 | 1.71 | | | | |
| 29 | 629.774 | 1.50 | 1.48749 | 70.24 | 0.3633 | OHARA S-FSL5 |
| 30 | 20.000 | 5.48 | 1.51742 | 52.43 | 0.3410 | OHARA S-NSL36 |
| 31 | −63.386 | 4.949 | | | | |
| 32 | 17.945 | 4.37 | 1.49700 | 81.54 | 0.3501 | OHARA S-FPL51 |
| 33 | −70.751 | 1.10 | | | | |
| 34 | −162.994 | 2.84 | 1.48749 | 70.24 | 0.3633 | OHARA S-FSL5 |
| 35 | −22.360 | 1.50 | 1.60562 | 43.71 | 0.3289 | OHARA S-BAM4 |
| 36 | 54.030 | 8.25 | | | | |
| 37 | −56.960 | 2.65 | 1.84666 | 23.78 | 0.3035 | OHARA S-TIH53 |
| 38 | −8.945 | 1.50 | 1.80400 | 46.58 | 0.3371 | OHARA S-LAH65V |
| 39 | 11.006 | 37.387 | | | | |
| 40 | ∞ | 3.50 | 1.51633 | 64.14 | | VARIOUS FILTER |
| 41 | ∞ | 1.000 | | | | |

| VARIABLE INTERVAL | | | |
|---|---|---|---|
| | WIDE ANGLE END f = 34.18 | INTERMEDIATE FOCAL LENGTH f = 183.1 | TELEPHOTO END f = 974.9 |
| A | 6.436 | 70.816 | 83.849 |
| B | 61.795 | 6.263 | 43.915 |
| C | 62.699 | 53.851 | 3.166 |

| MAGNIFICATION OF EACH LENS GROUP | | | |
|---|---|---|---|
| | WIDE ANGLE END f = 34.18 | INTERMEDIATE FOCAL LENGTH f = 183.1 | TELEPHOTO END f = 974.9 |
| SECOND LENS GROUP | −0.774 | 30.028 | 3.314 |
| THIRD LENS GROUP | 0.203 | −0.0281 | −1.353 |
| FOURTH LENS GROUP | −0.801 | −0.801 | −0.801 |
| EXTENDER LENS GROUP | 2.001 | 2.001 | 2.001 |

NUMERICAL VALUES IN CONDITIONAL EXPRESSIONS (1) $vd_{P1} - vd_{N1} = -17.8$
(2) $(R_{N2I} + R_{N1O})/(R_{N2I} - R_{N1O}) = -1.17$
(3) $vd_{4GP} = 81.5$
(6) $L_4/T_{4F-I} = 0.256$
(7-2) $f_{TC}/f_{DOE}$ = NA
(8) $vd_{1GP} = 94.9$
(11) $f_1/f_W = 7.94$
(12) $f_2/f_W = -2.84$
(13) $f_3/f_W = -2.24$

TABLE 10-continued f = 33.9~968, F = 7.96~13.8, ω = 6.78~0.235

(14) $f_4/f_W$ = 2.66
(15) $f_E/f_W$ = −1.72

TELEPHOTO RATIO AT TELEPHOTO END: 0.575

Note that, as can be seen from Table 10, the second positive lens L43 and the positive lenses L42 and L41 in the fourth lens group G4 of Example 10 all have the Abbe number vd=81.54, and satisfy conditional expression (4). Also, all of the above lenses have the partial dispersion ratio $\theta_{C,A}$=0.3501 (<0.000667·vd+0.300=0.3544), and satisfy conditional expression (5). Moreover, as can be seen from Table 10, the positive lens L12, L14, and L15 in the first lens group G1 of Example 10 all have the Abbe number vd=94.94 and thus satisfies conditional expression (9). Furthermore, the positive lens L13 has the partial dispersion ratio $\theta_{C,A}$=0.3529 (<0.000667·vd+0.300=0.3633), and thus satisfies conditional expression (10).

Example 11

Next, with reference to FIG. 41, description is given of an imaging device, as Example 11, to which the zoom lens 1 described in Examples 1 to 10 according to the present invention is applied. The imaging device of Example 11 is favorably used for a TV camera, a digital camera, a video camera and the like, and particularly for the purpose of monitoring.

As shown in FIG. 41, an imaging device 10 of Example 11 includes a photographing lens 11 and an imaging element 16 (e.g., an area sensor) as a photographing optical system. As the photographing lens 11, the zoom lens 1 including the first to fourth lens groups G1 to G4 described in Examples 1 to 5 or the zoom lens 1 including the first to fourth lens groups G1 to G4 and the detachable extender lens Ex described in Examples 6 to 10 can be used. The imaging device 10 also includes a focus control unit 12, a zoom control unit 13, a filter control unit 14, an aperture control unit 15, a signal processing unit 17, and an extender control unit 18.

The focus control unit 12 executes a focus control, i.e., a focusing operation of the photographing lens 11. The extender control unit 18 executes an attachment and detachment operation of the extender lens group Ex. The zoom control unit 13 performs zoom control, i.e., a magnification change operation of the photographing lens 11.

The photographing lens 11 has an aperture stop S, and the aperture stop S is controlled by the aperture control unit 15. The aperture control unit 15 functions to change the diameter of the aperture stop S and control F-number.

An optical element F2 formed of parallel flat plates such as filters is provided on the image plane I side of the fourth lens group G4. The optical element F2 is attached and detached on a photographing optical path by the filter control unit 14. The filter control unit 14 functions to switch an infrared light blocking filter, a visible light blocking filter and the like, for example.

In the imaging device 10 described above, a subject image is formed on the image plane I of the imaging element 16 by the photographing lens 11. The imaging element 16 performs photoelectric conversion of the subject image formed on the image plane I, and outputs an image signal to the signal processing unit 17.

The signal processing unit 17 processes and converts the image signal into digital information. Image information digitized by the signal processing unit 17 is subjected to predetermined image processing in an image processing unit (not shown), and is then recorded in a semiconductor memory (not shown) and the like or transmitted to the outside by a communication device (not shown). Moreover, an image that is being photographed can be displayed on a monitor (not shown), and an image recorded in the semiconductor memory or the like can be displayed on the monitor.

According to the imaging device 10 described above, the zoom lens 1 described in Examples 1 to 5 can be used as the photographing lens 11. Therefore, the compact imaging device 10 with high image quality can be provided, which has a variable magnification ratio exceeding 25 times and realizes favorable correction of chromatic aberrations from visible range to near-infrared range. The imaging device 10 also realizes seamless imaging from visible range to near-infrared range, and uses an imaging element with two million pixels or more.

The present invention can provide a high-magnification zoom lens capable of favorable aberration correction. Although the embodiment of the present invention has been described above, the present invention is not limited thereto. It should be appreciated that variations may be made in the embodiment described by persons skilled in the art without departing from the scope of the present invention.

What is claimed is:

1. A zoom lens comprising:
a first lens group having positive refractive power;
a second lens group having negative refractive power;
a third lens group having negative refractive power; and
a fourth lens group having positive refractive power, the first to fourth lens groups being arranged in an order starting from an object side to an image plane side, wherein
in magnification change, the second and third lens groups are moved so that intervals between the first and second lens groups, between the second and third lens groups and between the third and fourth lens groups are changed,
the fourth lens group includes, in an order starting from a side closest to an image plane to the object side, a first positive lens, a first negative lens, a second negative lens and a second positive lens,
when an Abbe number vd is a value obtained by (nd−1)/(ng−nC) where a refractive index relative to d-line is nd, a refractive index relative to g-line is ng, and a refractive index relative to C-line is nC, in terms of a material that forms the lenses, and when the Abbe number of the first positive lens is $vd_{P1}$ and the Abbe number of the first negative lens is $vd_{N1}$, the following conditional expression (1) is satisfied:

$$-40 < vd_{P1} - vd_{N1} < 0 \qquad (1),$$

intervals between lenses in the second lens group are unchanged in the magnification change, the fourth lens group includes two positive lenses on the object side of the second positive lens, when an average value of the Abbe numbers of the three lenses including the second positive lens and the two positive lenses is $vd_{4GP}$, the following conditional expression (3) is satisfied:

$$75 < vd_{4GP} < 96 \quad (3), \text{ and}$$

when a partial dispersion ratio $\theta_{C,A'}$ of a material that forms each of the second positive lens and the two positive lenses is a value obtained by $(nC-nA')/(nF-nC)$ where nF is a refractive index relative to F-line, nC is a refractive index relative to C-line, and nA' is a refractive index relative to A'-line, in terms of the material that forms the positive lens, the Abbe number vd and partial dispersion ratio $\theta_{C,A'}$ of at least one of the second positive lens and the two positive lenses satisfy the following conditional expressions (4) and (5):

$$75 < vd < 96 \quad (4)$$

$$\theta_{C,A'} < 0.000667 \cdot vd + 0.300 \quad (5).$$

2. The zoom lens according to claim 1, wherein when a curvature radius of an image-side surface of the second negative lens is $R_{N21}$, and a curvature radius of an object-side surface of the first negative lens is $R_{N10}$, the following conditional expression (2) is satisfied:

$$-2.0 < (R_{N21} + R_{N10})/(R_{N21} - R_{N10}) < 0.0 \quad (2).$$

3. The zoom lens according to claim 1, wherein the first positive lens and the first negative lens are joined, and the second negative lens and the second positive lens are joined.

4. A zoom lens comprising:
a first lens group having positive refractive power;
a second lens group having negative refractive power;
a third lens group having negative refractive power; and
a fourth lens group having positive refractive power, the first to fourth lens groups being arranged in an order starting from an object side to an image plane side, wherein
in magnification change, the second and third lens groups are moved so that intervals between the first and second lens groups, between the second and third lens groups and between the third and fourth lens groups are changed,
the fourth lens group includes, in an order starting from a side closest to an image plane to the object side, a first positive lens, a first negative lens, a second negative lens and a second positive lens,
when an Abbe number vd is a value obtained by $(nd-1)/(ng-nC)$ where a refractive index relative to d-line is nd, a refractive index relative to g-line is ng, and a refractive index relative to C-line is nC, in terms of a material that forms the lenses, and when the Abbe number of the first positive lens is $vd_{P1}$ and the Abbe number of the first negative lens is $vd_{N1}$, the following conditional expression (1) is satisfied:

$$-40 < vd_{P1} - vd_{N1} < 0 \quad (1),$$

intervals between lenses in the second lens group are unchanged in the magnification change, and when a distance along an optical axis from a plane closest to the object side to a plane closest to the image plane side in the fourth lens group is $L_4$, and a distance along the optical axis from a plane closest to the object side to an image plane in the fourth lens group, and, if an optical element having no refractive power is included on a side closer to the image than the fourth lens group, an air equivalent length on an assumption that the optical element does not exist is $T_{4F-I}$, the following conditional expression (6) is satisfied:

$$0.2 < L_4/T_{4F-I} < 0.5 \quad (6).$$

5. A zoom lens comprising:
a first lens group having positive refractive power;
a second lens group having negative refractive power;
a third lens group having negative refractive power; and
a fourth lens group having positive refractive power, the first to fourth lens groups being arranged in an order starting from an object side to an image plane side, wherein
in magnification change, the second and third lens groups are moved so that intervals between the first and second lens groups, between the second and third lens groups and between the third and fourth lens groups are changed,
the fourth lens group includes, in an order starting from a side closest to an image plane to the object side, a first positive lens, a first negative lens, a second negative lens and a second positive lens,
when an Abbe number vd is a value obtained by $(nd-1)/(ng-nC)$ where a refractive index relative to d-line is nd, a refractive index relative to g-line is ng, and a refractive index relative to C-line is nC, in terms of a material that forms the lenses, and when the Abbe number of the first positive lens is $vd_{P1}$ and the Abbe number of the first negative lens is $vd_{N1}$, the following conditional expression (1) is satisfied:

$$-40 < vd_{P1} - vd_{N1} < 0 \quad (1),$$

intervals between lenses in the second lens group are unchanged in the magnification change, the first lens group includes, in an order starting from the object side to the image plane side, a negative meniscus lens with a concave surface directed to the image plane side, a positive lens with a convex surface directed to the object side, the convex surface having a smaller absolute value of a curvature radius than on the image plane side, and a positive lens with a convex surface directed to the object side, the convex surface having a smaller absolute value of a curvature radius than on the image plane side, and the first lens group further includes a diffractive optical element, and when a focal length of the whole system at a telephoto end is $f_T$, and a focal length of a diffraction part of the diffractive optical element is $f_{DOE}$, the following conditional expression (7) is satisfied:

$$0.01 < f_T/f_{DOE} < 0.05 \quad (7).$$

6. The zoom lens according to claim 1, wherein the first lens group includes five lenses, including, in an order starting from the object side, a negative meniscus lens with a concave surface directed to the image plane side, a positive lens with a convex surface directed to the object side, the convex surface having a smaller absolute value of a curvature radius than on the image plane side, a negative meniscus lens with a concave surface directed to the image plane side, a positive lens with a convex surface directed to the object side, the convex surface having a smaller absolute value of a curvature radius than on the image plane side, and a positive lens with a convex surface directed to the object side, the convex surface having a smaller absolute value of a curvature radius than on the image plane side.

7. The zoom lens according to claim 1, further comprising:
an extender lens group detachably provided on the image plane side of the fourth lens group and configured to shift a focal length of the whole system to a longer side without changing a distance between the image plane and each of the first to fourth lens groups.

8. The zoom lens according to claim 7, wherein
the first lens group includes, in an order starting from the object side to the image plane side, a negative meniscus lens with a concave surface directed to the image plane side, a positive lens with a convex surface directed to the object side, the convex surface having a smaller absolute value of a curvature radius than on the image plane side, and a positive lens with a convex surface directed to the object side, the convex surface having a smaller absolute value of a curvature radius than on the image plane side, and the first lens group further includes a diffractive optical element,
the zoom lens further comprise an extender lens group (Ex) detachably provided on the image plane side of the fourth lens group and configured to shift the focal length of the whole system to the longer side without changing a distance between the image plane and each of the first to fourth lens groups, wherein
when a focal length of the whole system at a telephoto end in a state where the extender lens group is attached is $f_{TC}$, and a focal length of a diffraction part of the diffractive optical element is $f_{DOE}$, the following conditional expression (7-2) is satisfied:

$$0.02 < f_{TC}/f_{DOE} < 0.10 \qquad (7\text{-}2).$$

9. The zoom lens according to claim 1, wherein
the first lens group and the fourth lens group are fixed to the image plane during magnification change.

10. An imaging device comprising:
the zoom lens according to claim 1 as a photographing optical system.

11. The zoom lens according to claim 4, wherein
when a curvature radius of an image-side surface of the second negative lens is $R_{N21}$, and a curvature radius of an object-side surface of the first negative lens is $R_{N10}$, the following conditional expression (2) is satisfied:

$$-2.0 < (R_{N21} + R_{N10})/(R_{N21} - R_{N10}) < 0.0 \qquad (2).$$

12. The zoom lens according to claim 4, wherein
the first positive lens and the first negative lens are joined, and the second negative lens and the second positive lens are joined.

13. The zoom lens according to claim 4, further comprising:
an extender lens group detachably provided on the image plane side of the fourth lens group and configured to shift a focal length of the whole system to a longer side without changing a distance between the image plane and each of the first to fourth lens groups.

14. The zoom lens according to claim 4, wherein
the first lens group and the fourth lens group are fixed to the image plane during magnification change.

15. An imaging device comprising:
the zoom lens according to claim 4 as a photographing optical system.

16. The zoom lens according to claim 5, wherein
when a curvature radius of an image-side surface of the second negative lens is $R_{N21}$, and a curvature radius of an object-side surface of the first negative lens is $R_{N10}$, the following conditional expression (2) is satisfied:

$$-2.0 < (R_{N21} + R_{N10})/(R_{N21} - R_{N10}) < 0.0 \qquad (2).$$

17. The zoom lens according to claim 5, wherein
the first positive lens and the first negative lens are joined, and the second negative lens and the second positive lens are joined.

18. The zoom lens according to claim 5, further comprising:
an extender lens group detachably provided on the image plane side of the fourth lens group and configured to shift the focal length of the whole system to a longer side without changing a distance between the image plane and each of the first to fourth lens groups.

19. The zoom lens according to claim 5, wherein
the first lens group and the fourth lens group are fixed to the image plane during magnification change.

20. An imaging device comprising:
the zoom lens according to claim 5 as a photographing optical system.

* * * * *